Aug. 14, 1956 G. C. ELLERBECK 2,758,789

MULTI-PURPOSE REGISTERS

Filed Nov. 29, 1952 34 Sheets-Sheet 1

GRANT C. ELLERBECK
INVENTOR
BY Robyn Wilcox
ATTORNEY

GRANT C. ELLERBECK
INVENTOR
BY Robyn Wilcox
ATTORNEY

Aug. 14, 1956 G. C. ELLERBECK 2,758,789

MULTI-PURPOSE REGISTERS

Filed Nov. 29, 1952 34 Sheets-Sheet 3

GRANT C. ELLERBECK
INVENTOR
BY Robyn Wilcox
ATTORNEY

GRANT C. ELLERBECK
INVENTOR
BY Robyn Wilcox
ATTORNEY

GRANT C. ELLERBECK
INVENTOR
BY Robyn Wilcox
ATTORNEY

GRANT C. ELLERBECK
INVENTOR
BY Rolyn Wilcox
ATTORNEY

Aug. 14, 1956 G. C. ELLERBECK 2,758,789

MULTI-PURPOSE REGISTERS

Filed Nov. 29, 1952 34 Sheets-Sheet 7

GRANT C. ELLERBECK
INVENTOR
BY Robyn Wilcox
ATTORNEY

Aug. 14, 1956 G. C. ELLERBECK 2,758,789

MULTI-PURPOSE REGISTERS

Filed Nov. 29, 1952 34 Sheets-Sheet 8

GRANT C. ELLERBECK
INVENTOR
BY Robyn Wilcox
ATTORNEY

Aug. 14, 1956 G. C. ELLERBECK 2,758,789

MULTI-PURPOSE REGISTERS

Filed Nov. 29, 1952 34 Sheets-Sheet 9

GRANT C. ELLERBECK
INVENTOR
BY Robyn Wilcox
ATTORNEY

GRANT C. ELLERBECK
INVENTOR
BY [signature]
ATTORNEY

Aug. 14, 1956 G. C. ELLERBECK 2,758,789

MULTI-PURPOSE REGISTERS

Filed Nov. 29, 1952 34 Sheets-Sheet 11

GRANT C. ELLERBECK
INVENTOR
BY Robyn Wilcox
ATTORNEY

Aug. 14, 1956 G. C. ELLERBECK 2,758,789

MULTI-PURPOSE REGISTERS

Filed Nov. 29, 1952 34 Sheets-Sheet 12

GRANT C. ELLERBECK
INVENTOR
BY
ATTORNEY

GRANT C. ELLERBECK
INVENTOR
BY Robyn Wilcox
ATTORNEY

Aug. 14, 1956 G. C. ELLERBECK 2,758,789

MULTI-PURPOSE REGISTERS

Filed Nov. 29, 1952 34 Sheets-Sheet 14

GRANT C. ELLERBECK
INVENTOR
BY Rolyn Wilcox
ATTORNEY

Aug. 14, 1956 G. C. ELLERBECK 2,758,789
MULTI-PURPOSE REGISTERS
Filed Nov. 29, 1952 34 Sheets-Sheet 15

GRANT C. ELLERBECK
INVENTOR
BY Robyn Wilcox
ATTORNEY

GRANT C. ELLERBECK
INVENTOR
BY Robyn Wilcox
ATTORNEY

Aug. 14, 1956 G. C. ELLERBECK 2,758,789

MULTI-PURPOSE REGISTERS

Filed Nov. 29, 1952 34 Sheets-Sheet 17

GRANT C. ELLERBECK
INVENTOR
BY Rolyn Wilcox
ATTORNEY

Aug. 14, 1956 G. C. ELLERBECK 2,758,789

MULTI-PURPOSE REGISTERS

Filed Nov. 29, 1952 34 Sheets-Sheet 18

GRANT C. ELLERBECK
INVENTOR

BY Rolyn Wilson
ATTORNEY

GRANT C. ELLERBECK
INVENTOR
BY Robyn Wilcox
ATTORNEY

GRANT C. ELLERBECK
INVENTOR
BY Robyn Wilcox
ATTORNEY

Aug. 14, 1956 G. C. ELLERBECK 2,758,789

MULTI-PURPOSE REGISTERS

Filed Nov. 29, 1952 34 Sheets-Sheet 21

GRANT C. ELLERBECK
INVENTOR
BY Robyn Wilcox
ATTORNEY

Aug. 14, 1956 G. C. ELLERBECK 2,758,789

MULTI-PURPOSE REGISTERS

Filed Nov. 29, 1952 34 Sheets-Sheet 22

GRANT C. ELLERBECK
INVENTOR
BY Robyn Wilcox
ATTORNEY

Aug. 14, 1956 G. C. ELLERBECK 2,758,789

MULTI-PURPOSE REGISTERS

Filed Nov. 29, 1952 34 Sheets-Sheet 23

GRANT C. ELLERBECK
INVENTOR
BY Robyn Wilcox
ATTORNEY

GRANT C. ELLERBECK
INVENTOR
BY Robyn Wilcox
ATTORNEY

Aug. 14, 1956 G. C. ELLERBECK 2,758,789

MULTI-PURPOSE REGISTERS

Filed Nov. 29, 1952 34 Sheets-Sheet 25

GRANT C. ELLERBECK
INVENTOR
BY Rolyn Wilcox
ATTORNEY

GRANT C. ELLERBECK
INVENTOR
BY Robyn Wilcox
ATTORNEY

GRANT C. ELLERBECK
INVENTOR
BY Robyn Wilcox
ATTORNEY

Aug. 14, 1956 G. C. ELLERBECK 2,758,789

MULTI-PURPOSE REGISTERS

Filed Nov. 29, 1952 34 Sheets-Sheet 28

GRANT C. ELLERBECK
INVENTOR

BY Rolyn Wilcox
ATTORNEY

GRANT C. ELLERBECK
INVENTOR

BY Robyn Wilcox
ATTORNEY

GRANT C. ELLERBECK
INVENTOR
BY Robyn Wilcox
ATTORNEY

Aug. 14, 1956 G. C. ELLERBECK 2,758,789

MULTI-PURPOSE REGISTERS

Filed Nov. 29, 1952 34 Sheets-Sheet 31

GRANT C. ELLERBECK
INVENTOR

BY Carlyn Hillcox
ATTORNEY

MULTI-PURPOSE REGISTERS

GRANT C. ELLERBECK
INVENTOR
BY Robyn Wilcox
ATTORNEY

Aug. 14, 1956 G. C. ELLERBECK 2,758,789

MULTI-PURPOSE REGISTERS

Filed Nov. 29, 1952 34 Sheets-Sheet 33

GRANT C. ELLERBECK
INVENTOR
BY Robyn Wilcox
ATTORNEY

Aug. 14, 1956 G. C. ELLERBECK 2,758,789

MULTI-PURPOSE REGISTERS

Filed Nov. 29, 1952 34 Sheets-Sheet 34

GRANT C. ELLERBECK
INVENTOR
BY Robyn Wilcox
ATTORNEY

United States Patent Office 2,758,789

Patented Aug. 14, 1956

2,758,789

MULTI-PURPOSE REGISTERS

Grant C. Ellerbeck, San Leandro, Calif., assignor to Friden Calculating Machine Co., Inc., a corporation of California Application November 29, 1952, Serial No. 323,190

40 Claims. (Cl. 235—63)

My invention relates to calculating machines and more particularly to an improved mechanism for performing automatic division and multiplication. The invention is especially useful in connection with the type of machine disclosed in the Patent No. 2,229,889 issued to Carl M. F. Friden, January 28, 1941.

It is an object of my invention to provide in a calculating machine, improved automatic division mechanism which will perform division problems rapidly in a minimum number of machine cycles.

Another object of my invention is to provide a calculating machine having improved means for performing plural order operations automatically.

Another object of my invention is to provide an improved automatic division mechanism in which the quotient is positively entered simultaneously in both the accumulator and the revolutions counter.

Another object of my invention is to provide an improved automatic division mechanism in which the quotient is simultaneously entered positively in the accumulator and negatively in the revolutions counter.

Another object is to provide an automatic division mechanism of an improved type in which the quotient is positively entered in the accumulator only, while the revolutions counter is effectively disabled to receive a quotient.

Another object of my invention is to provide a machine of the character described having a means for entering a quotient in the accumulator, which means is thereafter effective to control the transfer of the quotient to the revolutions counter for accumulation therein.

Another object of the invention is to provide an improved calculating machine in which the computation $$\left(\frac{a}{b}\times c\right)$$

may be performed with a minimum number of machine operations, thereby registering the product in the accumulator and the quotient in the revolutions counter.

Another object is to provide a machine of the character described having improved mechanism for squaring or multiplying a value, such as a quotient, by itself with one keyboard entry of the value.

A further object of the invention is to provide a calculating machine with an improved automatic division mechanism for causing registration of the quotient in the accumulator and the revolutions counter, or in the accumulator alone whereby the quotient, thus entered in the accumulator, becomes operative as a multiplier with the resulting product being registered in the accumulator and the quotient or multiplier being transferred to the revolutions counter.

Another object of the invention is to provide an improved calculating machine in which products are automatically registered in predetermined dials of the accumulator and thereafter automatically accumulated in the revolutions counter.

A further object of my invention is to provide automatic means for omitting a selected number of digits to the right of the decimal when transferring a product from the accumulator to the revolutions counter for accumulation therein, i. e., only the transfer of the integer will be effected.

Another object of the invention is to provide an improved calculating machine in which the computation $$\left(\frac{ab}{c}\right)$$

may be performed in a simplified and expeditious manner, with the multiplier registered in the revolutions counter dials and the resulting quotient appearing only in the accumulator dials.

A further object of the invention is to provide an improved calculating machine in which the computation $$\left(\frac{ab}{c}\right)$$

may be performed simply and easily with a resulting quotient registered in the accumulator and thereafter transferred to the revolutions counter for accumulation therein.

Another object of my invention is the provision of an automatic indicator for determining the ordinal entry of the multiplicand in the keyboard as determined by the number of digits in the multiplier, wherein the product will invariably be registered in predetermined dials of the accumulator for use as a subsequent multiplier.

Another object of the invention is to provide a calculating machine with an improved mechanism for performing the function of $(a\times b\times c)$, wherein the product of "$ab$" automatically becomes the multiplier for "$c$" with the registering of the resulting product in the accumulator and the product of "$ab$" indicated in the revolutions counter.

It is an object of my invention to provide in a calculating machine improved automatic division mechanism which will perform division problems rapidly in a minimum number of machine cycles and cause the quotient to be entered into the accumulator while the dividend is being reduced to zero. This improvement enables an electrical read-out of the quotient thus entered, whereas the read-out electrically from the revolutions counter is not at all practical. At the present time there are machines of the character described which function to read-out electrically all values entered into the accumulator. However, the only means of registering a quotient in the accumulator, heretofore, has been to enter the quotient in the keyboard and thereafter transfer the value to the accumulator.

The foregoing objects enable the performance of many important functions of a calculating machine which heretofore have required many and various operations to arrive at the desired result. For example, the automatic accumulation of quotients in one register with the registration of each current quotient in a second register; selectively acquiring a positive and negative quotient simultaneously, or suppressing a quotient entry in the one register while the quotient is always registered positively in the second register; the use as a multiplier of any value or subtotal registered in predetermined dials of the accumulator resulting from an addition, subtraction, multiplication or division operation; and the use of the mechanism of my invention as a squaring device wherein the root is set in the keyboard for entry into predetermined dials of the accumulator, and depression of a control key registers the radicand in the accumulator. By this same means a quotient in the accumulator may be duplicated in the keyboard and the depression of a control key effects the registration of the radicand. Each of these functions may be performed on the calculating machine disclosed herein more simply and expeditiously than ever before possible with any business machine.

Other objects will appear from the following description of a preferred embodiment of the invention as illustrated by the accompanying drawings in which.

The invention is disclosed as embodied in a calculating machine having actuating mechanism of the unidirectional continuous drive cycle type wherein all power driven operations are effected by engagement and disengagement of a single clutch providing the only path of power flow from the motor of the machine to the motor driven parts thereof. Calculating machines of this construction are disclosed in the patents to Carl M. F. Friden, No. 2,229,889 which issued January 28, 1941; No. 2,327,981 which issued August 31, 1943; No. 2,371,752 which issued March 20, 1945, and No. 2,399,917 issued to Carl M. F. Friden et al., May 7, 1946.

*General description*

Figure 1:
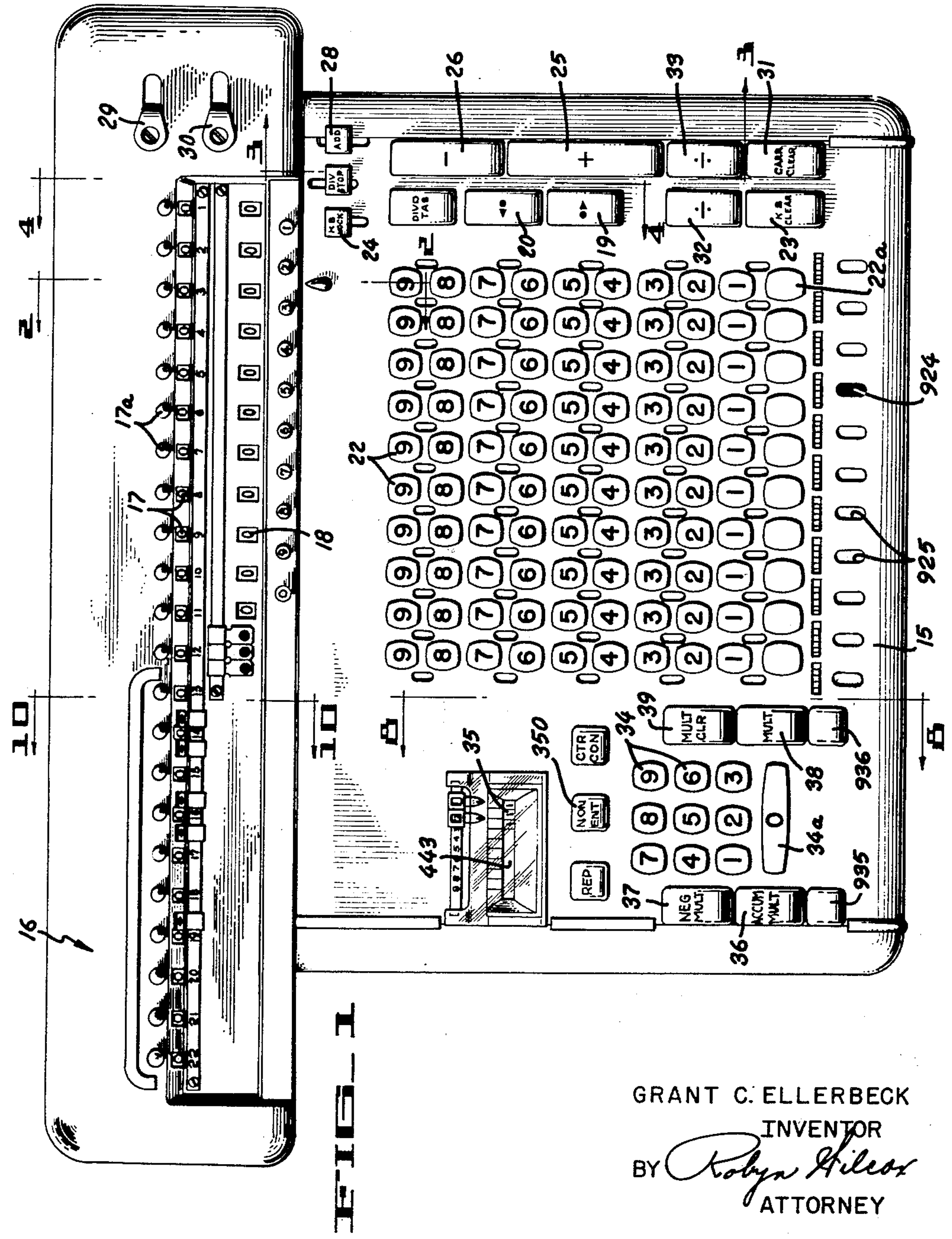
Fig. 1 is a plan view of the calculating machine embodying the invention.

The invention is described in a preferred form as adapted to a Thomas type calculating machine. Referring to Fig. 1, the machine includes a body 15 in which the actuating, selecting, and control mechanisms are mounted, and carriage 16 which is mounted for endwise shifting movement transversely of body 15 and which carries numeral wheels 17 and 18 of the accumulator and revolutions counter, respectively. Numeral wheels 17 are provided with projecting twister handles or twirlers **17*a* to provide for individual setting thereof. Carriage 16 can be shifted by power in either direction by manipulation of respective shift keys 19, 20,** through mechanism described hereinafter.

Values are entered into the machine by depression of numeral keys 22 of the usual keyboard in the various ordinal rows thereof; keys 22 being releasable individually by depression of ordinal clear keys **22*a*, or collectively by depression of keyboard clear key 23. The value set into the keyboard may be locked therein by proper setting of keyboard lock lever 24. Values introduced into the machine may be registered additively or subtractively on accumulator numeral wheels 17 by depression of plus key 25 or minus key 26, respectively. If desired, add key 28** may be moved forwardly to cause clearing of the keyboard in the usual manner after a single registration in the accumulator.

Values registered in numeral wheels 17 and 18 can be erased, i. e., the registers can be zeroized, by manipulation of respective manually operable resetting knobs 29, 30, or by power through depression of return and clear key 31. Depression of key 31 first effects return of carriage 16 to the farthest left position and subsequently effects resetting of the accumulator 17 and the counter 18, either or neither, depending upon the setting of resetting knobs 29 and 30, which are adjustable to control such selective resetting in a manner later described.

The machine is adapted to perform automatic plural order division by means of conventional construction including division starting control key 32 and a quotient sign character control key 33. Automatic predetermined multiplication can also be performed by depression of multiplier selection keys 34 to set up the desired multiplier figure as indicated on dials 35, and by depression of one of multiplication keys 36, 37 or 38, to start the multiplying operation. If accumulative multiplication is desired, the operation is begun by depression of accumulative multiply key 36 which does not effect an operation of the resetting mechanism, whereas in a simple multiplication operation when an accumulation of products is not desired, the depression of key 38 will effect a register resetting operation. If it is desired to correct an erroneously entered multiplier figure, multiplier correction key 39 may be depressed to zeroize the multiplier selection mechanism. The automatic division and multiplying mechanisms and their associated control means form the principal subject matter of the instant invention, and are described in more detail later.

With the above general organization of parts in mind, various of the above noted mechanisms will be described in detail insofar as being necessary or desirable to an understanding of the present invention, it being understood that the mechanism which is not described fully may be of conventional construction, such as that disclosed in the patents to Friden, No. 2,229,889, No. 2,371,-752 and No. 2,399,917.

*Selecting and actuating mechanism*

Within casing 15, the frame includes left and right side plates 45, 46 (Figs. 2 and 4) which are suitably mounted on base 13 and are interconnected by various crossframe members including transverse brackets 47, 48, 49 and 50, for supporting various mechanisms including the selecting and actuating mechanism.

The values to be introduced into accumulator numeral wheels 17 are selected by means of a plurality of similar orders of selecting mechanism associated with numeral keys 22. For this purpose, each bank or order of keys 22 (Fig. 2) cooperates with a pair of similar parallel spring-urged value selecting slides 54 mounted for endwise movement by a suitable supporting linkage and extending through suitable slots in crossframe plate 49. Each slide 54 is provided with cam surfaces of varying inclination for cooperation with suitable pins on certain keys 22 to effect a differential movement of slide 54 on depression of key 22. One slide 54 of each order cooperates with the "1" to "5" keys 22 of a bank, while the other slide 54 of an order cooperates with the "6" to "9" keys 22 of the bank.

Each bank of keys 22 (Fig. 2) has a latching slide 55 of conventional construction associated therewith to latch any depressed key 22 releasably in depressed position against the tension of a spring associated therewith. To release the depressed numeral keys, the latching slides 55 may be operated in any convenient manner by zero and clear keys **22*a* and 23, and by power as controlled by the forward movement of add key 28**.

Each selecting slide 54 (Fig. 2) is connected at its rear end with a ten tooth gear 56 slidably and nonrotatably mounted on longitudinal square shaft 57, whereby movement of slide 54 serves to position the associated gear 56 on shaft 57 with respect to stepped teeth of the associated actuator drum 58 in accordance with the value of the depressed numeral key 22. A pair of actuator drums 58 for adjacent orders of the machine are mounted on each longitudinal actuating shaft 61, which is suitably journalled in cross plates 49 and 51, and has a suitable bevelled gear connection with transverse drive shaft 62. Shaft 62 is operable cyclically in a single direction from clutch control driving means as described hereinafter to provide the only path of power flow from the motor.

Figure 2:
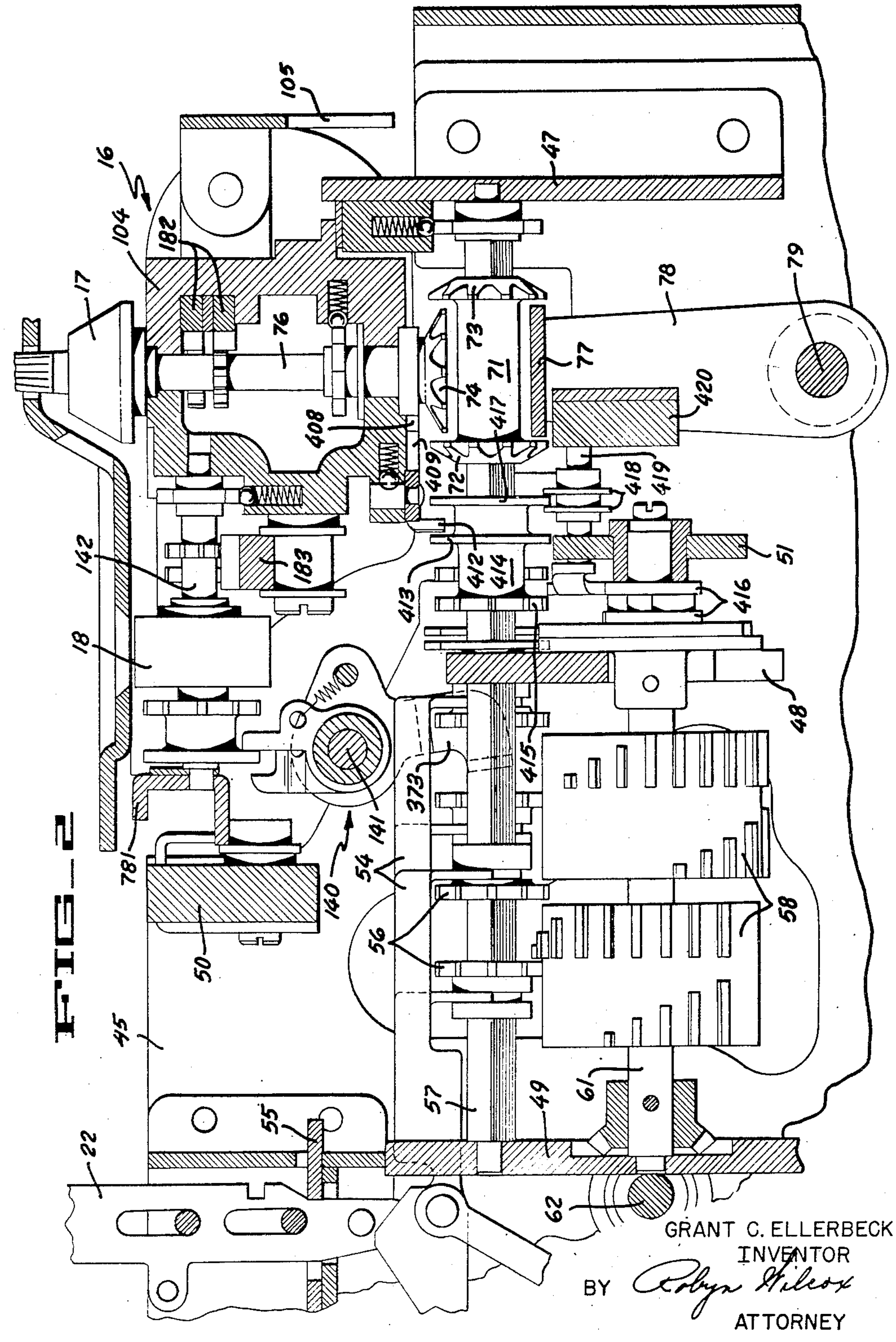
Fig. 2 is a fragmentary longitudinal sectional elevation of the machine taken on the line 2—2 in Fig. 1.

As seen in Fig. 2, the pair of square shafts 57 associated with each actuating shaft 61 are positioned above and to either side thereof, while the sets of gears 56 on respective square shafts 57 are offset longitudinally of the machine for cooperation with the similarly offset actuating cylinders or drums 58. By the above arrangement and upon each rotation of the actuating means, a selected number of increments of movement can be imparted to each shaft 57 by the associated actuating drum 58 in accordance with the adjusted position of gears 56.

Each shaft 57 (Fig. 2) is suitably journalled in cross plates 47, 48 and 49, and between plates 47 and 48 has associated therewith, selectively settable plus-minus gears for driving an aligned numeral wheel 17. Inasmuch as ten ordinal register numeral wheels 17 are invariably aligned with the shafts 57 of the selection mechanism, these ten orders may be considered to be the inboard orders whereas all higher orders of the register will constitute the outboard orders. The plus-minus gears in each order of the machine include a spool 71 slidably and nonrotatably mounted on shaft 57 and having opposed ten tooth bevelled gears 72, 73, selectively settable for engagement with gear 74 on numeral wheel shaft 76. The engagement of gears 72 or 73 with gear 74 is controlled by a plus-minus gate 77 which extends transversely of the machine between each set of plus-minus gears 72, 73, and is mounted by similar spaced arms 78 on transverse shaft 79, which is suitably journalled in side plates 45 and 46. Shaft 79 is controlled in a manner hereinafter described to determine positive registration by meshing gears 72 with gears 74, and negative registration by meshing gears 73 with gears 74. In the neutral position shown in Fig. 2, in which gears 72 and 73 may be held normally by suitable spring-urged centralizing means associated with strap 77, carriage shifting can be effected. During both additive and subtractive registration of values in numeral wheels 17, suitable transfer mechanism of conventional construction may be operative to effect a tens-transfer as disclosed, for example, in said Patent No. 2,229,889.

*Plus and minus keys and drive mechanism*

Figure 3:
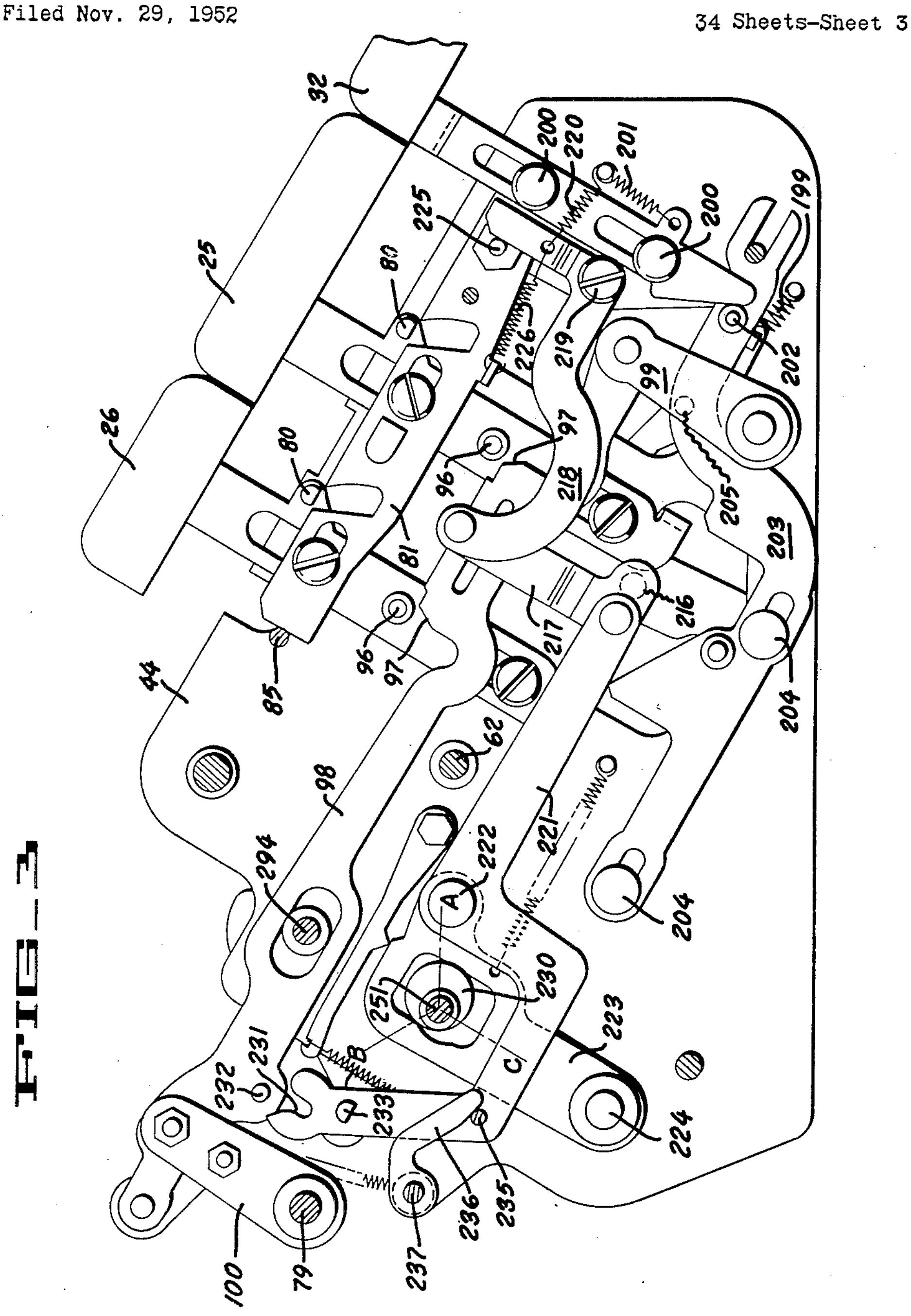
Fig. 3 is an elevational view of the right-side control plate taken on the plane 3—3 in Fig. 1.

Means are provided for selectively determining positive or negative registration on the numeral wheels in the form of plus key 25 (Figs. 1 and 3) and minus key 26 which are slidably mounted on control plate 44. Depression of either of keys 25, 26, serves to engage the clutch, close the motor circuit, and select a sign character of the registration. To enable the drive, keys 25, 26 have respective pins 80 in operative relation with suitable cam surfaces on clutch actuating slide 81 mounted for endwise movement on plate 44.

Figure 4:
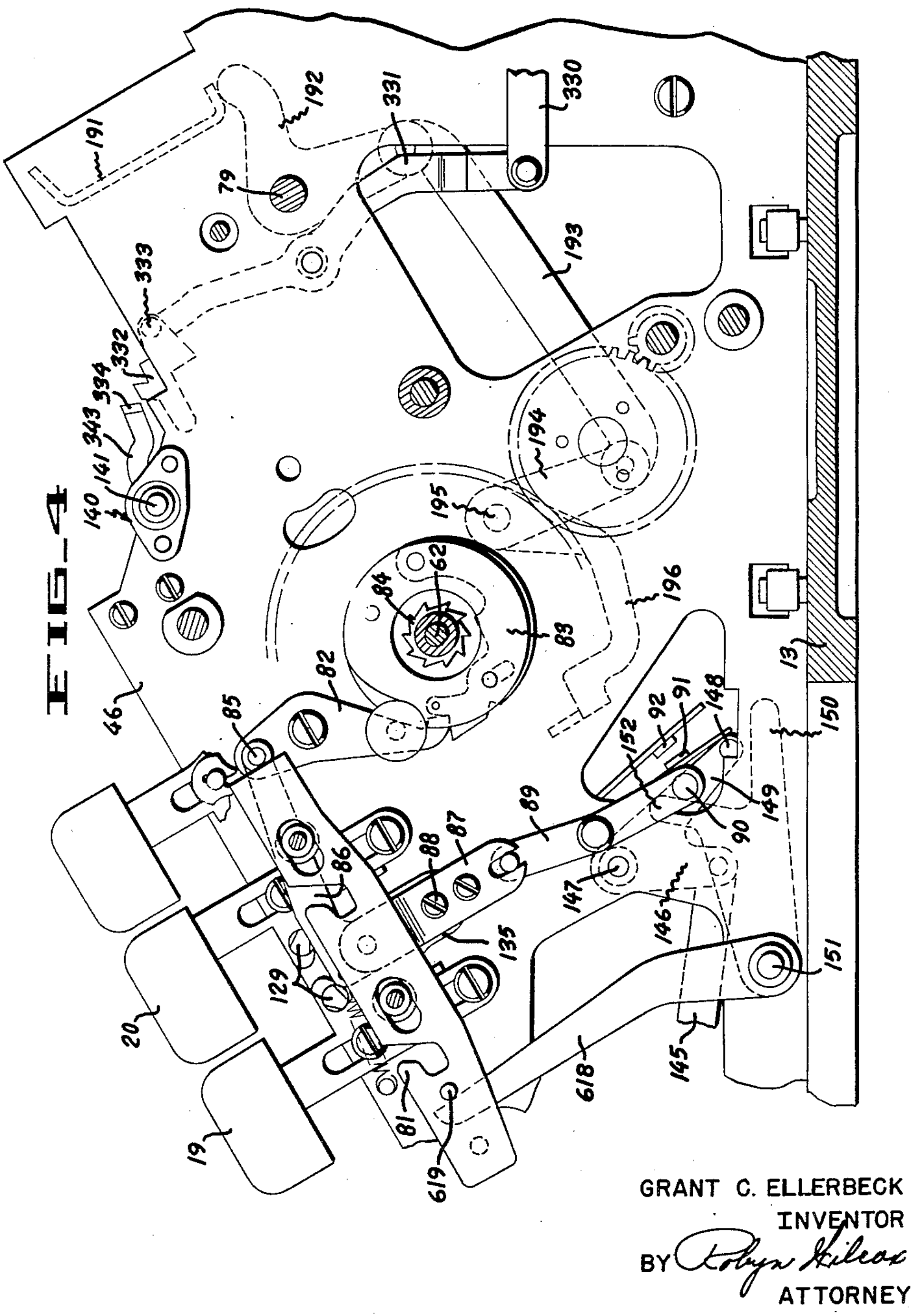
Fig. 4 is a fragmentary elevational view of the right-side frame showing certain of the control mechanisms and with the carriage removed, the view being taken on the line 4—4 of Fig. 1.

To effect control of the clutch by such movement, pin 85 on the upper arm of clutch control lever 82 (Fig. 4) abuts the rear end of the slide 81, so that rearward movement of slide 81 oscillates lever 82 in a clockwise direction as viewed in Fig. 4, to release clutch dog 83 for engagement with ratchet 84 on shaft 62. To close the motor circuit, the oscillation of lever 82 through link 86 rocks lever 87 clockwise about its pivot 88 on side frame 46. Lever 89 also pivoted on side frame 46 has a connection at its upper end with lever 87 for rocking movement thereby, and at its lower end has a suitable insulated pin 90 in overlapping relation with spring-mounted contact 91 normally spaced from similar contact 92. To determine the sign character of the registration, plus and minus keys 25 and 26 (Fig. 3) have respective rollers 96 disposed in operative relation with the opposed cam surfaces 97 on plus-minus slide 98. Slide 98 is mounted for endwise movement at its front end on an arm 99 pivoted on side frame 44 and at its rear end on arm 100 pinned to shaft 79. It will be remembered that shaft 79 controls the movement of the plus-minus gate 77 so that forward movement of the plus-minus slide 98 will engage the gears 73 with the gears 74 for a negative registration, and rearward movement of the slide 98 engages the gears 72 with the gears 74 for a positive registration.

*Carriage shift mechanism*

Means are provided for shifting the carriage in either direction from one ordinal position to another by power-driven means controlled by manually operable keys. The power-driven means preferably comprises elements of the actuating means for entering values into the accumulator register. Carriage 16 (Figs. 1, 5, and 7) includes frame 104 having toothed shift rack 105 extending along the rear side thereof with its end suitably supported on frame 104. The slots 106 at either end of the rack are formed in part by respective yieldable pawls 107 having springs 108 associated therewith. Slots 106 are adapted for engagement by opposite shift pins 109 (Fig. 6) on shift gear 110 suitably journalled on cross plate 47. Shift gear 110 can be rotated selectively in either direction through idler gears (not shown) to shift the carriage through any desired number of ordinal spaces, each 180° rotation of gear 110 effecting one ordinal spacing of the carriage. Shift gear 110 is centralized by means of a cam 112 pivotally mounted on crossframe member 47.

In order to rotate shift gear 110 selectively in either direction, the two right-hand actuating shafts 61 (Fig. 6) are extended and are provided with similar controllable drive connections with gear 110. Each connection includes a collar 113 fixed on the associated shaft 61 adjacent the end thereof and having opposite recesses slidably engaged by corresponding dogs 114 of a shiftable collar 115, which is mounted for sliding movement at the end of shaft 61. Respective collars 115 have smaller dogs 116 for operative engagement with corresponding slots in gear sleeves 117, 118. Gear sleeve 117 is suitably journalled in cross plate 47 and bracket 119 secured in spaced relation thereto, and carries gear 120 which has a right carriage shift engagement with the shift gear 110. Similarly gear sleeve 118 has gear 121 which meshes with an idler gear (not shown) to drive gear 110 for a left carriage shift and has a similar controllable drive connection with an actuating shaft 61. Thus, by selective shifting of collars 115 to establish a drive connection, rotation of one of actuating shafts 61 may be utilized to determine rotation of shift gear 110 in a selected direction to effect shifting of carriage 16 in either direction.

Similar mechanisms are provided to control shifting of collar 115. Each mechanism includes a fork 125 (Fig. 6) at the rear end of respective rods 126, 127 engaging a suitable annular groove in the associated collar 115. Each of the rods 126, 127 is suitably mounted on the frame for endwise movement and is spring-urged to the position shown in Fig. 6 by spring means 128.

Shift keys 19 and 20 (Fig. 4) for operating the respective controlling rods 126 and 127, have respective pins 129 operative in slots in the side frame 46 for cooperation with respective levers 130 and 131. Lever 130 (Fig. 6) is secured to sleeve 133 rotatably mounted on a shaft 132 while lever 131 is secured to transverse shaft 132. Both shaft 132 and sleeve 133 are provided with respective depending arms 134 having their lower ends disposed in front of associated rods 126, 127, respectively, to determine operation thereof upon depression of the associated shift key.

To enable the drive by depression of the shift keys, the respective pins 129 (Fig. 4) also overlie suitable cam surfaces of cam plate 135 secured on lever 87, so that depression of a shift key rocks lever 87, clutch control lever 82, and circuit control lever 89, to thereby engage the clutch and close the motor circuit as described in connection with plus and minus keys 25, 26.

*Revolutions counter mechanism*

The revolutions counter may comprise numeral wheels 18 (Figs. 1 and 2) mounted on shafts 142, effective to register the number of actuations of accumulator numeral wheels 17. The numeral wheels 18 (Fig. 2) are actuated by means of a conventional actuator 140 mounted on a shaft 141 which is rocked conventionally from drive shaft 62 through a spring connection in a clockwise direction from the position shown in Fig. 2 into operative engagement with the aligned numeral wheel 18, and then is translated axially to effect entry of the digit. When no count is to be made, the clockwise rocking movement may be restrained by means to be hereinafter disclosed in connection with the automatic division operation and the automatic multiplication operation.

*Resetting mechanism*

Means are provided for restoring the machine to normal condition between successive operations by shifting the carriage to a predetermined position and by then effecting zero resetting of either the accumulator or the revoltuions counter, or both of these registers, as determined by the manually settable knobs 29 and 30, the operation being carried out by power-driven means under control of the register return and resetting key 31. This mechanism is of the general type disclosed in the patent to Anthony B. Machado, No. 2,363,737, which was issued November 28, 1944.

Return and resetting key 31 (Fig. 1) is operative on depression thereof, to establish a drive connection between the power-driven resetting mechanism and the actuating means and to initiate a carriage shifting and register resetting operation. Key 31 is mounted in a suitable manner on side plate 46 for endwise movement thereon, and is suitably connected by linkage including link 145 (Fig. 4) and arm 146 to effect a clockwise rocking movement of shaft 147 (Figs. 4 and 6) upon depression of the key.

To engage the drive, a pin 148 on an arm 149 integral with arm 146 engages an arm 150 pivoted on shaft 151. Arm 150 has an upright finger 152 engaging the pin 90 on lever 89 so that levers 89 and 87 are operated to engage the clutch and close motor circuit contacts 91, 92, with the rocking of shaft 147. Before the drive begins, key 31, through the rocking of shaft 147, also controls the engagement of shift and resetting drive connections.

To initiate the carriage return determined by depression of key 31, shaft 147 carries arm 153 (Figs. 6 and 8) having pusher link 154 pivoted thereon at 155, and urged downwardly by spring 156. Spring 156 urges notched end 157 of link 154 into engagement with pusher rod 158. Pusher link 154 carries a pin 159 abutting depending arm 160 which is secured to shaft 132. Thus, the clockwise rotation of shaft 147 through pusher link 154 and pin 159 thereon, rotates shaft 132 and arm 134 counter-clockwise to engage the left carriage shift mechanism.

The rocking of shaft 147 upon depression of key 31, also serves to enable the drive connection from the actuating means to the resetting drive means mounted on the transverse bracket 47 of the machine for operation in a conventional manner. For this purpose, shaft 147, which is rocked upon depression of key 31, moves the pusher link 154 and therefore pusher rod 158 rearward against the urgency of a spring 136. At its rearward end, pusher rod 158 (Fig. 6) carries a fork 164 operatively engaged with the shiftable toothed collar 165 similar to collars 115 of the shift mechanism and similarly mounted on one of actuating shafts 61. The dogs of collar 165 are engageable with the slotted end of sleeve 166 suitably journalled in bracket 47 and plate 167 secured thereon, with an extended portion of shaft 61 serving as a hub therefor. Sleeve 166 carries a cam 168 (Fig. 5) which is engaged by a roller 169 on arm 170 pivoted at 171 on bracket 167 and urged toward cam 168 by a spring (not shown).

The upper end of arm 170 (Fig. 5) is slotted to engage a roller 172 suitably journalled on a reciprocating slide 173 mounted for endwise movement on the bracket 47 by guides 174. When carriage 16 is in its rightmost position, or leftmost position as viewed in Fig. 1, an upstanding member 175 integral with slide 173 is in operative relation with arm 176 pivoted on the resetting slide 177. Slide 177 has an L-shaped cross-section and is mounted for endwise sliding movement on carriage 16 by spaced studs 178. As described later, reciprocation of slide 173 can be utilized to reset either or both of the registers to zero. It can be seen that upon shifting of the carriage to its extreme left-hand position, i. e., two ordinal positions to the right of that shown in Fig. 5, the movement of slide 173 to the left will cause the upstanding member 175 to engage the end of arm 176 to reciprocate resetting drive slide 177. The reciprocation of slide 177 is effected in the first cycle during which the carriage is in the left end position.

Slide 177 may be operatively related to either or both of resetting rack bars 182 and 183 (Figs. 2 and 7) of the accumulator and counter, respectively, by the adjustment of settable control means to adjust the connections therebetween. For this purpose one end of slide 177 is provided with lateral extension 184 projecting transversely of bars 182 and 183, and provided with respective pins 185 and 186, providing abutments for driving the rack bars in a well-known manner. Preferably, the settable control means for engagement with pins 185 and 186, comprise the operating knobs 29 and 30 for bars 182 and 183 of similar construction. Knob 29 (Figs. 1 and 7) is pivoted on post 187 secured in upright position at one end of rack bar 182, while knob 30 is pivoted on post 188 secured in upright position at one end of rack bar 183. Knob 29 carries connecting arm 189 which has a seat for selective engagement with pin 185 on slide 177. Knob 30 is similarly constructed being provided with connecting arm 190 for engagement with pin 186 on extension 184 of the slide 177.

From the foregoing it is seen that by selective adjustment of connecting arms 189, 190, operation of either or both of rack bars 182, 183, by slide 177 can be predetermined, so that both the accumulator and the revolutions counter, or either of them, will be reset to zero upon depression of key 31.

Figure 5:
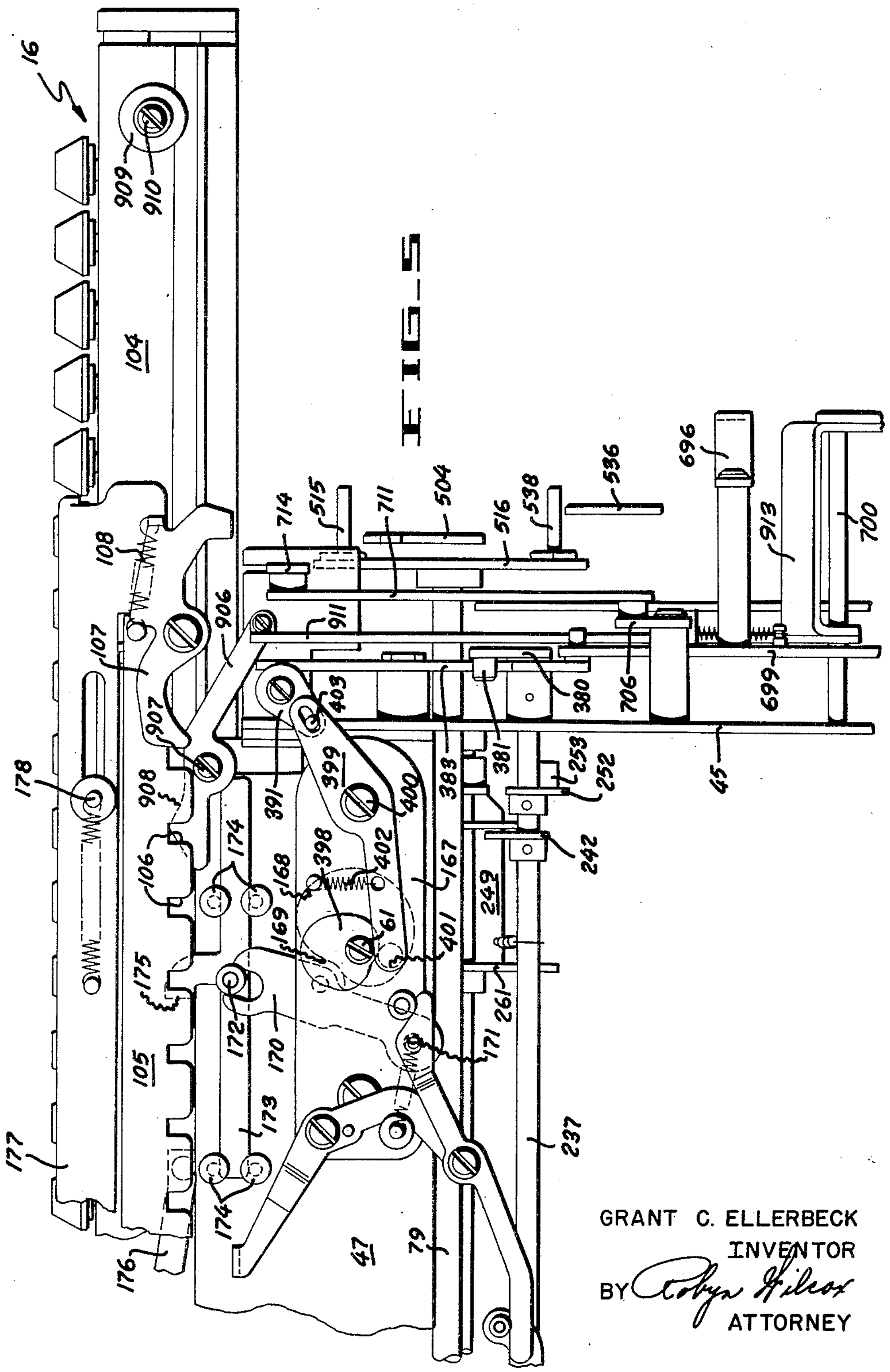
Fig. 5 is a fragmentary elevational view of the rear of the machine.

Key 31 may be latched in depressed position during shifting of the carriage to its end position, if displaced therefrom, and the latch may be released during the first cycle of operation of the actuating means when in said end position as disclosed in the patent to Anthony B. Machado, No. 2,363,737, issued November 28, 1944, under control of a similar override pawl 107 (Figs. 5 and 7).

Figure 6:
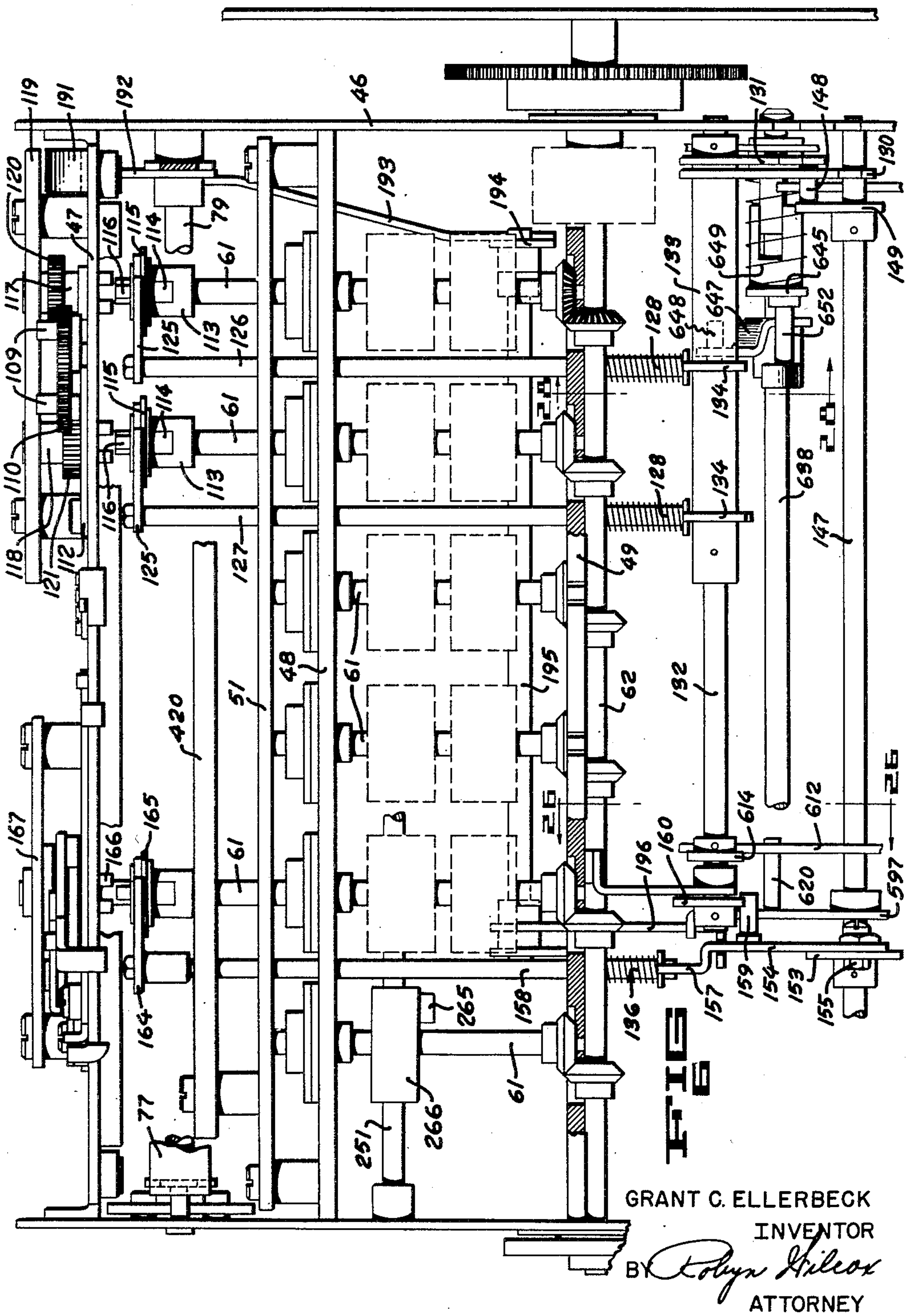
Fig. 6 is a plan view of the machine taken from beneath the keyboard to show the right and left shift mechanisms, the zero resetting mechanism and their respective control linkages.
Figure 7:
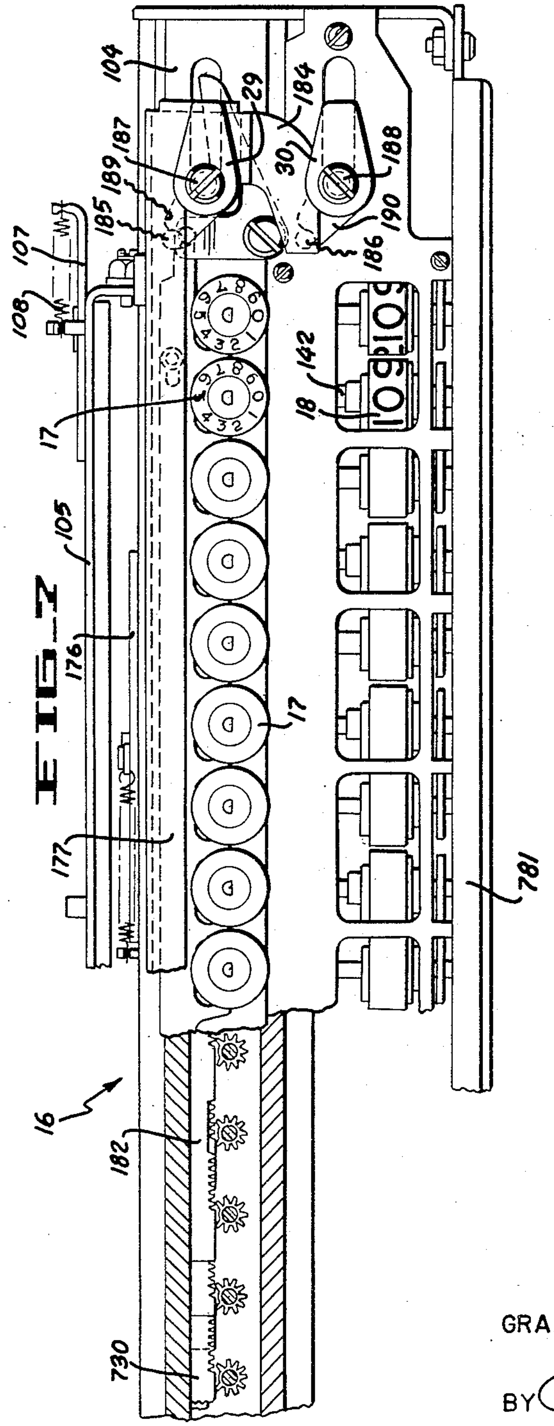
Fig. 7 is a plan view of the carriage with a portion thereof broken away to show the separation in the zero resetting racks.

The override pawl similar to 107 (Fig. 5) and indicated in Fig. 7, also serves to interrupt operation of the shift and resetting drive connections after the first cycle (resetting cycle) following the shifting operation. For this purpose, slide 191 (Figs. 4, 6, and 8) is mounted for endwise movement on bracket 47 for operation by the aforesaid pawl upon oscillation thereof by shift pins 109. Slide 191 overlies an arm of bellcrank 192 pivoted on shaft 79 journalled in side plate 46 and pivotally connected to a link 193, which is also pivotally connected to arm 194 depending from shaft 195 suitably mounted in the frame. Shaft 195 carries arm 196 underlying pusher link 154.

Thus, upon actuation of said override pawl during the resetting cycle, the above-described linkage operates through arm 196 (Fig. 8) to lift pusher link 154, which results in release of left shift pusher rod 127 and resetting pusher rod 158 through the urgency of respective springs 128 and 136, thereby causing disengagement of the shift and resetting drive connections.

With the use of the instant invention it becomes highly desirable to reset to zero only certain of the accumulator dials 17, thus making it possible to retain a value standing in the remaining dials. For this purpose the resetting rack 182 (Fig. 7) is split so that in an operation such as multiplication, only the values in the first or lower twelve dials are reset to zero. Means are provided for enabling this function of the clearing or zero resetting mechanism and will be described hereinafter in connection with the automatic multiplying mechanism.

*Automatic division mechanism*

The division mechanism is of the character disclosed in the aforementioned patent to Carl M. F. Friden, No. 2,229,889, and includes a manually operable starting control key 32 (Fig. 3) which is mounted for endwise sliding movement on the auxiliary control plate 44 by means of slots engaging studs 200 and is spring-urged upwardly by springs 201. At its lower end the key 32 is provided with a cam surface for engagement with a roller 202 carried by slide 203 mounted for endwise sliding movement by respective slots engaging respective studs 204 on control plate 44. Upon downward movement of division key 32 the slide 203 is moved to the left, as viewed in Fig. 3, against the urgency of its spring 199 and the roller 205 (Figs. 3 and 9), carried by slide 203 engages the end of a latch lever 206 which is pivoted at 207 on the control plate 44, and is spring-urged to active position by spring 208. Latch lever 206 has a shoulder thereon engaging a roller 209 for normally holding a spring-urged division setting member 210 in its inoperative position, member 210 being pivoted at 211 and being urged in a counter-clockwise direction by a relatively strong spring 212. Release of the latch 206 permits the spring 212 to rock the division setting member 210 and an integral upwardly extending arm 213 counter-clockwise for immediate engagement by a roller 214 on a driving gear 215 upon cycling of the machine, thereby restoring the setting member 210 to its latched position. A roller 216 carried by a link 217 (Fig. 3) underlies the setting member 210 for operative control thereby. Link 217 is pivotally connected between a bellcrank 218 pivoted at 219 and urged clockwise by spring 220 and a bellcrank 221 pivotally mounted at 222 on an arm 223 pivoted at 224 to the control plate 44. As fully explained in said patent, the position of arm 223 is controlled during division by the position of the eccentric cam 230, when the downward movement of link 217, caused by the release of setting member 210, operates through bellcrank 218 and a pin 225 on slide 81 to translate the slide to the left in Fig. 3, whereby the pin 85 is effective to operate clutch control lever 82 and circuit control 91, 92 to cause cycling of the machine. Pin 225 is maintained in operative relation to bellcrank 218 by a spring 226 for cooperation therewith. The clockwise movement of the bellcrank 221 is utilized to condition the machine for division as fully disclosed in said patent and for this purpose the notched end 231 of the bellcrank engages a pin 232 on the usual plus-minus controlling slide 98. Engagement of the notch 231 with the stud 232 translates the plus-minus slide 98 to the right as viewed in Fig. 3 and thereby rocks arm 100 and plus-minus gate shaft 79 clockwise to engage gears 73 with gears 74 (Fig. 2) for a subtractive operation. Thereafter the bellcrank 221 and plus-minus slide 98 come under the control of the eccentric cam 230, when upon an overdraft the cam 230 is rotated from position "A" to position "B" to condition the machine for an add cycle, and upon rotation from position "B" to position "C" the plus-minus gate 77 is moved to its neutral position for a shift cycle. Following which, the cam is rotated from position "C" again to position "A" when the divisor is again subtracted from the dividend in the next lower ordinally shifted position of the carriage.

With the initiation of automatic division, the bellcrank 221 is maintained in engagement with the plus-minus slide 98 by means of a latch pin 233 (Fig. 3) engaging latch lever 234 (Fig. 9) which is released in a conventional manner at the termination of the division operation when the carriage is in its leftmost position.

The well-known method of performing division is used, which comprises repeated subtraction until an overdraft occurs; correction of the overdraft and shifting of the dividend register to the next lower order where the process is repeated. The number of subtractions in each order is registered in the revolutions counter as the quotient, either positively or complementally as desired. The mechanism disclosed herein for performing division by the above method provides programmed operation of the machine under control of a program control device which, upon each overdraft in the dividend register, initiates a predetermined sequence of operations during uninterrupted cyclic operation of the actuating means. As will be more apparent later the structure provided herein provides for a minimum time consumed by a given division operation, as the drive for the actuating means is not stopped even momentarily from the beginning to the end of the operation, and as a minimum number of cycles of the actuating means is utilized during functioning of the program control device. The overdraft control mechanism will now be described briefly for a better understanding of the instant invention.

The division setting or conditioning lever 221 carries a pin 235 (Fig. 3) underlying an arm 236 secured on a transverse shaft 237 journaled in control plate 44 and left side frame 45. Intermediate its ends the shaft 237 has an arm 242 secured thereon having pin 243 disposed in slot 244 (Fig. 10) of link 245. Link 245 is pivotally supported at its upper end to a bracket 246 secured on the extended end of a conventional tens-transfer shaft 247, in the 12th order of the machine. Link 245 is urged to the inoperative position thereof shown in Fig. 10 by spring 248 which normally maintains the free end of link 245 below depending plate portion 249 of a lever member 250 rotatably and nonslidably mounted on shaft 251 of the program control device. Upon clockwise oscillation of bellcrank 221, pin 235 rocks arm 236, shaft 237 and arm 242 to lift the link 245 into operative position with respect to plate portion 249 of lever member 250. Shaft 237 also carries an arm 252 having a pin 253 underlying one arm of a two-arm lever 254 pivoted at 255 to side frame 45. The other arm of the lever 254 overlies a pin 256 on the lower extremity of a member 257 mounted for sliding movement on left side frame 45 by studs 258, and urged upwardly from the normal position shown in Fig. 10 by a spring 259. Clockwise rotation of shaft 237 upon initiation of an automatic division operation therefore moves the member 257 downwardly to its normally inoperative position, when displaced therefrom, to supersede the manually controlled counter block-out means to be described hereinafter.

The above described conditioning is effected entirely during rearward movement of setting slide 203. Thereafter, when the operator releases division key 32, slide 203 and key 32 are returned to normal position under the influence of their respective springs 199, 201 after the clutch is engaged and the circuit is closed as described above, to start the division operation.

When the machine operation begins, the divisor set in the keyboard is subtracted repeatedly from the dividend entered in the accumulator or dividend register with the carriage positioned in the usual manner to obtain the highest order digit of the quotient. When the divisor is subtracted once too often, the resulting overdraft causes forward movement of the stub shaft 247 (Fig. 10) in the 12th order of the machine after approximately 200° of the overdraft cycle. Such movement of shaft 247 is utilized through the overdraft control means to condition the machine for initiation of operation of the program control device, the actual initiation thereof, however, being effected by an element of the actuating means. Upon an overdraft, shaft 247 and link 245 (Fig. 10) move forwardly, and as link 245 has been moved into operative position with respect to plate portion 249 of member 250 with the clockwise rocking of shaft 237, member 250 is rocked in a clockwise direction as viewed in Fig. 10, against the influence of spring 260 which normally maintains tail 261 of member 250 against the shaft 237. Such clockwise movement of member 250 moves upwardly extending cam arm 264 into the path of a roller or pin 265 on a disk 266 which is secured on actuating shaft 61 of the highest order. Thus, the overdraft control means conditions the program control device for operation, such conditioning taking place after approximately 300° of the overdraft cycle.

Immediately after cam arm 264 is moved into the path of roller 265, it is engaged thereby to shift member 250 and shaft 251 laterally of the machine to start operation of the program control device. Thereafter, the program control device determines a predetermined sequence of operations including a correction of the overdraft, shifting of the register carriage to the next lower order, and resetting of the machine for subtraction.

Figure 9:
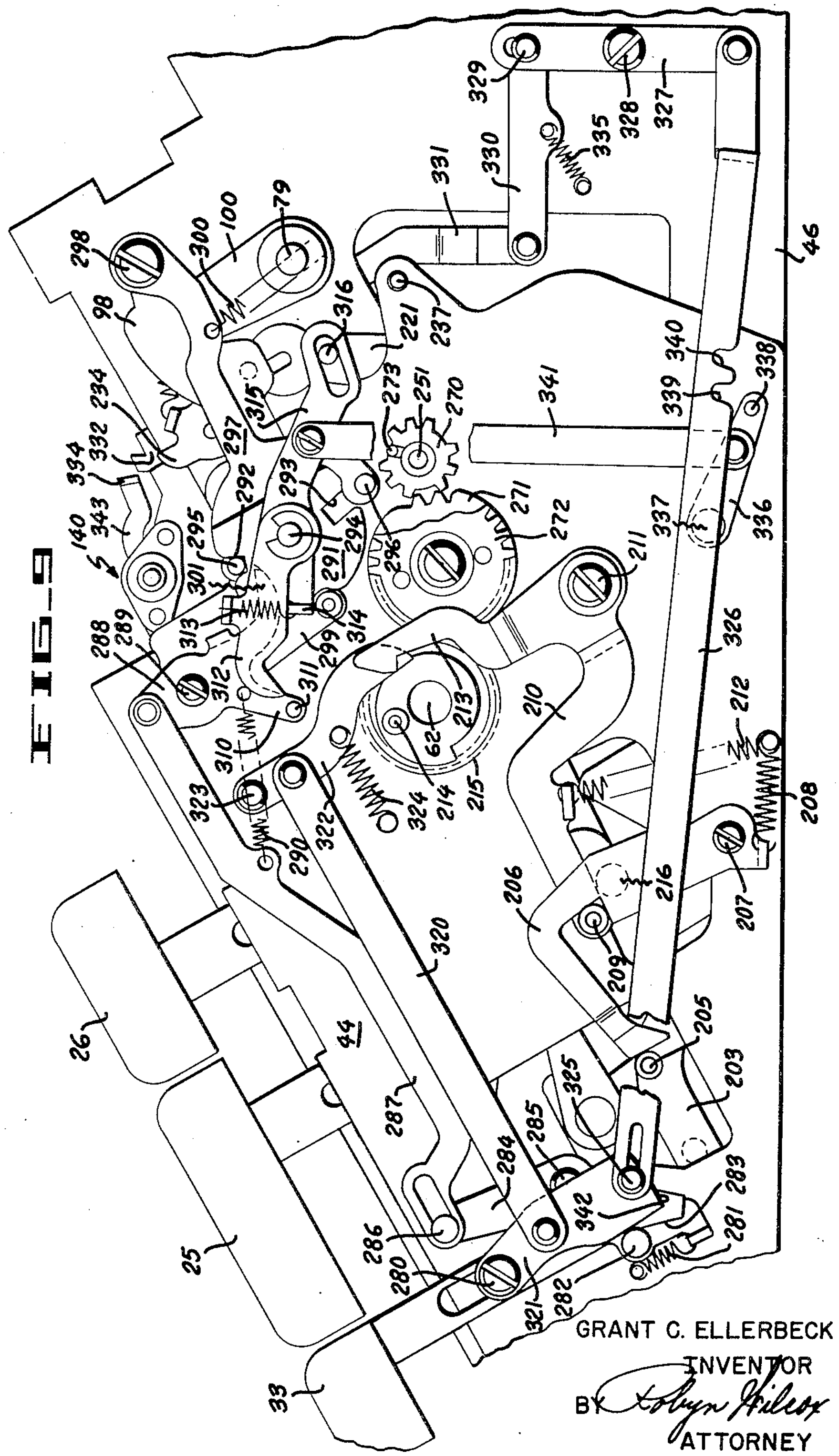
Fig. 9 is an elevational view of the right side of the machine.

The program control device, which, in the typical example shown, may comprise the shaft 251 and cam 230 thereon, exercises its control by virtue of intermittent rotation of certain parts thereof including shaft 251 during the overdraft cycle of the machine and the two succeeding cycles of the machine, after which the device is automatically disabled. To produce the intermittent movement of shaft 251, gear 270 (Fig. 9) is mounted on the end of shaft 251 which projects beyond the right side control plate 44. Gear 270 is normally in the inoperative position shown in Fig. 9, out of the path of cooperating mutilated gear 271 which is driven cyclically through gears 272 and 215 from drive shaft 62. Such an inoperative position is determined by a notch in gear 270 engaging a pin 273 on right side control plate 44. As seen in Fig. 9, gear 270 has three equally spaced sets of three teeth each for cooperation with a single set of three teeth provided on gear 271. Also as gear 272, and therefore gear 271, rotates in a counter-clockwise direction, as viewed in Fig. 9, its teeth are positioned to engage a set of teeth of gear 270 immediately before the end of a cycle. The arrangement is such therefore, that when gear 270 is projected into the path of gear 271 during a cycle of operation, gear 270 is rotated one-third revolution at the end of that cycle and also one-third rotation at the end of each of the two next succeeding cycles, being maintained in projected position by the engagement of pin 273 with the inner face of gear 270.

It will be recalled that upon an overdraft, cam arm 264 (Fig. 10) is moved into the path of roller 265 so that shaft 251 is moved laterally and gear 270 secured thereto is placed in operative relation with gear 271. Thus, the first one-third rotation of shaft 251 occurs just before the end of the overdraft cycle. This first one-third rotation of shaft 251 is utilized to change the setting of the machine from subtraction to addition so that the next cycle of the actuating means will cause a correction of the overdraft. As described previously, the eccentric cam 230 (Fig. 3) is normally positioned so that the machine is set for subtraction by moving plus-minus slide 98 forwardly when the machine is set for division by operation of lever 32, setting slide 203 and connecting lever 221. This position of cam 230 is indicated at "A" in Fig. 3. The one-third rotation of shaft 251 at the end of the overdraft cycle moves cam 230 from position "A" in a counter-clockwise direction to position "B," and such movement results in rearward movement of arm 223 connecting lever 221 and plus-minus slide 98 to condition the machine for addition by meshing gears 72 and 74 (Fig. 2).

Thus, the operation cycle after an overdraft cycle serves to correct the overdraft. At the end of the corrective cycle the second one-third rotation of cam 230 and shaft 251 occurs and determines a carriage shift cycle of the machine. This is effected by setting plus-minus slide 98 to its neutral position where both gears 72, 73 are out of mesh with gears 74 as illustrated in Fig. 2, and by engaging the drive connection to determine a one-step shift of the carriage to the left. The second one-third rotation of shaft 251 (Figs. 3 and 9) moves cam 230 counter-clockwise from position "B" to position "C" when means (not shown) becomes effective to engage left-hand collar 115 (Fig. 6) with gear sleeve 118 during the said second one-third rotation of shaft 251.

At the end of the shift cycle, shaft 251 receives its third one-third rotation to restore the program control device to its original condition, cam 230 being rotated from position "C" to position "A" to reset the machine for subtraction. The shaft 251 being restored thereby to its normally inoperative position by a conventional spring means (not shown), and the notch in the gear 270 again engaging over pin 273. As a result, subtraction begins in the next position of the carriage until an overdraft, when the program control device is again placed in operation as described above. The foregoing sequence of operations continues until the automatic division operation has been completed.

*Revolutions counter control in division*

The sign character control of the quotient in the revolutions counter is of the type disclosed in the patent to Carl M. F. Friden, No. 2,294,111, issued August 25, 1942, and will be described only briefly herein. For this purpose a manually operable control key 33 (Fig. 9) is slidably mounted on right side control plate 44 by shoulder screws 280 and lies in juxtaposed relation to the division initiating key 32, so that the two levers can be easily operated together by a single manual stroke or so that the division key can be operated alone if so desired. Control key 33 is urged upwardly to its inoperative position shown in Fig. 9 by a spring 281. At its lower extremity the key 33 carries a stud or roller 282 engaging a cam surface 283 of a lever 284 pivoted to the side frame 44 at 285. At its upper end the lever 284 has a pin and slot connection 286 with a link 287 which extends rearwardly and is pivotally engaged with the upper end of an auxiliary control lever 288 pivoted on stud 289 to the right side control plate 44. Link 287 and control lever 288 are urged rearwardly by a spring 290 tensioned between link 287 and lever 288.

Positive or negative registration in the revolutions counter is selectively determined by the respective clockwise or counter-clockwise rotation of the counter setting member 291 (Fig. 9). Setting member 291 secured on shaft 294 has respective upper and lower notches 292, 293 for engagement by the respective pins 295 and 296 carried at the forked end of an arm 297, which is pivoted at 298 to the end of the plus-minus slide 98. Spring-urged centralizer 299 is provided for member 291. Arm 297 is normally spring-urged downwardly by spring 300 to engage pin 295 with notch or seat 292. It will be seen that the engagement of pins 295 and 296 in their corresponding notches 292, 293 determine the direction of rocking movement of member 291 and therefore shaft 294 from its centralized position in response to a given movement of the plus-minus slide 98, so that the direction of registration in the revolutions counter can be reversed with respect to a given direction of registration on the accumulator.

In an automatic division operation where a complemental quotient is desired, i. e., the registration in the revolutions counter and the accumulator are alike, the pin 295 on fork member 297 remains in normal engagement with the notch 292 of the counter setting member 291 as shown in Fig. 9, and the division initiating key 32 (Fig. 1) is alone depressed. However, where a true quotient is desirable, both keys 32, 33 are depressed simultaneously and a foot 301 on control lever 288 is engaged with pin 295 to lift arm 297 against the urgency of its spring 300, until pin 296 is engaged with its corresponding notch 293 in counter setting member 291. In this position the registrations in the counter would be of an unlike sign character with respect to those in the accumulator so that true figure quotients will result.

Means are provided for latching the independent counter registration control means in active position when operated in starting a division operation. For this purpose a latch is provided for the auxiliary control lever 288 which is enabled when the division mechanism is placed in operative condition. Control lever 288 (Fig. 9) is provided with a depending arm 310 having a pin 311 thereon for cooperation with a latch arm 312 pivoted on shaft 294 and urged by spring 313 against the laterally extending ear 314 of a lever 315, also pivoted on shaft 294. The lower end of lever 315 is offset and slotted to engage a pin 316 on division control lever 221 so that the latch arm 312 is normally inactive as shown in Fig. 9. However, when a division operation is initiated and control lever 221 is moved from the position shown in Figs. 3 and 9, latch arm 312 is permitted to move downwardly to engage pin 311 and maintain the adjusted position of the auxiliary control lever 288 throughout the division operation.

There are some computations such as $$\left(\frac{ab}{c}\right)$$

wherein it is desirable to prevent the entry of the quotient in the revolutions counter thereby enabling the accumulation of multiplier values therein. This function of the machine will become readily apparent in the use of the automatic multiplication mechanism to be described hereinafter. To this end, mechanism is provided for restraining revolutions counter actuation during an automatic division operation and preventing entry of the quotient therein. For this purpose a link 320 is pivotally connected at its one end to a depending arm 321 mounted for rocking movement on a shoulder screw 280 on right side control plate 44, and at its other end to an arm 322 pivoted at 323 and urged clockwise by a spring 324. Spring 324 normally urges arm 321 into abutting relation with the roller 282 on key 33 when, upon depression of the key 33, arm 321 is rocked to a position overlying the roller 282. Depending arm 321 carries a pin 325 engaged in a slot in the forward end of a link 326 which is pivotally connected at its other end to one arm of a lever 327 mounted at 328 on right side frame 46 for oscillating movement with the rocking of arm 321. The other arm of lever 327 has a slot engaging a pin 329 of a connecting link 330 which operatively connects lever 327 with a lever 331 rockably mounted on right side frame 46 as seen in Fig. 4. Lever 331 carries a blocking slide 332 mounted thereon at 333 for endwise sliding movement in the frame and operative with the rocking of lever 331 to disable the counter actuator 140. The slide 332 being urged to the inoperative position shown by a spring 335 connected at its one end to the connecting link 330 and at its other end to the frame. As seen in Figs. 4 and 9, counter actuator 140 is provided with an extended arm 343 having an offset ear 334 at one end thereof, and is prevented from spring-urged clockwise rocking movement by disposition of the slide 332 beneath the ear 334.

Means are provided for selectively latching blocking slide 332 in its inoperative or operative position during a division operation. For this purpose an arm 336 (Fig. 9) is pivotally mounted to right side control plate 44 at 337, and carries at its extreme end a pin 338 for selective engagement with either notch 339 or notch 340 of link 326. Intermediate its ends the arm 336 has a link 341 pivotally connected thereto at its one end, and at its other end to lever 315 for movement therewith. Therefore, upon depression of the counter control key 33, precedent to or immediately prior to depression of the division initiating key 32, the lever 284 is rocked counter-clockwise and the foot 301 of auxiliary control lever 288 is thereby effective to raise the pin 295 out of engagement with its respective slot 292 and to engage the pin 296 with its slot 293 of the counter setting member 291. Thus, the counter would normally be conditioned with the movement of the plus-minus slide 98 to register a quotient of unlike sign character with respect to the registration in the accumulator. However, with this prior depression of the key 33 the stud 282 serves to disable actuation of the counter and thereby prevent entry of the quotient therein. When depressed, the stud 282 on the key 33 permits clockwise rocking movement of the depending arm 321 through the urgency of the relatively strong spring 324. The arcuate extremity 342 of the arm 321 is thereby moved to an overlying position with respect to the roller 282 and holds the key 33 temporarily depressed. Simultaneously with the rocking of the arm 321, the link 326 is translated to the left in Fig. 9, moving the blocking slide 332 beneath the offset ear 334 of the counter actuator arm 343. Clockwise rocking of the arm 321 also moves a depending extension of the arm 322 into operative relation with the stud 214 on the driving gear 215 to effect release of the key 33 immediately following initiation of the division operation. The subsequent depression of the division key 32 therefore rocks the bellcrank 221 (Figs. 3 and 9) and the lever 315 counter-clockwise as viewed in Fig. 9. The link 341 then serves to rock the latch arm 336 to engage its pin 338 with notch 340 of the link 326 to maintain counter actuation disabled throughout the division operation.

When it is desirable to perform an automatic division operation in which a true quotient is to be registered in the revolutions counter, each of the keys 32, 33 are depressed simultaneously. The depression of the key 33 serves to effect an adjustment of the counter setting member 291 in exactly the same manner as described above, while the simultaneous depression of the key 32 initiates the division operation and prevents a rocking movement of the arm 321. Thus, the arm 321 is immediately ineffective to disable the counter actuator 140. With the conditioning of the machine for division, the bellcrank 221 (Fig. 9) is rocked counter-clockwise to lift the link 341 through lever 315 and thereby move the pin 338 on arm 336 into engagement with the notch 339 of the link 326. This engagement of the pin 338 with the notch 339 is effected before the spring 324 can translate link 326 to the left to move the slide 332 beneath the offset ear 334 of the counter actuator arm 343 thereby enabling the counter actuator 140 to register the quotient. On the other hand, where a complemental quotient is desired, the division key 32 alone is depressed and the pin 295 of the fork member 297 is permitted to remain in engagement with the notch 292 of the counter control setting member 291 whereby the sign character registration in the revolutions counter is like that in the accumulator.

In addition to the counter actuator disabling means described for use in conjunction with an automatic division operation, a manually operable control key is provided for also disabling counter actuation during all but division operations and which is automatically superseded during the said division operations.

With the manipulation of a key 350 from its normally inoperative position shown in Fig. 1, mechanism may be selectively rendered operative to prevent the entry of a value in the counter. However, with the key in its operative position, the mechanism controlled thereby is invariably disabled upon initiation of a conventional division operation. For this purpose, key 350 (Figs. 1 and 11) is provided with a rearward extension 351 (Fig. 10) having a pin 352 thereon engaging a slot 353 in an actuating member 354. Extending forwardly of key 350 is an extension 355 mounted for sliding movement in brackets 356, 357 and retained in either of two positions by a leaf spring detent 358. Actuating member 354 is pivotally connected to an arm 359 (Figs. 10 and 12) mounted for rocking movement on side frame 45 and having a right angle extension 360 for engagement with a pin 361 on the slide 257. Actuating member 354 also has a dependent rearwardly extended finger 362 which carries a pin 363 for engagement by one arm 364 of a bail 365 rotatably mounted upon shaft 366 for control by mechanism to be described hereinafter.

To disable the counter actuator 140, a pin 367 (Figs. 10 and 12) on slide 257 is engaged in a square aperture of a rockable arm 368 pivoted at 369 on a bracket 370 of the frame. The free end of the arm 368 has a laterally and longitudinally extending finger 371 rockable therewith. As the key 350 is moved forwardly from the inoperative position shown in Fig. 11, the arm 359 is rocked counter-clockwise with the upward movement of the slide 257 under the urgency of the spring 259. The pin 367 is then effective to rock the finger 371 into blocking relation with an offset ear 372 of a depending arm 373 of the counter actuator 140. Arm 368 and therefore finger 371 are normally urged counter-clockwise into operative position by a spring 374.

Figure 10:
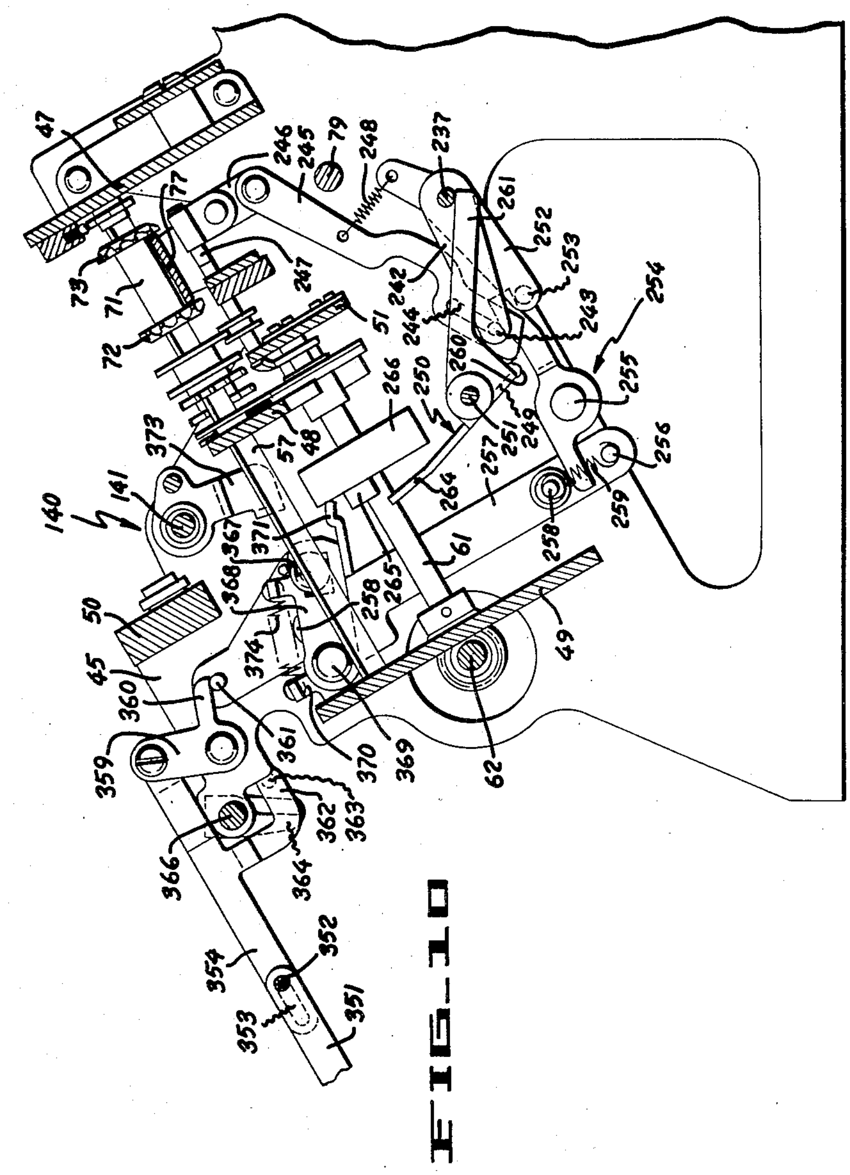
Fig. 10 is a fragmentary sectional elevation of the machine with the carriage removed, the view taken on the line 10—10 of Fig. 1.
Figure 11:
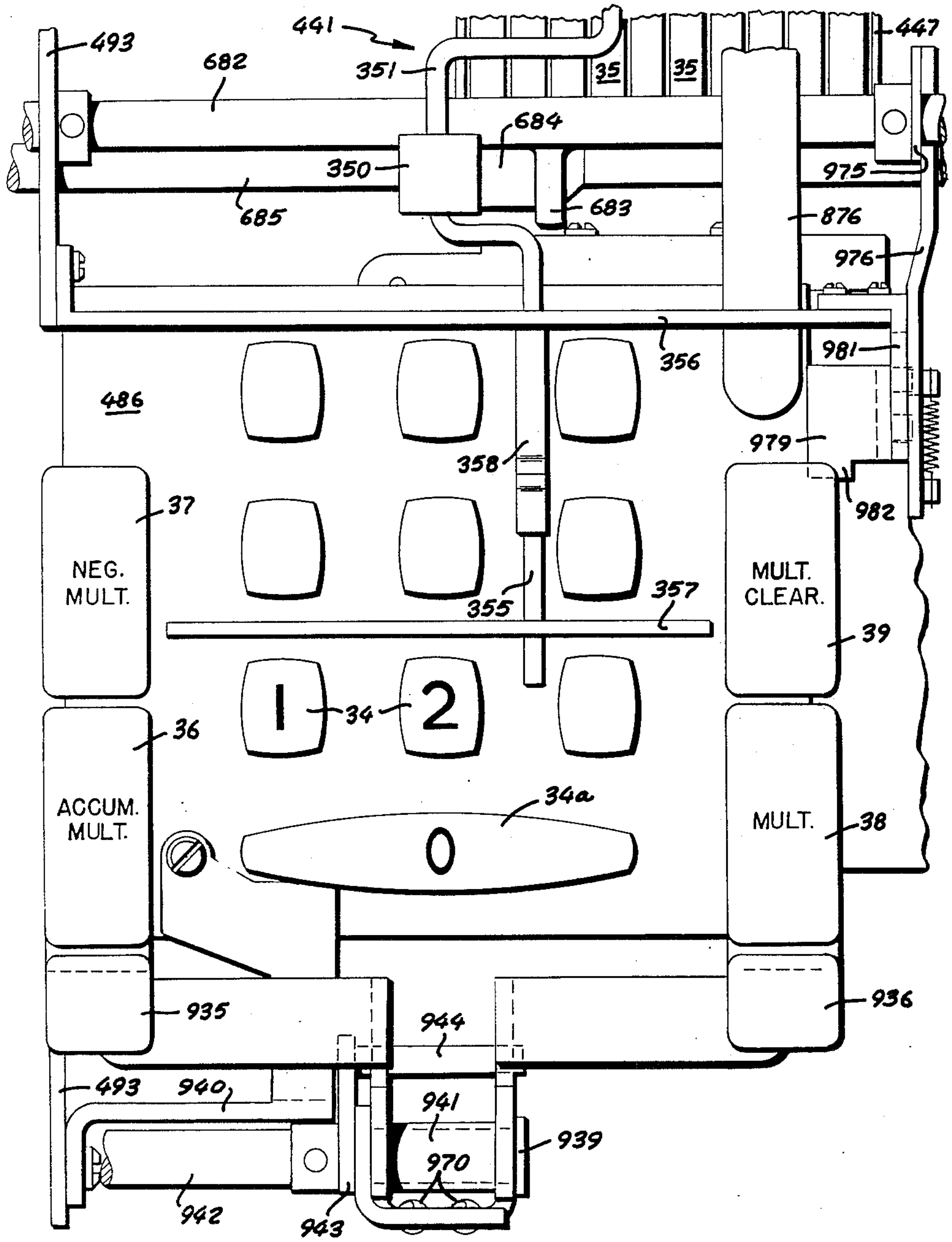
Fig. 11 is a plan view of the multiplier keyboard and controls associated therewith.

With the control key 350 in the inoperative position shown in Fig. 11, arm 359 (Figs. 10 and 12) moves slide 257 downwardly against the urgency of the spring 259. Thus, the arm 368 is rocked clockwise about its pivot 369 to remove the finger 371 from blocking engagement with the arm 373, thereby enabling actuation of the counter. Similarly, if an automatic division operation is initiated and the key 350 is in its forward positon, the slide 257 and the arm 368 are automatically moved downwardly (Figs. 10 and 12) to enable actuation of the counter. For this purpose it will be recalled, initiation of the division operation causes clockwise rotation of the shaft 237 and the arm 252 secured thereon to rock lever 254 counter-clockwise about its pivot 255 to move the slide 257 downwardly.

*Duplex quotient registration*

The above disclosed mechanisms cooperate with mechanism about to be described in performance of plural order machine operations in solving problems in division. The conventional method of division is used which comprises repeated subtraction until an overdraft, correction of the overdraft, and shifting of the dividend register to the next lower order where the process is repeated. The number of subtractions in each order is registered in the revolutions counter and in predetermined dials of the accumulator register as the quotient. The initiation of a division operation predetermines the sequence of operations during uninterrupted cyclic operation of the actuating means. It will be more apparent later that the quotient registered in the accumulator register will always be positive regardless of the selective setting of the sign character registration in the revolutions counter as previously described. That is to say, the quotient registered in the revolutions counter may selectively be a true quotient, or a complementary quotient, or a nonentry of a quotient in the revolutions counter may be desirable and effected. However, despite the selective control for the revolutions counter in division, each subtractive cycle of the machine in each order will be registered positively in the left ten dials of the accumulator. With the quotient registered thusly, it becomes very useful as a subtotal or may be selectively transferred to the revolutions counter for accumulation therein. Similarly, it may be used as a multiplier as will be described hereinafter.

It will be remembered that depression of the division key 32 serves to rock the shaft 237 (Fig. 10) clockwise and therefore the arm 242 to move the link 245 into operative relation with the lever member 250. Upon the occurrence of an overdraft, the link 245 is then effective to rock the cam arm 264 of the member 250 into alignment with and for engagement by the roller 265. With the cam arm 264 so positioned, the overdraft cycle is operative to condition the division programming mechanism for a predetermined sequence of operations. The clockwise rocking of the shaft 237 also operates through arm 252 to impart counter-clockwise rotation to the lever 254 translating the slide 257 downwardly when the slide has been selectively positioned by the spring 259 and key 350 to disable the counter.

Means are provided for invariably effecting the entry of a true quotient in predetermined dials of the accumulator register substantially simultaneous with a quotient entry in the revolutions counter, when desired. As each digit of the quotient, that is, each subtractive cycle and corrective cycle of the machine, is registered in the counter dials, a similar cyclic registration is effected in the accumulator. This operation is accomplished by means of a normally disengaged cyclically operable clutch which is immediately engaged upon depression of division key 32 in a manner now to be described.

Figure 13:
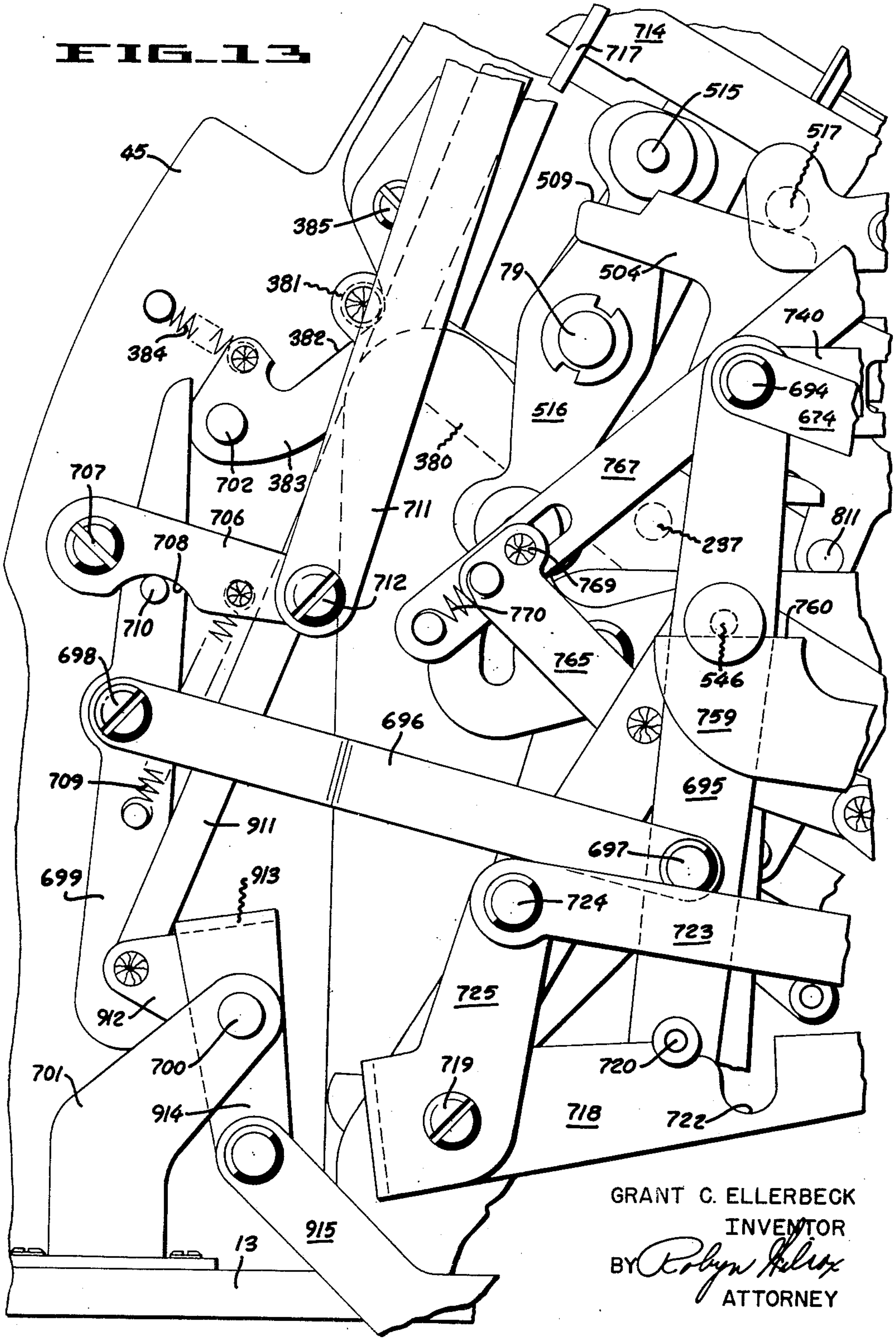
Fig. 13 is an elevational view of the left side of the machine showing the mechanism on the rear portion thereof on an enlarged scale.

An arm 380 secured to shaft 237 at it right end (Fig. 5), carries a roller 381 (Figs. 5 and 13) for engagement with a cam surface 382 of a lever 383, which is urged in a clockwise direction by a spring 384 about a pivot 385 on left side frame 45. At its upper end the lever 383 carries a pin 386 (Figs. 14, 15 and 33) engaged in an annular groove formed by the detent wheel 387 and the driven member 388 of a jaw clutch. The driven member 388 being pinned to a turned portion or extension of square shaft 389 for a predetermined angular rotation thereof when engaged with a driving member 390 of the clutch. The driving member 390 is slidably and rotatably mounted for oscillating motion on one end of the turned or round portion of the square shaft 389, and has an arm 391 integral therewith yieldably maintained in engagement with a shoulder 392 of the left side frame 45 by a spring 393. Each of the members 388, 390 of the jaw clutch have ten teeth on the opposing faces thereof for a driving connection, one with the other, and are normally held disengaged by the spring 384 and the arm 383 (Fig. 13).

Figures 14, 15:
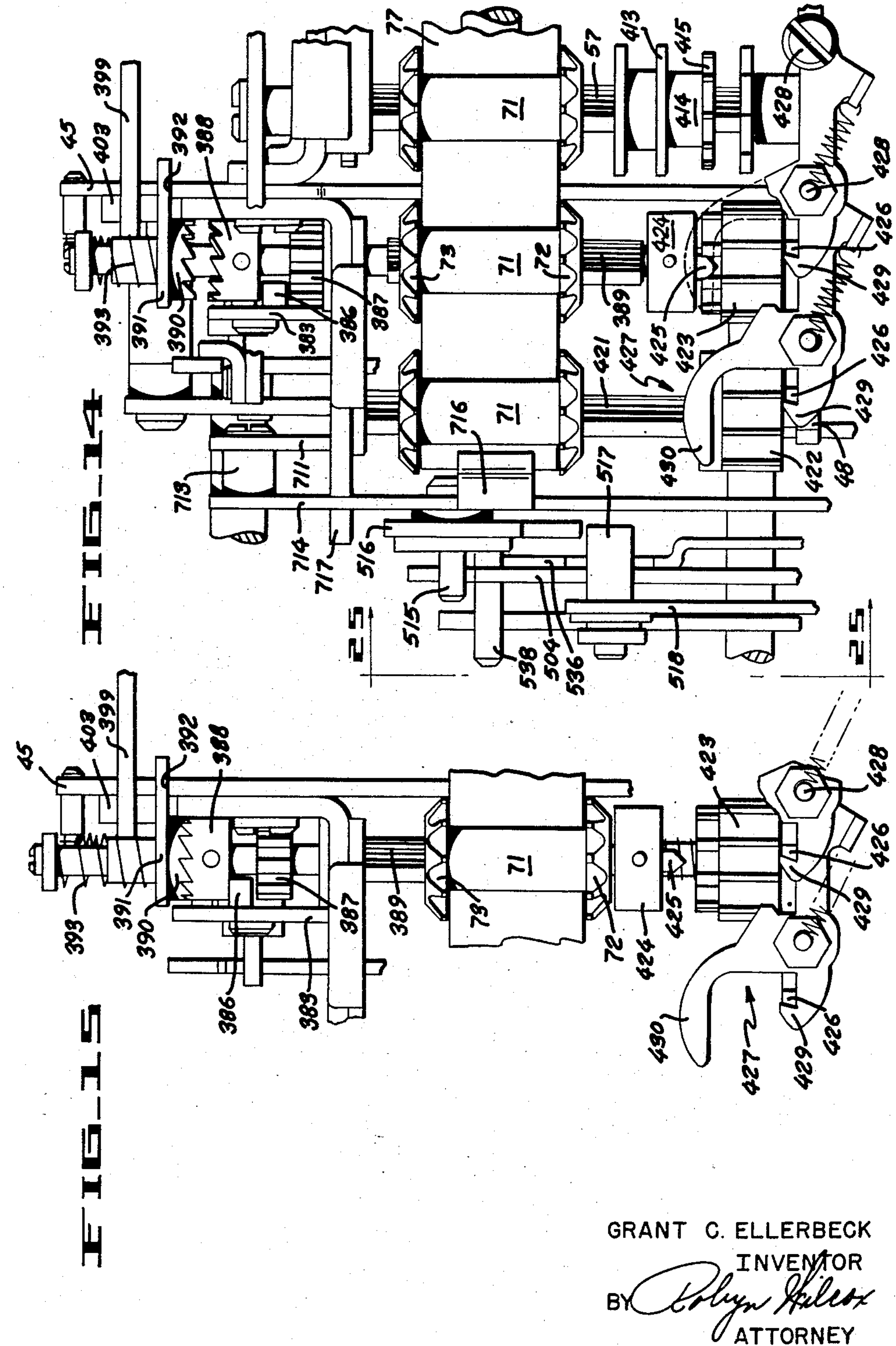
Fig. 14 is a plan view of the clutch for actuating the dials in the left ten orders of the register with the clutch shown in its disengaged position.
Fig. 15 is similar to Fig. 14 showing the clutch engaged.

Upon initiation of an automatic division operation therefore, shaft 237 (Figs. 3 and 13) is rocked counter-clockwise to cam lever 383 counter-clockwise about its pivot 385 and thereby engage the driven member 388 with the driving member 390 as viewed in Fig. 15. Thereafter, with each cycle of the machine a one-tenth rotation is imparted to the shaft 389 and therefore plus-minus gears 72, 73. For this purpose a cyclic cam 398 is secured to the rearward end of an actuator shaft 61 (Figs. 5 and 6) upon which the sleeve 166 and the integral resetting cam 168 is rotatably mounted, said sleeve and shaft being jointly journalled in transverse bracket 47 and supporting bracket 167. A lever 399 pivotally mounted on supporting bracket 167 at 400 carries at its one end a roller 401 which is urged into cooperative relation with the cam 398 by a spring 402. At its other end the lever 399 has a pin and slot connection 403 with the arm 391 of the driving member 390. Therefore, with the engagement of the members 388, 390, each clockwise rotation of the cam 398 (Fig. 5) rocks the arm 391 in a 36° arc and ratches the driven member 388 and shaft 389 one-tenth of a rotation.

With reference to Figs. 2 and 5, it may be noted that the clockwise rotation of driving shaft 62 imparts a similar clockwise rotation to the actuator shaft 61 (Fig. 5) and therefore the cam 398 secured thereto, while the square shafts 57 are rotated in an opposite direction. However, the square shaft 389 (Fig. 14) serving primarily the same function as the square shafts 57 is rotated in a direction opposite to that of the shafts 57. Thus, in an additive operation the gears 72 on shafts 57 are engaged with the corresponding gears 74 of dial shafts 76 (Figs. 2 and 14) to impart positive rotation to the associated accumulator dials 17, whereas, engagement of the gear 72 on the square shaft 389 with a gear 74 causes a subtractive rotation of the accumulator dial 17 in that order when the claw clutch 388, 390 is engaged. Likewise, the engagement of the gears 73 with the gears 74 imparts a subtractive rotation to the accumulator dials 17 through their associated shafts 57, while the oppositely rotated shaft 389 imparts a positive rotation to a dial 17 in the 13th order of the machine.

In a machine of the character described a conventional tens-transfer mechanism is utilized, and for a complete description of same, reference is to be had to Patent No. 2,306,247 issued to Carl M. Friden et al., December 22, 1942. However, it will be briefly described herein insofar as it is pertinent to the instant invention.

To effect a tens-carry from order to order in the accumulator register when the registration of a numeral wheel changes from "0" to "9" or vice-versa, a single tooth gear 408 (Figs. 2 and 16) is provided on numeral wheel shaft 76 in operative relation with a nose 409 of a transfer lever 410 pivoted at 411 to the carriage frame 104. Each lever 410 extends into the next higher order of the machine and has an ear 412 extending downwardly in operative relation with a flange 413 (Fig. 2) on a collar 414 slidably mounted on square shaft 57. Gear 415 on collar 414 is normally disposed out of the path of the single tooth actuator 416 on shaft 61. When a numeral wheel 17 of one order passes from "9" to "0" or vice-versa, single tooth gear 408 rocks lever 410 which through ear 412 moves collar 414 to the left to position gear 415 of the next higher order in the path of the associated transfer actuator 416. Thus, the transferred increment is introduced through either gear 72, 73 of the next higher order depending upon setting of the machine for addition or subtraction. Transfer gear 415 is maintained resiliently in either adjusted position thereof by the engagement of flange 417 on collar 414 between spaced flanges 418 on stub shaft 419 slidably mounted in cross-members 51, 420, and engaged by a suitable spring-pressed ball (not shown). Suitable restoring means is provided for the shiftable transfer mechanism in association with transfer actuator 416 as disclosed in the aforesaid patent.

In a conventional machine there are four extra transfer orders i. e., four more than the number of rows of keys in the keyboard. Two of these, the 11th and 12th, are provided in orders which have a transfer actuator associated therewith, while the 13th and 14th are provided without actuation of the character described above. The noncyclic transfer mechanism associated with these latter two orders comprises generally a spring-urged latched transfer actuator in each order, and means associated therewith for tripping the latch to enable the transfer operation and for subsequently restoring the actuator to restrained position by power. The restoring operation is preferably effected during the first part of the next cycle of operation.

Referring to Figs. 14 and 15, it will be noted that the two left-hand or the 13th and 14th order spools 71 are mounted on square shafts 389 and 421, respectively, which end at crossframe member 48. The shaft 421 carries a ten tooth ratchet gear 422 for receiving transferred increments, while a similar ratchet 423 is rotatably mounted on one end of shaft 389 and serves to rotate shaft 389 when the members 388 and 390 of the claw clutch are disengaged as shown in Fig. 14. For incremental rotation of the shaft 389 a collar 424 is secured thereto and has diametrically opposed teeth 425 for engaging similarly opposed notches in ten tooth ratchet gear 423 as shown in Fig. 14. Each of the gears 422, 423 has associated therewith, respective actuating pawls 426 which are urged to the left, as seen in Fig. 14, by respective springs not shown, but are prevented from such leftward movement by respective spring-urged latch pawls 427. These pawls 427 are pivoted by studs 428 on crossframe member 48 and have latch arms 429 for engagement with upper ends of pawls 426. Thus, the pawls or levers 426 are latched normally in active position.

To release the latches each pawl 427 shown in full line and phantom lines in Fig. 14, has a curved arm 430 for cooperation with an aligned ear 412 of the transfer lever 410, of the next lower order. Thus, when such lower order numeral wheel passes from "9" to "0" or "0" to "9," latch 427 is moved to inactive position and the lever or pawl 426 is free to move under the influence of its spring (not shown). The pawl 426 then becomes effective to move the associated gear 422 or 423 one tooth spacing, as is more fully disclosed in the afore-mentioned Patent No. 2,306,247.

From the foregoing description of the tens-transfer mechanism in the two highest orders, it becomes readily apparent that in a plural order operation wherein the claw clutch members 388 and 390 are engaged, such as in automatic division, the shaft 389 and its collar 424 must be disengaged from the ten tooth ratchet 423 as seen in Fig. 15, so that incremental rotation of the ten tooth ratchet 423 by release of the latch 429 will not impart rotation to the shaft 389.

In a calculating machine for performing automatic division and having 22 registers or dials, the quotient in the accumulator may consist of ten digits, the number of digits being determined by the order (the 12th order as hereinbefore described) in which the overdraft becomes operative to initiate the predetermined sequence of operations, i. e, the overdraft correction cycle, shifting of the carriage to the next lower ordinal position, and again conditioning the machine for subtraction. Therefore, in a division operation the jaws 388, 390, are engaged to enable a unidirectional rotation of the shaft 389 conversely to shafts 57, and thereby register the digits of a quotient positively from the higher to the lower order in apposition to the orders in which the dividend is set, that is, in the orders higher than the dividend orders. With this engagement of jaws 388, 390, the shaft 389 is translated rearwardly as seen in Fig. 15, to disengage the teeth 425 from the ten tooth ratchet 423 and thus prevent a tens-carry into the 13th and 14th orders during the division operation.

When a ten digit quotient is desired (a value greater than this would exceed the capacity of the carriage) the carriage is shifted or tabulated to the 10th position, in which position the 19th dial is aligned with the 10th or highest order of the keyboard. The dividend is then entered into the accumulator dials, the divisor is entered into the keyboard and the automatic division operation is initiated by the simultaneous depression of the keys 32 and 33. With the carriage so positioned the 22nd dial in the accumulator becomes effective through gears 72, 73 on shaft 389 to register the highest digit of the resulting quotient. Following each overdraft, when the carriage is ordinally shifted to the left, as viewed in Fig. 1, each lower order dial 17 is effective to register the quotient successively to the lowest digit.

Assuming an extreme case where a dividend and divisor of ten digits is used, each subtraction of the divisor from the dividend is registered positively in the 22nd dial of the accumulator as the dividend is successively reduced until an overdraft occurs. The 12th actuated order of the machine then becomes effective, with the link 245 (Fig. 10), to condition the division programming mechanism for the overdraft correction cycle and "1" is subtracted from the 22nd dial of the accumulator since the overdraft cycle was counted therein. The carriage is then shifted to the next lower ordinal position where the 21st dial of the accumulator becomes effective to receive the next digit of the quotient. Following the shift cycle the machine is again conditioned for subtraction and this sequence of events continues conventionally to the completion of the automatic division operation. It is therefore obvious that each negative and positive registration of the divisor in the dividend register is simultaneously registered respectively positively and negatively in the left ten dials of the accumulator.

A quotient with a maximum of ten digits is therefore registered positively in the left ten dials of the accumulator and is selectively and simultaneously registered, positively or complementally, in the revolution counter, or prevented entry therein as desired and described hereinbefore. However, it is apparent that the initial or tabulated position of the carriage determines the number of digits in the quotient within the capacity of the machine. For example, with the carriage shifted to the 3rd position, or that shown in Fig. 1, followed by the entry of the dividend therein, and with the highest numeral of the divisor in the keyboard aligned with the highest significant figure of the dividend, the resulting quotient will have but three digits. This becomes very useful where only an integral quotient or whole number is desired and the divisor and/or dividend are decimalized.

*Multiplier keyboard*

The selection mechanism for the multiplier factor is of the type disclosed in said Patent No. 2,399,917, issued to Carl M. Friden, et al., May 7, 1946. Generally such mechanism comprises a ten key keyboard including keys 34 (Fig. 11) and a pin carriage indicated at 441 (Figs. 11, 17 and 18) associated therewith, having ten ordinal rows of settable stop pins and ten ordinal differentially adjustable elements 442. These elements 442 are in the form of racks in which digits of the multiplier may be set successively for subsequent control of the multiplying operation. In order to set up the multiplier digits each pin row includes eight pins corresponding to the "1" to "8" keys and a fixed stop corresponding to the "9" key so that a depressed multiplier key 34 operates through an associated selection lever to set the corresponding pin of an aligned ordinal row to active or raised position. At the same time that a pin of the pin carriage is moved to active position the aligned element 442 is released to move into engagement with the pin and thereby be set differentially in accordance with the value of the depressed key. Subsequently the depressed key operates an escapement mechanism to effect movement of the pin carriage one ordinal step with respect to the keyboard selection mechanism. The pin carriage is normally in its right end position (Fig. 11) as viewed from the front of the machine with indicating sectors 35 to the right of and not visible through sight opening 442 (Fig. 1). The condition shown in Fig. 1 would obtain, after three successive depressions of the "1" key 34, to move the pin carriage towards its left end position so that three sectors 35 are in value displaying position. The pin carriage 441 is spring-urged toward its left end position, as seen in Fig. 1, by means of a bellcrank 444 (Fig. 21) which is pivoted at 445 on machine base 13 by means of an adjustable eccentric, and has an arm 446 formed at right angles thereto for engaging the right side plate 447 (Figs. 11 and 17) of the pin carriage. An extended portion of the bellcrank 444 (Fig. 21) has a spring 448 secured thereto, whereby the bellcrank is urged in a clockwise direction and correspondingly the pin carriage is urged from its right-hand position which it occupies when no multiplier factor is set in the machine. The foregoing mechainsm is of a well-known type and is more fully described in the aforementioned Patents No. 2,371,752 and No. 2,399,917.

Figure 19:
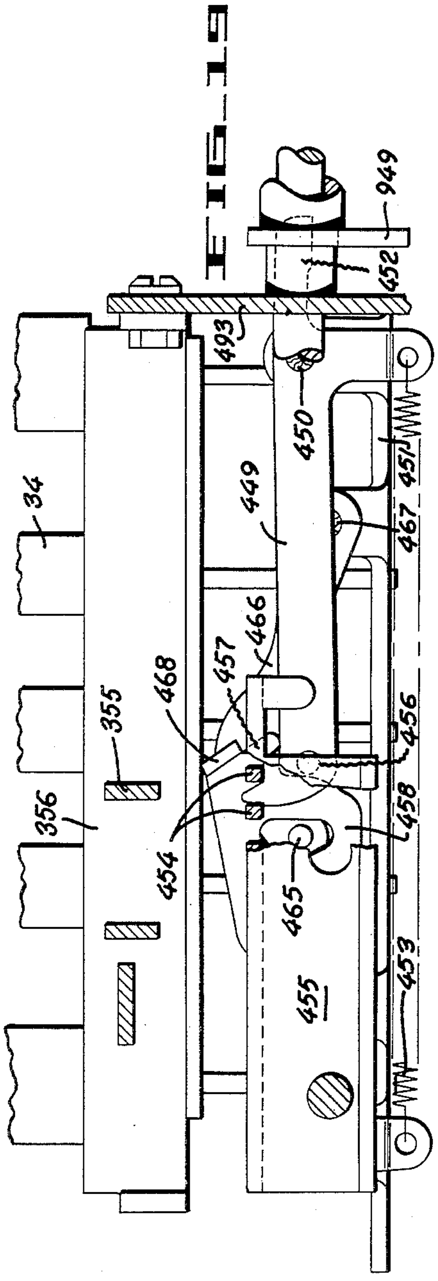
Fig. 19 is a sectional view of the multiplier pin carriage escapement mechanism.

Normally the movement of the pin carriage under the influence of the spring-urged bellcrank 444 is prevented by means of a bellcrank stop pawl 449 (Figs. 19 and 20) pivoted at 450 on an upstanding ear of lower keyboard plate 451, and urged upwardly by spring 453 into engagement with a tooth 454 of the front pin carriage rail 455 as seen in Fig. 19. The bellcrank stop pawl 449 has an arm 452 extending laterally beyond the left frame plate 493 for optional control by mechanism to be described hereinafter, for releasing the pin carriage to its extreme left position as viewed in Fig. 1. The pawl 449 also carries a pin 456 which lies beneath the ear 457 of a second bellcrank pawl 458 pivoted at 459 on lower plate 451. Spring 453 urges pawl 458 counter-clockwise. Pawl 458 is provided with an L-shaped slot 460 whose horizontal portion receives pin 461 carried by an arm 462 on a rod 463 journalled in spaced ears 464 of the lower keyboard plate 451. Rod 463 carries an arm (not shown) at its opposite end lying under an end of rod 465 to be operated thereby in a conventional manner. The vertical portion of slot 460 receives the adjacent end of rod 465 as viewed in Fig. 20, the rod 465 extending between spaced arms 466 secured at the ends of a rod or shaft 467 pivoted in suitable upturned ears of lower plate 451. Rod 465 is associated with horizontal portions of the stems of each of the numeral keys 34, whereby upon depression of any key the rod 465 will be moved downwardly to engage a lever (not shown) secured to shaft 463, thereby rocking the shaft 463 and arm 462 clockwise as viewed in Fig. 20. The pawl arm 458 also carries a laterally projecting tooth 468 which is normally positioned immediately above teeth 454 as shown in Fig. 19, and is disposed for downward movement between the pair of teeth adjacent and to the right of that contacted by the nose of the pawl 449.

Preferably the escapement shift is performed in two stages; one stage occurring during depression of a multiplier key 34 and the last stage occurring just before return of the key to raised position. When a multiplier key is depressed, shaft 463 is rocked by key-operated rod 465, whereby arm 462 and pin 461 serve to rock pawl arm 458 about its pivot 459 in a clockwise direction, thereby simultaneously lowering tooth 468 of pawl arm 458 from the position shown in Fig. 19 to overlap the adjacent rack tooth 454. During continued movement of pawl 458 its ear 457 engages pin 456 and rocks pawl 449 from the position shown in Fig. 19 to disengage the nose thereof from the associated tooth 454. As soon as the pawl 449 is disengaged from a tooth 454 the first stage of the shift step occurs and the pin carriage moves to the right as viewed in Fig. 19 under the influence of the spring pressure thereon until a rack tooth 454 engages tooth 468 of pawl arm 458.

The movement of the pin carriage during this stage of a shift step corresponds to the space between the tooth 468 and the rack tooth 454 adjacent thereto, the movement being sufficient to position the previously active tooth 454 over the nose of pawl 449, but insufficient to allow engagement of the pawl 449 between the next two succeeding teeth 454. Subsequently as the depressed multiplier key is released the parts start their return from depressed position. Pawl 449, however, is held depressed by the associated tooth 454 and cannot return upwardly with the other parts until the inclined face of tooth 468 has permitted further shifting of the pin carriage to move the associated tooth 454 from over the nose of the pawl 449, so that the pawl 449 will work upwardly into engagement with the next tooth 454 to the left of the tooth with which it was engaged before depression of the multiplier key. It can be seen therefore, that the counter-clockwise rocking of the pawl 449 (Fig. 19) without the clockwise rocking of the pawl arm 458, will permit shifting of the pin carriage and its rack 455 to the extreme right-hand position in Fig. 20 or to the left position as viewed in Fig. 1.

The above-described mechanism is generally similar to that disclosed in the patent to Carl M. Friden, No. 2,371,-752, which issued March 20, 1945.

*Multiplier rack restoring means*

The differentially adjusted positions of racks 442 are utilized to control the number of registrations of the multiplicand in the accumulator and to shift the accumulator from left to right after multiplication by each multiplier digit to enable correct registration of the next ordinal product, as well as to shift the pin carriage 441 so that the next higher order rack 442 comes into controlling position with respect to the operation of the machine. To enable exercise of the above control, means is provided for returning each adjusted rack, step-by-step, to its initial or zero position. This operation being successive from the adjusted rack of the lowest order, with the shifting of the accumulator and the multiplier pin carriage being effected during the last step of movement of each rack to condition the machine for operation in the next higher order.

The operating mechanism for the racks is of a well-known type and comprises feed pawl 475 (Fig. 18) which is pivotally secured at 476 to the end of an arm 477 pivoted at 478 on the frame. Pawl 475 is urged in a clockwise direction, as viewed in Fig. 18, by a spring 479 which is attached at one end to a lug 480 of pawl 475 and at its other end to a stud on arm 477. Lug 480 is spaced from arm 477 in the inactive position of pawl 475 and engages arm 477 to limit the rocking movement of the pawl upon movement to active position. Pawl 475 is held in inactive position by its upward extension engaging behind a holding pawl 481 which is secured at one end of shaft 482 which is suitably journalled in the frame. Both pawls 475 and 481 are maintained inactive until the multiplying operation is started, the inactive position being shown in Fig. 18.

In order to actuate pawl 475, arm 477 is pivotally connected to a pitman 483 which engages an eccentric cam (not shown) secured on shaft 62 for rotation therewith. Pitman 483, arm 477, and pawl 475 are reciprocated once for each cycle or rotation of shaft 62, and the operation of the pawl 475, when in its active position, occurs at the beginning of each cycle. However, the pawl 475 is held in its inactive position until holding pawl 481 is allowed to move in a clockwise direction from the position shown in Fig. 18 by oscillation of shaft 482.

*Multiplication keys*

The condition of the machine for the multiplying operation as controlled by the multiplication operation keys will now be described.

When one of keys 36, 37 or 38 is depressed and latched in depressed position, several functions of the machine are set into operation selectively in accordance with the type of operation determined by the key depressed. These functions include enabling of the control which determines the sign character of the registration of the product, enabling of the power-set means for operating the sign character control, enabling of the carriage shift mechanism to determine return of the carriage to an end position, selective enabling of the resetting mechanism for the accumulator and the revolution counter, setting the control for enabling feed pawl 475 for the multiplier racks, engaging the clutch and enabling the motor circuit. The mechanisms performing these functions and their relation to multiplication keys 36, 37 and 38 will now be described.

Figure 17:
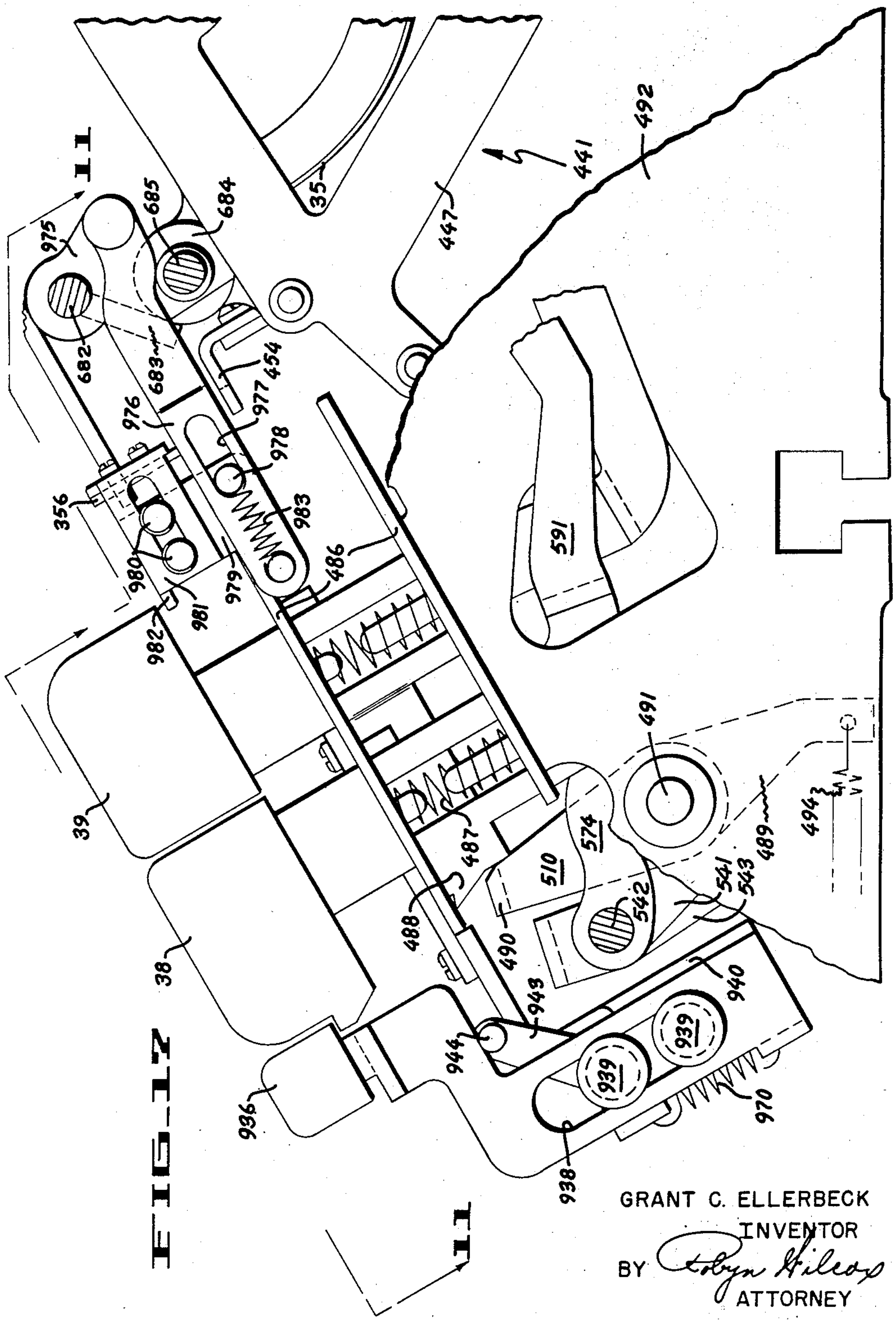
Fig. 17 is an enlarged view of a portion of the multiplier mechanism similar to Fig. 8, but with the controls illustrated more in detail.

Keys 36 and 37 (Figs. 11 and 22) are mounted for endwise sliding movement in respective keyboard plates 486 as seen also in Fig. 17, and are urged to raised position by respective springs 486 disposed in the slotted key stems and compressed between the key and lower plate 486. The raised position of the respective keys is determined by the respective latch arms 488 engaging the under face of the upper plate 486 in a conventional manner. At their outer end, latch arms 488 are provided with respective latching teeth for engagement with a single latching tooth on latch lever 489 similar to that shown at 490 on latch lever 510 in Fig. 17. Latch lever 489 is secured on a transverse shaft 491 which is suitably pivoted or journalled in frame plates 492, 493 of the machine. Latch lever 489 is urged in a clockwise direction as viewed in Fig. 17 by a spring 494 suitably tensioned between the frame and the lower end of lever 489. The lower end of lever 489 is also operatively related with arm 495 of bellcrank 444 (Fig. 21) whereby the latch for the depressed key 36 or 37 can be released at the end of the multiplying operation as later described. Suitable interlocking means may be provided for preventing simultaneous depression of keys 36 and 37.

*Multiplication sign character control*

Means are provided under control of the multiplication keys for selecting the sign character of the registration of the product in the accumulator to be positive if keys 36 or 38 are depressed and to be negative if key 37 is depressed, such means being enabled by depression of a selected key and subsequently operated by power means also enabled by depression of that key. Pins 496 (Fig. 22) of keys 36 and 37 extend through the adjacent frame plate 493 and engage in respective slots of the forward ends of levers 497 and 498 respectively, which are offset laterally intermediate their ends to extend beyond the adjacent plate 493 and are pivotally mounted on the shaft 499.

Lever 497 (Figs. 22 and 23) has a pin 500 at its rearward end engaging a square aperture in arm 501 pivotally mounted at 502 on the frame plate 493. Arm 501 is connected by spring 503 with positive setting arm 504 which is pivoted at 505 to power-setting means therefor in the form of a bellcrank 506 pivoted at 507 on frame plate 493. Arm 504 is urged upwardly by spring 503 against a roller 508 on arm 501, so that in effect arms 501 and 504 move with lever 497 upon depression of key 36. At its rearward upwardly offset end, arm 504 has a notch 509 for engagement with a pin 515 at the upper end of a lever 516 secured at the end of transverse shaft 79 the rocking movement of which, as previously described, moves gate 77 to control the engagement of the plus-minus gears 72, 73 with the numeral wheel gears 74 and therefore controls the sign character of the registration.

Figure 22:
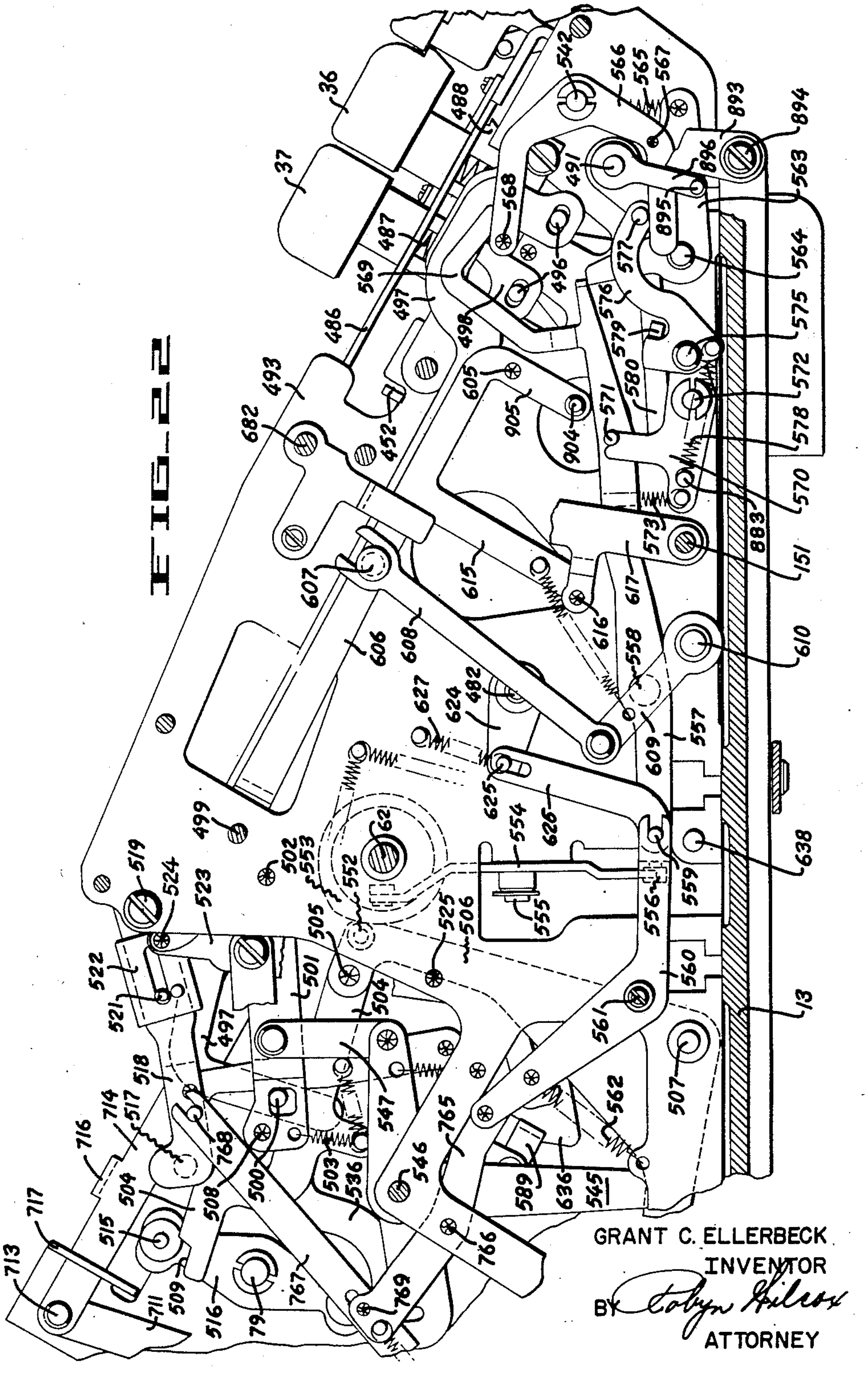
Fig. 22 is an elevational view of the left side of the machine with some mechanism removed for the sake of clarity.

Normally, notched end 509 of arm 504 is maintained below pin 515 by its engagement with a pin 517 on arm 518, as shown in Fig. 22, but can move to active position into engagment with pin 515 under the influence of spring 503, upon the clockwise rocking movement of arm 518 when key 36 is depressed to move lever 497 to its active position. It will be noted that spring 503 provides a yieldable connection whereby arm 504 can be held against movement to active position or moved from active position. Arm 518 is rockably mounted on a spacer shaft 519 journalled between frame plate 493 and auxiliary frame 520 and carries a shoulder stud 521 engaging a slot of a channelled coupling member 522, mounted for sliding movement thereon by the oscillatory motion of an arm 523. Pivotally secured to member 522 at 524, the arm 523 is rockable on a hub 525 of side frame 493. The channelled member 522 (Figs. 23 and 24) has opposed ears 526 laterally extended from its flanges 527 to overlie the rearward extension 528 of an arm 529 also pivoted on spacer shaft 519. Arm 529 is contiguous with arm 518 for rocking movement therewith when the member 522 is in the position shown in Figs. 23 and 24. At its forward end, the arm 529 carries an ear 530 overlying a conventional stop 531 on the multiplier pin carriage 441 in the right-hand position of the carriage, and also each active rack 442 in any shifted position thereof. As will be described hereinafter, the leftward sliding movement of the member 522 by the arm 523 (Fig. 23) will permit rocking of the arm 518 independently of the arm 529. Therefore unless a value is set into the pin carriage, with the member 522 in the position shown in Fig. 23, no setting of arm 529 and therefore arm 518, can be made. However, with the leftward sliding movement of the coupling member 522, arm 518 is free to be rocked independently of arm 529 to move arm 504 from its active position.

Similarly the rearward end of lever 498 (Figs. 22 and 23) which is associated with minus multiplication key 37, is conventionally connected by a spring (not shown) to setting arm 536 which is urged against a pin on lever 498, the rearward end of which has the same shape as, and lies adjacent to, the lever 497. Arm 536 is also pivotally connected at 505 to actuating bellcrank 506 and having its downwardly offset notched end 537 for engagement with a pin 538 at the lower end of lever 516. Arm 536 also has an upper extension 539 engaging pin 517 on arm 518.

Thus, it will be noted that depression of key 36 (Fig. 22) rocks arm 497 raising the rearward end thereof to allow notched end 509 of arm 504 to move into engagement with pin 515 whereby, upon subsequent counter-clockwise movement of bellcrank 506, lever 516 and shaft 79 will be moved to mesh the plus gears 72 with the numeral wheel gears 74. Similarly if key 37 is depressed, lever 498 serves to control the engagement of notched end 537 of arm 536 with pin 538, thereby conditioning the plus-minus control mechanism to determine a negative registration of the product in the accumulator as explained above. However, the arm 504 or arm 536 can only move to active position, with the member 522 in the position shown in Fig. 23, if arm 529 and therefore arm 518 are free for movement because of the entry of a value into the multiplier pin carriage. For a more complete disclosure of the positive and negative multiplying mechanism reference is to be had to Patent No. 2,399,917.

Key 38 (Figs. 8, 11 and 17) overlies a roller 540 of an arm 541 pivotally mounted on shaft 542 and integrally connected with an arm 543. Arm 543 is operatively connected, in a conventional manner by link 544 with bellcrank 545 (Figs. 22 and 25) pivoted on a shaft 546, which is suitably journalled at its one end in side frame 493 and at its other end in the auxiliary frame member 520. The horizontal arm of bellcrank 545 is pivotally connected to a link 547 which is also pivotally connected to arm 501, so that clockwise movement of arm 543 (Fig. 8) pulls link 544 forwardly and rocks bellcrank 545 in a counter-clockwise direction, as viewed in Fig. 22. With the rocking of bellcrank 545 the arm 501 is lifted to tension spring 503 so that arm 504 is urged upwardly to engage notched end 509 with pin 515. The slotted connection of pin 500 with arm 501 provides for selective tensioning of spring 503 from key 36 or key 38.

Thus, each of keys 36, 37 and 38 controls the setting of linkage which in turn will cause selective setting of the plus-minus gears upon oscillation of power-setting bellcrank 506. To effect power-setting of the plus-minus gears by oscillation of bellcrank 506, roller 552 is provided on bellcrank 506 (Figs. 22 and 23) for cooperation with power-setting cam 553, which is slidably and non-rotatably mounted on shaft 62 by a suitable slidable driving connection. Cam 553 is normally urged to an inactive position with respect to roller 552 by a conventional means not shown.

Cam disk 553 (Fig. 22) is engaged by a suitable roller at the upper end of a lever 554 pivoted at 555 on a right angle ear of side frame 493, and having its lower cam end engaged by a roller 556 carried at the end of a lever 557 pivoted at 558 on the frame plate 493. Lever 557 is spring-urged in a clockwise direction as viewed in Fig. 22, through its pivotal connection at 559 with bellcrank 560 which is pivoted at 561 to the side frame 493. Bellcrank 560 is urged in a counter-clockwise direction by a spring 562, therefore, also placing lever 557 under a clockwise urgency.

Conventional means are provided for preventing such clockwise movement of the lever 557 (Fig. 22) to enable the power-setting operation, such mechanism being first conditioned by operation of one of the multiplier control keys and then subsequently enabled at the end of the shifting, or shifting and resetting operation. The forward end of lever 557 is provided with an offset ear engaged by the upper arm of a bellcrank 563 pivoted at 564 on the frame and urged in a counter-clockwise direction by spring 565. Thus, bellcrank 563 latches lever 557 against operative movement. For releasing the latch bellcrank 563, U-shaped lever 566 secured on shaft 542 is provided with a pin 567 overlying the horizontal arm of bellcrank 563, and has a roller 568 lying under portions of levers 497, 498 which are operated by the key depression, and also an extension 569 of lever 557. Therefore, upon depression of key 36 or 37, the vertical arm of bellcrank 563 is moved from beneath the end of lever 557. However, this merely conditions the lever 557 for operation as it is still maintained inoperative by the engagement of a latch lever 570 with the pin 571 on the lever 557. Latch lever 570 is pinned on a shaft 572 and is urged in a clockwise direction by a spring 573. To control the conditioning of power-setting enabling lever 557 from the key 38, U-shaped lever 566 is rocked through shaft 542, and arm 574 secured thereto (Fig. 8), and having its free end underlying a pin 590 which is moved downwardly with the depression of the key.

As explained hereinafter, shaft 572 (Fig. 22) carrying pawl 570 is oscillated at the end of the carriage shifting or carriage shifting and resetting operation, to disable latch pawl 570 and enable the power setting operation.

To prevent relatching of a multiplication control key in depressed position, if held there after the multiplying operation, latch lever 570 (Fig. 22) has pivotally mounted thereon at 575, a bellcrank 576 carrying a pin 577 overlying the lower arm of U-shaped lever 566. Bellcrank 576 is urged in a clockwise direction by a spring 578 and has its upright end adjacent and normally above square pin 579 on an arm 580 secured on shaft 491 which also carries key-latch arms 489, 510 (Fig. 17). As previously explained, the shaft 491 is operated upon depression of any one of the multiplication control keys so that it will rock arm 580 upwardly and immediately downwardly when the key latch engages so that pin 579 provides a stop for bellcrank 576. Subsequently when the key release mechanism is operated, if the key is maintained depressed, i. e., lever 566 does not operate to restore bellcrank 576, the upright arm of bellcrank 576 will move under pin 579 to maintain the key latch inactive.

At the end of the carriage shifting, or carriage shifting and resetting operation, the power-setting bellcrank 506 is moved to active position and conventional means are provided for latching said bellcrank and the plus-minus gears controlled thereby in active position. Such means may comprise latch arm 585 (Fig. 25) pivoted at 586 on plate 45 and urged in a counter-clockwise direction by a spring 587. Latch arm 585 has a notched lower end for engagement with a square pin 588 on bellcrank 506. Thus, the bellcrank 506 can be latched in its active position. The latch arm 585 is moved to inactive position by an arm 589 in a conventional manner to be described briefly later.

*Carriage return and resetting control*

Upon depression of either of multipulation operation keys 36 or 37, means are brought into play to first determine shifting of the carriage to its left end position as a preliminary to the multiplying operation. Where a zero resetting operation is desired, key 38 is operated and a return and resetting operation may be performed to selectively zeroize the accumulator, the counter, or both, in accordance with the adjustment of the knobs 29 and 30.

Key 38 (Figs. 8 and 17) carries a pin 590 which engages the slotted end of lever 591 pivoted at 592 on auxiliary frame plate 492. Lever 591 has a pin 593 engaging arm 153 secured on shaft 147. Arm 153, as previously described, operates through a pusher link 154 to move push rod 158 of the resetting mechanism to operative position, so that upon depression of the key 38, push rod 158 engages the resetting drive connection. At the same time, the rearward movement of the pusher link 154 (Fig. 8) through the pin 159 thereon and the depending arm 160, rocks the shaft 132 counter-clockwise. This oscillation of shaft 132 (Fig. 6) serves through arm 134 to move push rod 127 into position to engage the left-hand shift mechanism.

Simultaneously the oscillation of shaft 147 also operates through arm 149 (Fig. 4) and pin 148 to rock arm 150 pivoted on shaft 151, finger 152 of which engages pin 90 at the lower end of lever 89 so that the circuit is closed and the clutch engaged.

Likewise a roller 594 on lever 591 also serves with the depression of key 38 to rock shaft 151 in a clockwise direction through an arm 595 pinned thereto. The free end of the arm 595 is spaced from the roller 594 sufficiently to permit pin 593 to engage the left shift and zero resetting mechanisms prior to the rocking of shaft 151, which is suitably journalled in left side frame 493, side frame 492, and right side frame 46. At its right end the shaft 151 (Fig. 4) carries an upwardly extending arm 618 engaging a pin 619 on the slide 81 which abuts pin 85 on the clutch engaging lever 82. With the rocking of the shaft 151, therefore, slide 81 is moved rearwardly to engage the clutch and close the motor contacts simultaneously with the rocking of levers 89 and 87 by shaft 147. At its left end, however, (Figs. 33 and 34) the shaft 151 carries an arm 617, for the operation of mechanism to be described hereinafter with the selective control of keys 36, 37 and 38.

The shifting mechanism will operate until the carriage reaches its left end position when the resetting mechanism, having been enabled during the first cycle of operation, effects a resetting operation. During the resetting operation the override pawl 107 (Fig. 7) on the right end of the carriage, similar to override pawl 107 (Fig. 5), operates in a conventional manner to engage slide 191 (Figs. 4 and 6) and move it downwardly. Slide 191 operates bellcrank 192, link 193, and arm 194 to rock shaft 195 in a clockwise direction. The rocking of shaft 195 operates through arm 196 to raise pusher link 154 (Figs. 6 and 8) out of operative engagement with pusher rod 158 and thereby disable the resetting control. Raising of the pusher link 154 also moves the pin 159 from engagement with the depending arm 160 to permit restoration of the pusher rod 127 (Fig. 6) to its normally inactive position through the urgency of its spring 128. At the same time that arm 196 lifts the pusher link 154, it operates lever or bellcrank 597 which is pivotally mounted on shaft 147. A pin 598 on the depending arm of bellcrank 597 engaging with a notch in a link 599 is effective, with the rocking of bellcrank 597, to rock arm 600 and shaft 572 to which it is secured. Thus, it can be seen that clockwise movement of the arm 196 not only disables the left shift and zero resetting mechanism, but also serves through the bellcrank 597 to rock shaft 572 clockwise and latch pawl 570 (Fig. 22) counter-clockwise, thereby releasing the power-setting control lever 557 to enable power setting of the plus-minus gears and the beginning of a multiplying operation.

Figure 26:
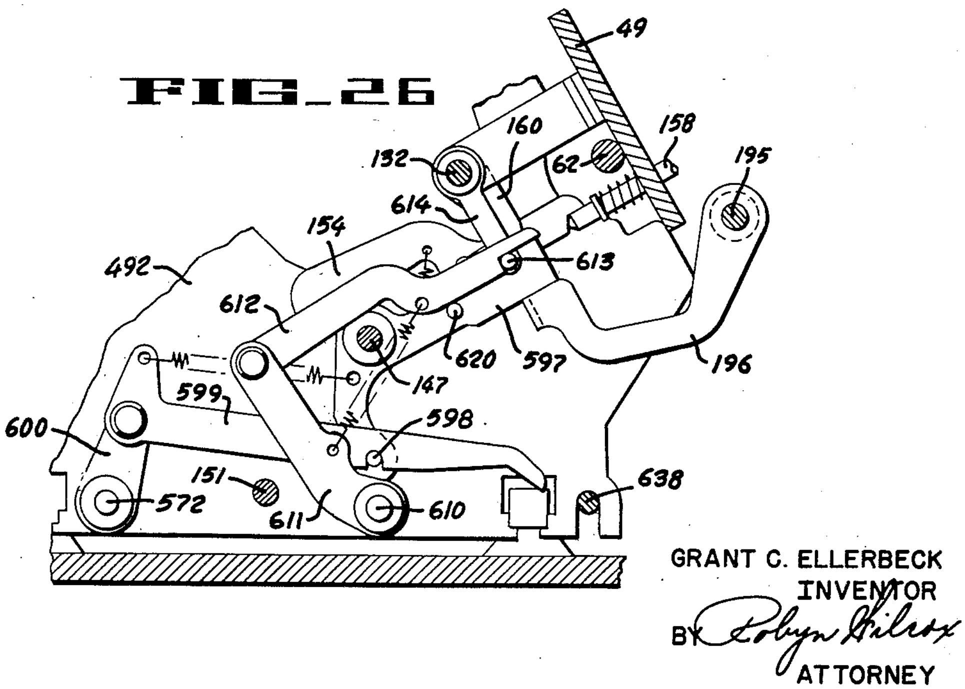
Fig. 26 is a view similar to Fig. 8, but with certain mechanism removed to more clearly illustrate a portion of the left shift control mechanism, the view being taken on the line 26—26 of Fig. 6.

Keys 36, 37, operate generally in the same manner to initiate the multiplying operation with a return of the carriage to its left end position. The respective levers 497 and 498 operated by keys 36 and 37 overlie a pin 605 (Fig. 22) carried by a lever 606 which is pivotally mounted similarly to levers 497, 498, on shaft 499. Lever 606 has a pin 607 engaging a forked end of link 608 pivotally connected at its lower end to an arm 609 secured at one end of shaft 610. Shaft 610 (Fig. 26) carries an arm 611 having a spring-urged pusher link 612 pivoted thereon with its notched end engaging a pin 613 carried by an arm 614 depending from, and secured to shaft 132 which, through the arm 134 (Fig. 6) and pusher rod 127, controls the left-hand shift mechanism.

Thus, upon depression of either of keys 36 or 37 the operation starts with carriage shifting, but the resetting mechanism is inactive, so that the amount entered is cumulative to the amounts in the accumulator and the counter.

The depression of either of keys 36 or 37 through the movement of the lever 606 and the depending portion 615 thereof, which engages a pin 616 on an extended ear of an upstanding arm 617, serves to rock the arm 617 (Fig. 22) and shaft 151 counter-clockwise. The rocking of the shaft 151 (Fig. 4) imparts clockwise rotation to the upstanding arm 618 and by its engagement with pin 619 on the clutch engaging slide 81, which abuts pin 85, causes engagement of the clutch and also closing of the motor circuit.

From the above it is seen that either of multiplication keys 36 or 37 will effect operation of the machine to return the carriage to its left end position. During the overstroke cycle, with the carriage in its left end position, no resetting operation occurs, but the override pawl 107 (Fig. 7) operates conventionally through slide 191 (Figs. 4 and 6), bellcrank 192, link 193, arm 194, and shaft 195 to rock the arm 196. Hence, the bellcrank 597 (Fig. 26) and a pin 620 thereon is raised to lift the pusher link 612 out of engagement with the pin 613 to thereby disable the shift connection to the left shift mechanism. With this lifting or counter-clockwise movement of the bellcrank 597, the link 599 becomes operative through arm 600 to rock shaft 572 and move latch pawl 570 to release the power-setting control lever 557 in the same manner as described in connection with key 38.

*Multiplier feed enabling mechanism*

Figure 18:
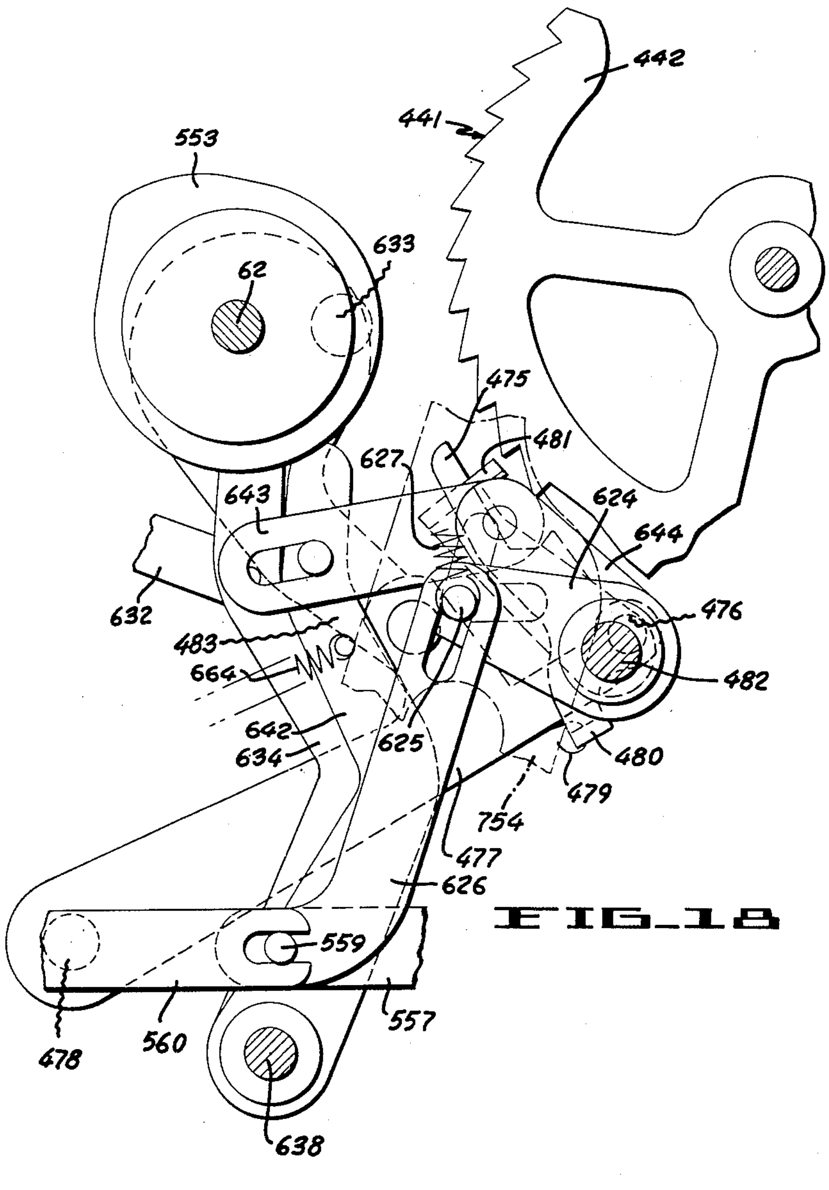
Fig. 18 is an enlarged fragmentary sectional elevational view of the conventional multiplier segment actuator and the controls therefor.

At about the time the power-setting operation of the plus-minus gears is effected, the feed pawl for the racks of the pin carriage is also enabled. Referring now to Figs. 18 and 22, the feed pawl 475 is enabled by release of the holding pawl 481. Shaft 482, suitably journalled in frame plate 493 and auxiliary frame 520, has the holding pawl 481 mounted thereon at its one end, and at its other end carries an arm 624 having a pin 625 engaging the slotted end of a link 626 pivotally connected by pin 559 on power-setting lever 557 for movement therewith. Pin 625 is also engaged by a spring 627, which constantly urges arm 624 and shaft 482 to move the holding pawl in a clockwise direction as viewed in Fig. 18. Therefore, upon release and operation of power-setting lever 557, arm 624 and the holding pawl 481 are also released to allow the feed pawl 475 to move into engagement with the aligned rack 442.

*Accumulator and pin carriage shift control*

As pointed out, irrespective of which key 36, 37 or 38 is depressed, after the initial carriage return, or carriage return and resetting operation, the multiplying operation proceeds in the same manner, once it is enabled by the override pawl of the shift mechanism upon return of the carriage to its left end position. It will be recalled that upon overstroke of the left shift mechanism, the power-setting means for the plus-minus gears is brought into play and also the step-by-step return of the aligned multiplier rack is enabled by movement of pawl 475 to active position. Upon conditioning of the parts during the multiplying operation, when the plus or minus gears have been engaged by operation of the respective arms 504, 536 through power-setting bellcrank 506, the bellcrank is then latched in active position. Also the rack 442, in active position, is then returned step-by-step with the oscillation of pawl 475 by the arm 477 and pitman 483.

Figure 25:
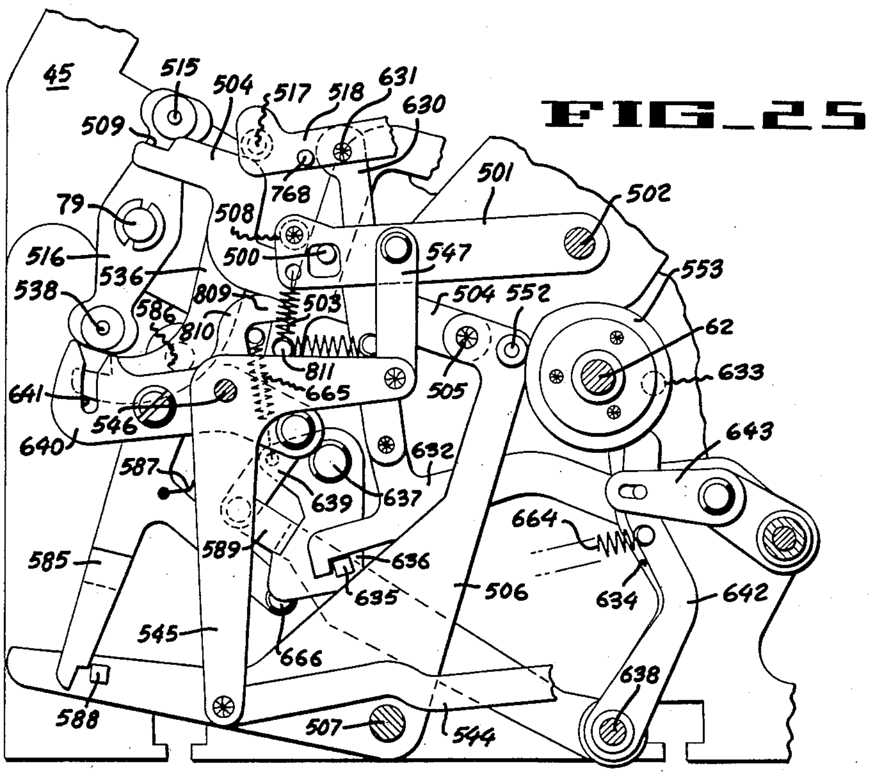
Fig. 25 is a sectional elevational view showing the rear portion of the machine from the left side, the view being taken on the plane 25—25 of Fig. 14.

During its last step of movement, the active rack 442 engages the ear 530 of the arm 529 (Fig. 23) and with the channelled member 522 in the position shown, rocks the arm 518 and the pin 517 downwardly to move the active arm 504 or 536 out of engagement with the respective pin 515 or 538. The lever 516, shaft 79, and the plus-minus gears are then restored to their neutral position, for a shifting operation, under control of their usual centralizing means. This release is effected before completion of the registering operation, but lever 516, shaft 79, and the plus-minus gears are held in engagement until the end of the last registering cycle by a conventional form of cycle lock (not shown). The oscillating movement of arm 529 and therefore arm 518, through the member 522, also serves with link 630 pivoted to arm 518 at 631 to lower hooked member 632 (Fig. 25). Member 632 is constantly oscillated during multiplication by the cyclic engagement of the pin 633, carried by disk 553, with arm 634 to which arm 632 is pivotally connected. By such lowering, the hooked end of member 632 can engage the square pin 635 on the latch pawl 636, which is pivoted at 637 and normally latches arm 589 secured on shaft 638 in the position shown in Fig. 25. Arm 589 is connected by link 639 with centralizing lever 640 pivoted on shaft 546 and having a slotted end 641 for engagement with pin 538 of the lever 516, so that during the shifting cycle the lever 516, shaft 79, and plus-minus gears are positively held in centered position where they are moved by the well-known form of centralizing mechanism. Release of the latch 636 effects a rocking movement of the arm 589 and shaft 638 under the urgency of a spring 664 hooked at one end to an arm 642 also secured on shaft 638. The other end of the spring is hooked to a stud on the frame.

Figures 27, 39:
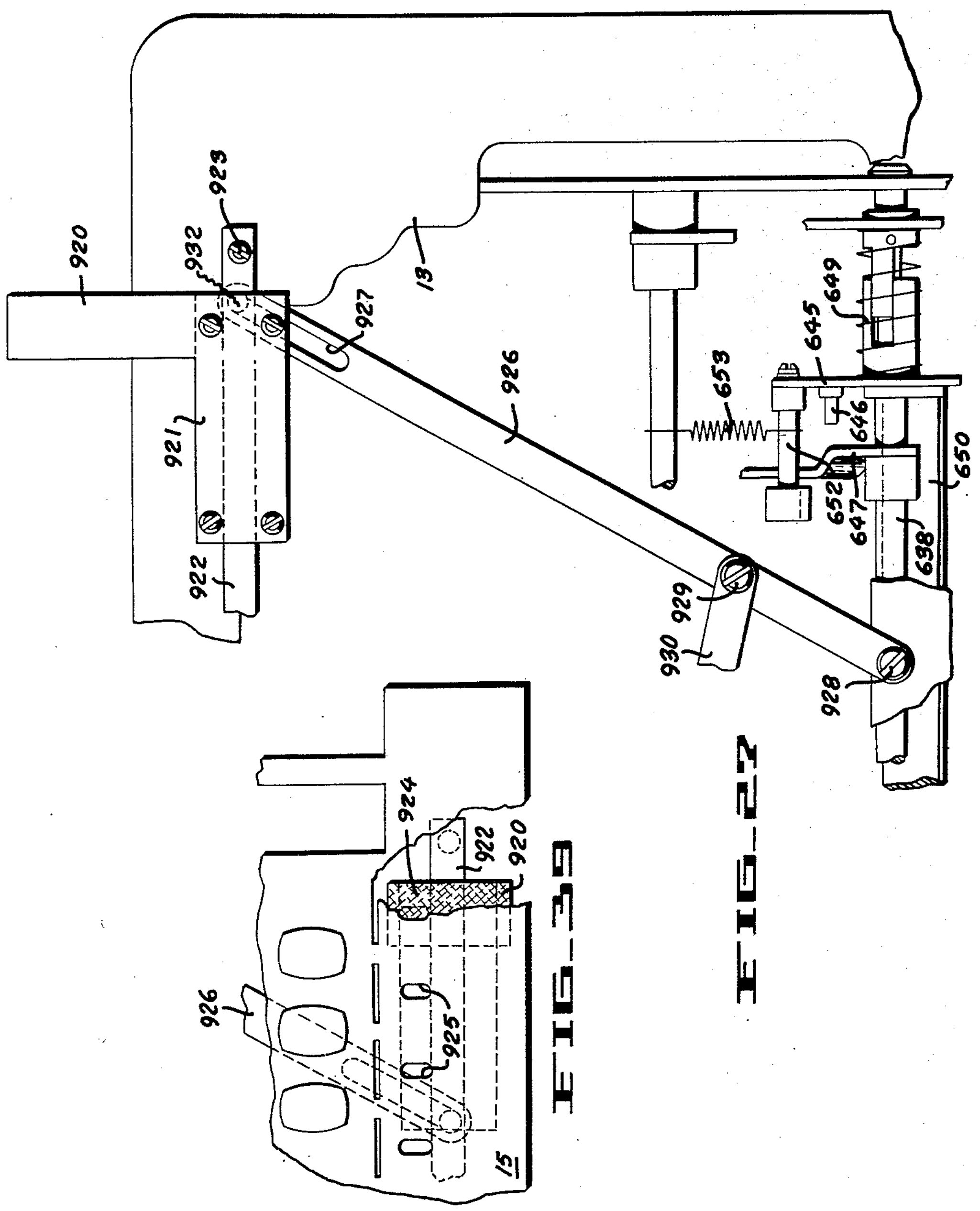
Fig. 27 is a fragmentary view taken from the underside of the machine to show the multiplication operational control for the right shift mechanism.
Fig. 39 is a fragmentary plan view of the front of the machine showing the keyboard ordinal indicator.
Figure 28:
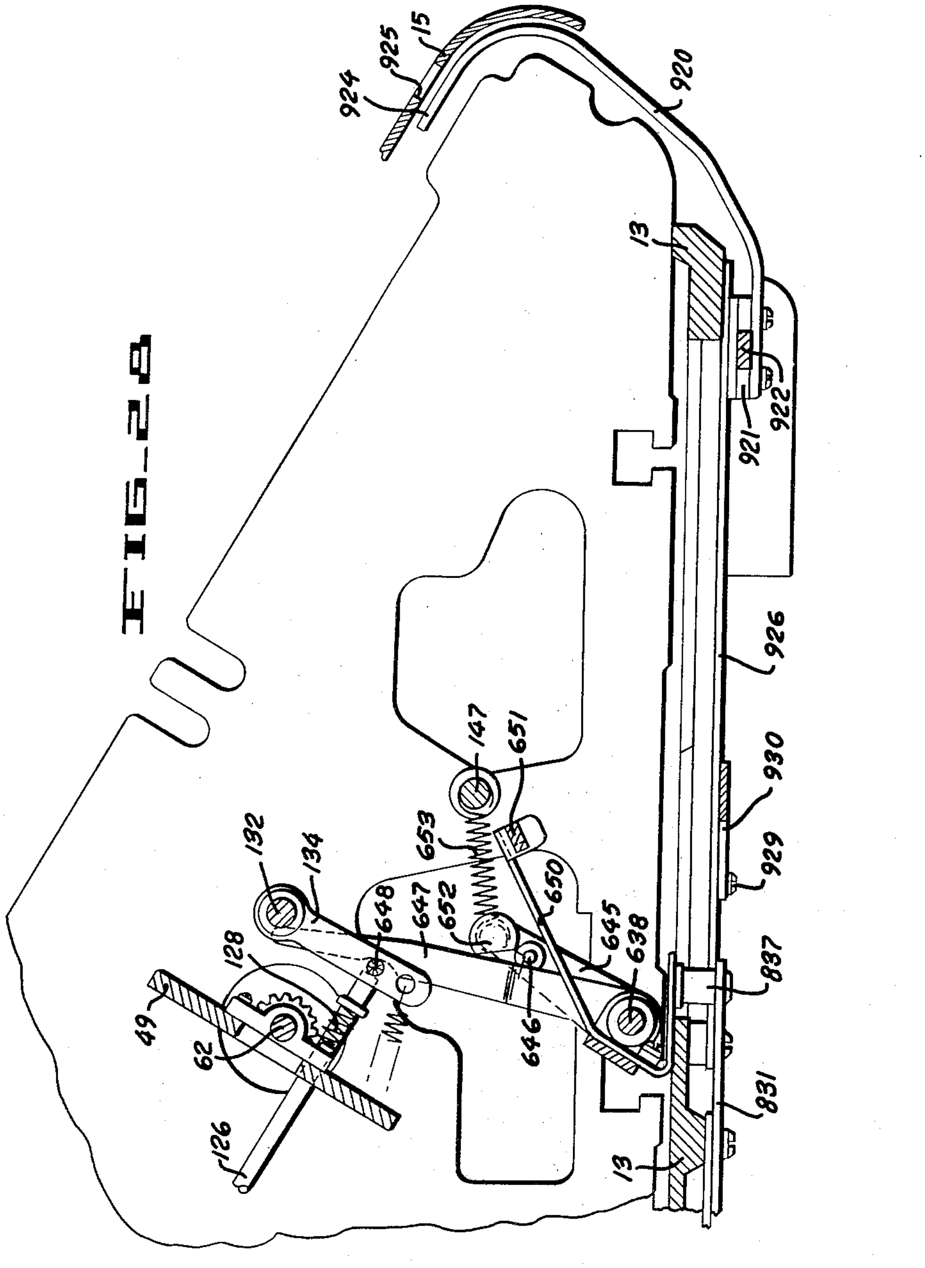
Fig. 28 is a sectional elevational view of the multiplication operation control of the right shift mechanism taken on the line 28—28 of Fig. 6.

The rocking movement of arm 589 and shaft 638 also serves through the arm 642 and link 643 (Figs. 18 and 25) to rock arm 644 pinned to the shaft 482 carrying holding pawl 481, and therefore moves the actuating pawl 475 to its inactive position during a shifting cycle. Shaft 638 also serves to engage the right shift mechanism and for this purpose has an arm 645 (Figs. 6, 27 and 28) slidably and nonrotatably engaged thereon. Arm 645 carries a pin 646 near its upper extremity, which is normally out of operative alignment with an arm 647 pivotally mounted on shaft 638 and engaging a pin 648 on the depending arm 134 to control the right shift push rod 126 (Fig. 28). The arm 645 is held against the urgency of a spring 649 by a slide 650 which is slidably mounted on shaft 638 and abuts shift rack 651 of multiplier pin carriage 441, see also Fig. 29. Arm 645 also carries a cylinder head stud 652 (Figs. 27 and 28) having a flat surface for adjustable engagement with the right shift control arm 647 when moved to the right as viewed in Fig. 27, and is normally urged clockwise by spring 653. The first step of shifting movement of carriage 441 and its rack 651 to the left, as viewed in Figs. 27 and 29, during setting up of the multiplier, is insufficient to align the pin 646 with right shift control arm 647, and such alignment occurs only after the second shift, i. e., when the second multiplier digit is entered, which is the extent of sliding movement permitted of slide 650 and arm 645. The purpose of the cylinder head stud 652 on arm 645 will be described hereinafter. Shaft 638 (Figs. 30, 31 and 32) also carries an arm 658 having a pin 659 engaged with a grooved collar 660 carrying a slidable actuator 661 for shift rack 651 of the pin carriage 441, so that this shift is also enabled by the same rocking movement of shaft 638 against the urgency of spring 653 (Fig. 28) connected to arm 645.

Figures 30, 31, 32:
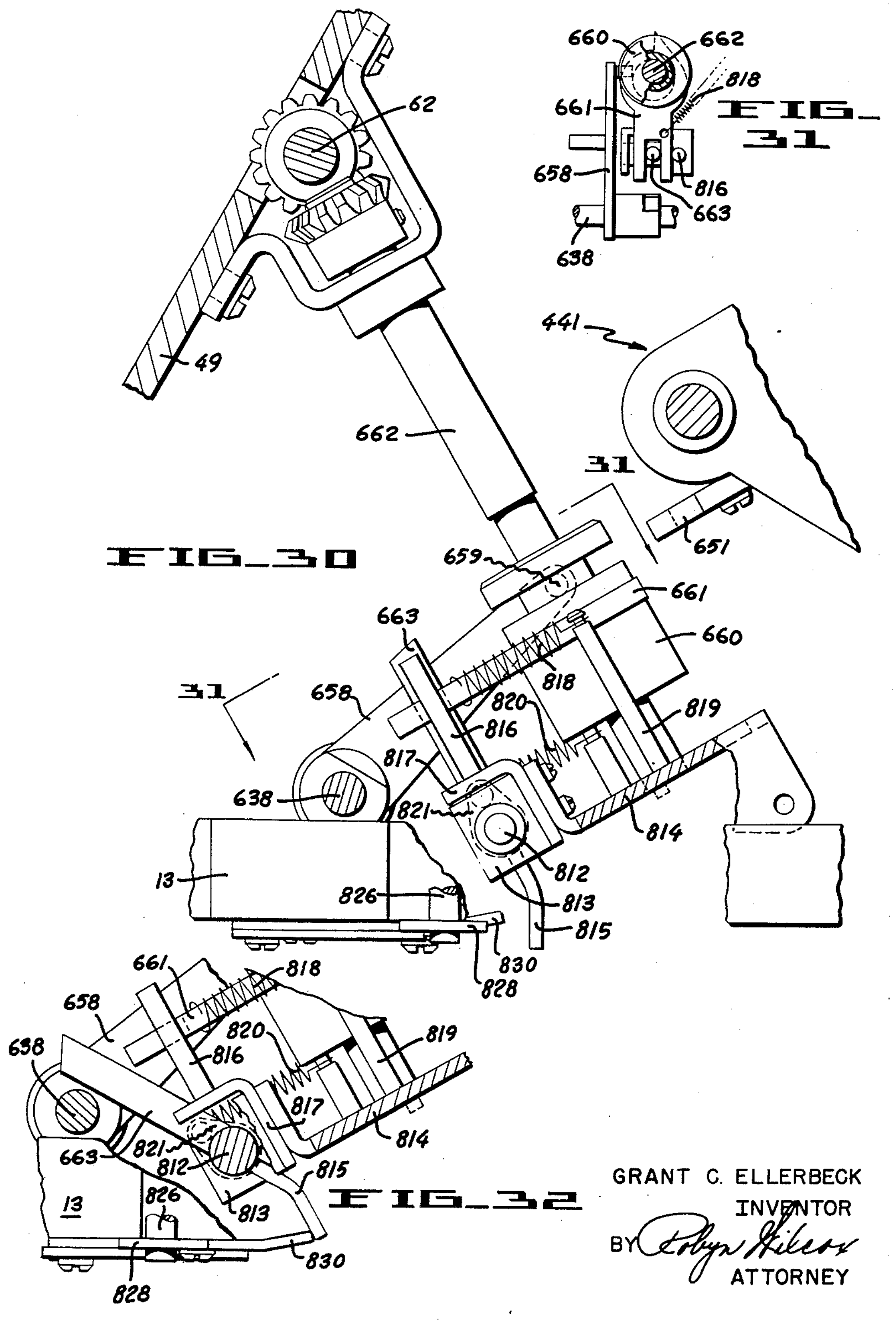
Fig. 30 is an enlarged elevational view of the right shift actuator effectively operative to shift the multiplier pin carriage, the view being taken on the line 30—30 in Fig. 29.
Fig. 31 is a plan view of the multiplier pin carriage actuator taken on the line 31—31 of Fig. 30.
Fig. 32 is a fragmentary view similar to Fig. 30 showing the pin carriage right shift actuator disabled.

The toothed actuator or shift lever 661 is apertured to engage an eccentric portion of the shiftable collar 660 (Fig. 31) nonrotatably mounted on the vertical shaft 662, and is normally in an inactive position below rack 651 as seen in Fig. 30. It will be recalled that shaft 638 is rocked counter-clockwise (Figs. 18, 25 and 30) by the overstroke of the active multiplier rack 442, when the hooked member 632 is dropped, together with the arm 518 to engage the square stud or pin 635 of the latch pawl 636 to effect its release. Therefore, arm 589 is rocked under the urgency of spring 664, so that the multiplier feed mechanism is disabled through the arm 642 and link 643 and the pin carriage shift is enabled simultaneously with the accumulator carriage shift.

The accumulator and pin carriage shift mechanisms, during the multiplying operation, are disabled after one cycle of movement if a value other than "0" is set in the next active multiplier rack 442. The arm 642 (Figs. 18 and 25) secured on shaft 638, normally lies out of the path of pin 633 on disk 553 when the arm 589 is in its latched position as seen in Fig. 25. However, upon delatching and rocking of arm 589 and rocking of shaft 638, arm 642 is positioned in operative relation to the pin 633 and during the shift cycle is engaged by the pin 633 to restore arm 589 for latching engagement by latch pawl 636 under the influence of its spring 665.

Power-setting bellcrank 506 is delatched during the shift cycle by the engagement of lever 589 with a pin 666 on latch lever 585 so that the plus-minus gears, which are in inactive position during shifting, can be reset by bellcrank 506 and cam disk 553 at the beginning of the next cycle, if the next active multiplier rack 442 is set to a multiplier digit value. If the next succeeding rack 442 is not set to a value, i. e., is at "0," another shifting cycle follows immediately by the retention of arm 518 in the shift enabling position as previously described.

Multiplier correction key 39 for erasing amounts set into the multiplier pin carriage without entry of values into the accumulator or counter, may be similar to, and operates in, the same manner as shown in said Patents No. 2,371,752 and No. 2,399,917 to which reference is to be had for a more complete disclosure of the foregoing multiplier mechanism.

*Multiplication key release*

The release of a depressed multiplication key is controlled in the conventional manner disclosed in said Patent No. 2,371,752. Briefly, as the pin carriage 441 in shifted to its normal inactive position, where the leftmost indicating dial is to the right of the opening 443 therefor in the casing, carriage 441 in engagement with the upright end 446 of pivoted spring-urged bellcrank 444 (Fig. 21) effects a rocking movement thereof. The other arm 495 of bellcrank 444 is operatively related to the lower end of latch lever 489 of the key latch assembly (Fig. 17), so that the rocking movement of bellcrank 444 acts to move a latch tooth 490 out of engagement with the depressed key which is therefore free to rise. It will be understood that upon depression of any multiplier key 34 the carriage is shifted under the control of its escapement mechanism so that bellcrank 444 is disabled with respect to the multiplication key latch mechanism. This is true whether or not the keys 34 from "1" to "9" are used in entering a multiplier digit or whether the "0" key 34*a* is used in order to control a carriage tabulation to a selected ordinal position.

*Quotient multiplier*

As disclosed hereinbefore, the resulting quotient of an automatic division operation is invariably registered positively as a true quotient in predetermined dials of the accumulator. It will be recalled similarly, that the quotient may be selectively registered positively or complementally in the revolutions counter, or, when desired, the counter may be automatically disabled to prevent the registration of the quotient therein. When it is desirable, any such quotient registered in the accumulator becomes very useful as a multiplier in a subsequent operation. For example, in performing the mathematical function $$\left(\frac{a}{b}\times c\right)$$

an automatic division operation is first initiated by the depression of key 32 alone, the simultaneous depression of keys 32, 33 or the depression of the key 33 immediately followed by the depression of key 32. It will be remembered, that in using the latter method of initiating a division operation there will be no quotient registration in the revolutions counter. The value of "*c*" is then set in the keyboard and a multiplication control key 36 or 38 is depressed, with the resulting product appearing in the accumulator or product dials, and the quotient, which became a multiplier, registered in the revolutions counter.

When a value in the predetermined dials of the accumulator is to be utilized as a multiplier, each control key 36 and 38 conditions the machine for a multiplying operation as will now be described. When either key is depressed and latched in depressed position, several functions of the machine are set into operation in a well-known manner. These functions include enabling of the control which determines the sign character of the registration of the product, enabling of the power-set means for operating the sign character control, enabling of the carriage shift mechanism to determine a return of the carriage to an end position, selective enabling of the resetting mechanism for the accumulator and the revolutions counter, engaging the clutch, and enabling the motor circuit. In addition to these functions, the depression of either key 36 or 38 operates to engage the cyclically operable clutch for controlling each outboard order dial 17 of the accumulator, to disable the control by the multiplier pin carriage of the right shift mechanism for the pin carriage and accumulator carriage, to disable the resetting mechanism with respect to predetermined outboard orders of the accumulator, and to disable the control for enabling feed pawl 475 for the multiplier elements 442.

Referring to Fig. 1, values entered in any or all of the register dials so designated, that is, the 13th to the 22nd inclusive, become effective in each operative ordinal position thereof to control the multiplying operation. As previously described, the predetermined engagement of the clutch members 338, 390 (Figs. 14 and 15) causes the square shaft 389 and therefore the plus-minus gears 72, 73 of the 13th machine order to be rotated one-tenth of a rotation for each machine cycle, and in a direction opposite to that of the square shafts 57 and their respective plus-minus gears 72, 73. Therefore, engagement of the gears 72 (Fig. 2) with the gears 74, causes an additive rotation of the register dials 17 through the square shafts 57. However, cam 398 (Fig. 5), cam follower 399, arm 391 and ratchet clutch member 390 integral therewith serves through driven clutch member 388, when engaged with member 390 as seen in Fig. 15, to impart counter-rotation to shaft 389 and its gear 72. Thus, each dial shaft 76 and its register dial 17, when ordinally shifted for operative engagement with the gear 72 on shaft 389, receives a negative registration. Therefore, the value in each register dial successively associated with the gear 72 on the shaft 389 is reduced to "0," and each of these subtractive cycles is counted positively in the revolutions counter, while the value in the keyboard is registered in the accumulator a number of times determined by the number of cycles required to reduce such value to "0." As each such dial reaches its "0" position, means are provided to centralize the plus-minus gears 72, 73, and thereby initiate a shift cycle to move the next higher order multiplier value into operative relation with the shaft 389 and its gear 72, which is again engaged with the dial shaft 76 of this higher order.

Figure 8:
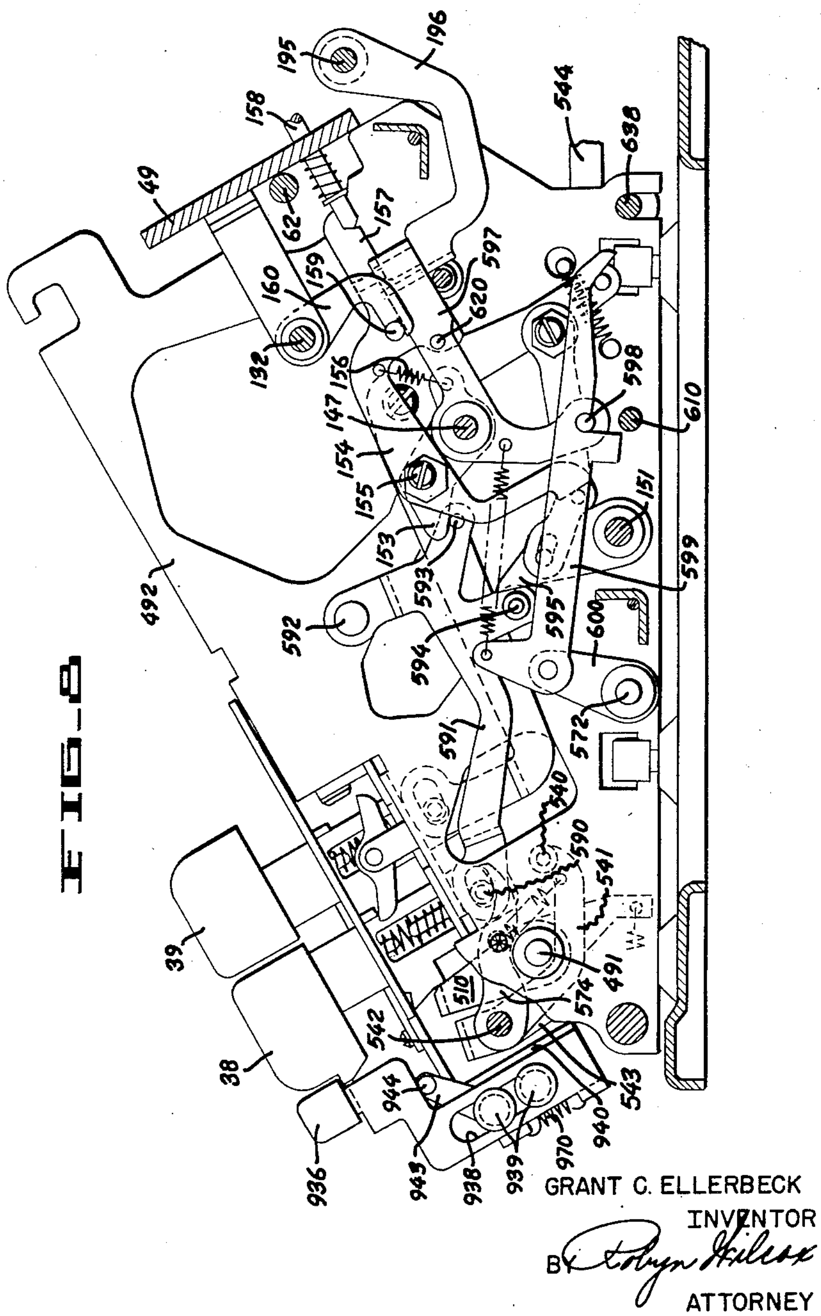
Fig. 8 is a sectional elevational view of a portion of the multiplier mechanism showing the control linkage associated therewith, the view being taken on line 8—8 of Fig. 1.

The mechanism associated with the multiplication key 38 for controlling a multiplying operation from the register dials will now be described. Referring to Fig. 8, it will be recalled that depression of multiply key 38 through lever 591 and roller 593 thereon, rocks arm 153 and shaft 147 clockwise, moving the pusher link 154 and therefore resetting shaft 158 rearward to engage the zero resetting mechanism. The rearward movement of pusher link 154 and pin 159 rocks arm 160 and shaft 132 counterclockwise, and through arm 134 (Fig. 6) moves the left shift push rod 127 rearward to engage the left shift clutch. Upon depression of key 38, the roller 590 rocks the arm 574 (Fig. 8) and shaft 542 clockwise, or counterclockwise as seen in Fig. 22, whereby the roller 567 on U-shaped member 566 serves to rock the nose of the bellcrank 563 from beneath the ear of lever 557. The lever 557 is thereby conditioned for clockwise rotation by spring 562 upon disengagement of the latch lever 570 with the pin 571. Depression of the key 38 also serves through roller 540 (Fig. 8) and arms 541, 543, to pull the link 544 to the right, as viewed in Fig. 25, to thereby rock bellcrank 545 counterclockwise. The link 547 then operates with bellcrank 545 to move roller 508 and arm 501 upwardly, so that positive setting arm 504 is free to rise and engage its notch 509 with the pin 515 (Figs. 22, 23 and 25) under the urgency of spring 503 following the clockwise rotation of arm 518. To engage the motor clutch (Figs. 4 and 8) and to close the motor contacts a roller 594 on the lever 591 engages an arm 595 to impart a clockwise rotation to shaft 151 and arm 618 secured thereto. When rocked, arm 618 engaging pin 619 moves slide 81 rearwardly, and with pin 85 rocks lever 82 clockwise and through link 86, arms 87 and 89 closes the motor contacts.

As previously described, rocking of shaft 151 rocks arm 617 (Figs. 22 and 33) and the yieldable pawl member 670, pivotally mounted thereon at 671, in a counterclockwise direction. The pawl 670 is spring-urged clockwise to a position where a pin 672 (Figs. 33 and 34) abuts the upper surface of the arm 617, said spring (not shown) being hooked at its one end to the pin 672 and at its other end to a pin on the arm 617. With the counterclockwise rotation of the arm 617, the nose of the pawl 670 engages a pin 673 pivotally connecting the multiplier conditioning lever 674 with the link 675, to move the lever 674 and its pin 676 downwardly for operative engagement by a finger 677 of a fork member 678 pivoted at 679 to the side frame 493. Lever 674 (Figs. 33 and 35) is spring-urged to the normally inactive position shown by a spring 680.

The control for each multiplying operation is automatically determined by the position of the lever 674 with respect to the pawl 670 prior to the depression of a multiplication key. When a multiplier factor has been set in the elements 442 of the pin carriage 441, lever 674 is moved to a position where the rocking of arm 617 and pawl 670 is ineffective to move lever 674 downwardly upon depression of a control key. Thus, the ensuing multiplying operation is carried out in a conventional manner. However, if a value standing in any of the bracketed ten dials (see Fig. 1) of the accumulator is to be used as a multiplier for controlling a multiplication operation, the lever 674 is positively held in the position shown in Fig. 33 by the multiplier pin carriage when in its inoperative or extreme right-hand position. Thus, the rocking of the arm 617 and pawl 670 is effective, upon depression of a control key, to move the lever 674 downwardly.

Figure 33:
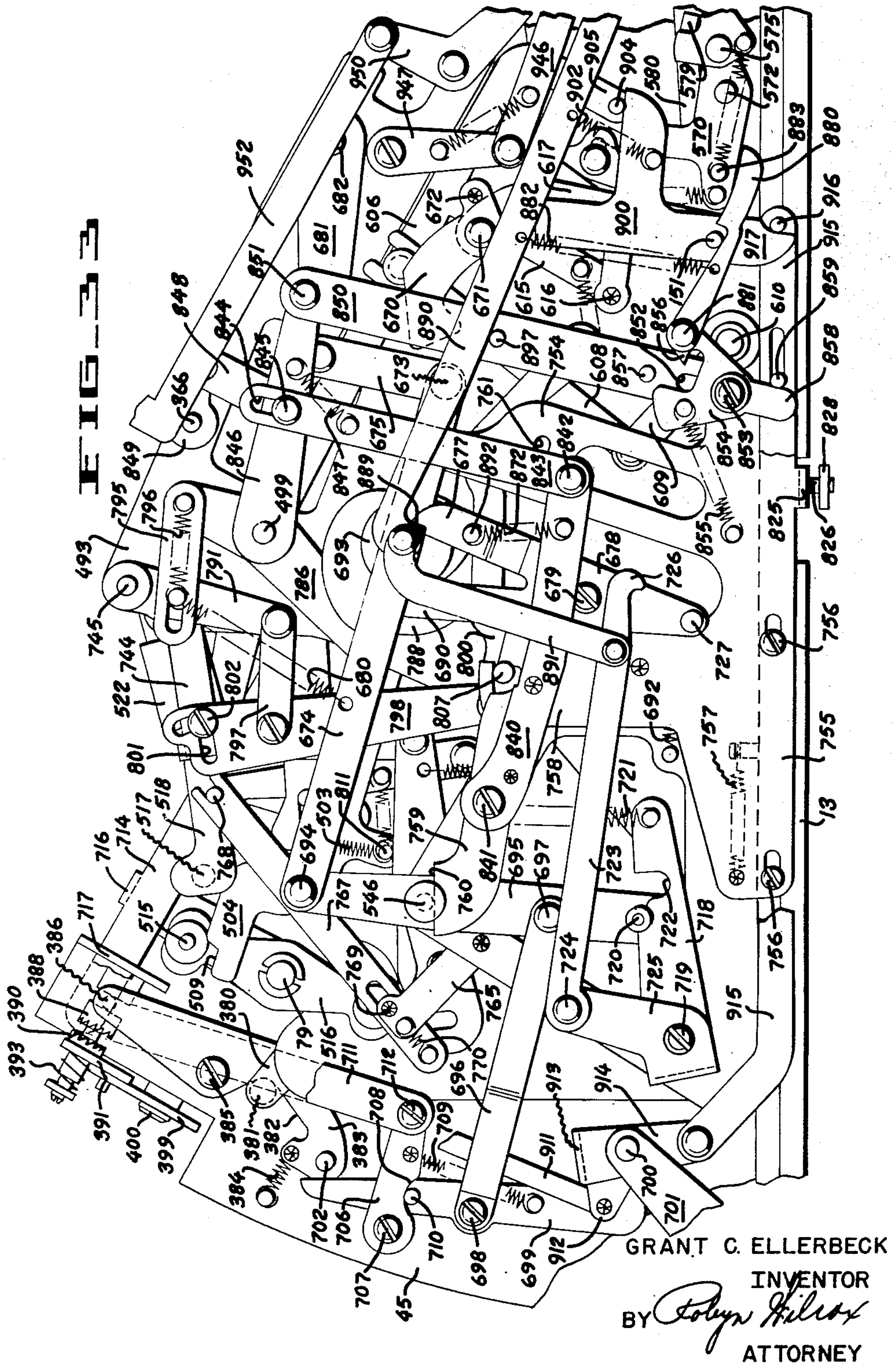
Fig. 33 is a composite elevational view of the left side of the machine.

An arm 681 secured to shaft 682 is pivotally connected to one end of link 675, the other end of which is connected at 673 to the lever 674. The urgency of the spring 680 normally serves therefore to maintain pin 683, which is integral with shaft 682, in engagement with the peripheral surface of a cylinder 684 (Figs. 11 and 17) secured to the left side frame of the pin carriage 441 and slidable therewith on shaft 685. It is readily apparent that the initial ordinal escapement of the pin carriage 441, upon depression of a multiply key 34, will cause the pin 683 and shaft 682 (Fig. 17) to be rocked counterclockwise under the urgency of the spring 680 (Fig. 33), thereby moving the pin 673 upwardly out of the path of the pawl 670. However, the last step of return movement of the pin carriage 441 to the right will cause the chamferred end of the cylinder 684 to cam the pin 683 (Fig. 11) to the position shown therein, thereby restoring the multiplier conditioning lever 674 to its normally operative position with respect to pawl 670 as indicated in Fig. 33.

Upon depression of key 38, the pin 676 on lever 674 is moved downwardly, by the rocking of pawl 670, into the arcuate path of the one finger 677 of the forked power member 678. A roller 691 on the other finger 690 of the forked member 678 is urged by a spring 692 to follow an eccentric cam 693 secured to drive shaft 62. The cam 693 becomes operative in the first 180° of the first machine cycle to rock the forked member 678 counterclockwise and thereby move the lever 674 to the left as viewed in Figs. 33 and 35. The lever 674 is pivotally connected at 694 (Figs. 13 and 33) to the upper extremity of a two-armed lever 695 mounted for counterclockwise rotation about the shaft 546.

Lever 695 and the mechanism controlled thereby is maintained in the operative position thereof by a latch arm 718. Latch arm 718 (Figs. 13 and 33) pivoted on stub shaft 719 of the frame 493 is urged into engagement with a roller 720 on the lower extremity of the two-armed lever 695 by a spring 721. As the arm 695 is rocked counter-clockwise (Fig. 33) a deep notch 722, in latch arm 718 engages the roller 720 to retain the arm 695 in its rocked position. Upon engagement with the roller 720, the notch 722 is of a depth sufficient to cause rearward movement of the link 723 by its connection 724 with the integral arm 725 of the arm 718. A hook nose 726 of the link 723 is thereby operatively positioned with respect to a pin 727 at the lower extremity of the forked power member 678 so that, when engaged therewith in the last cycle of the multiplying operation, the latch 718 is released and the mechanism associated with the lever 674 and lever 695 is restored to its normally inactive position. Such release of this mechanism to be described later.

The rearward movement of the multiplier conditioning lever 674 and the counter-clockwise rocking of lever 695 serves many functions which will now be described in order. One of such functions is the engagement of the driven clutch member 388 (Figs. 14 and 33) with the driving clutch member 390 to effect a one-tenth rotation of the shaft 389 with each cycle of the machine. For this purpose, a link 696 is connected at its one end at 697 to the lower arm of the two-armed lever 695, intermediate the shaft mounting 546 and the lower extremity thereof. At its other end the link 696 is connected at 698 to an upstanding arm 699 rockably mounted on a shaft 700, which is journalled in the side frame 45 and in a bracket 701 secured to the base 13. Therefore, counter-clockwise movement of the arm 695 rocks the arm 699 clockwise about the shaft 700, as seen in Figs. 13 and 33, into engagement with a pin 702 on the lever 383 thereby rocking lever 383 and pin 386 counterclockwise to engage the driven clutch member 388 with the driving member 390.

It will be recalled that depression of the multiplier key 38 is first effective to cause a shift of the carriage to its leftmost position and to selectively zeroize the accumulator, the counter, or both, in accordance with the adjustment of the resetting mechanism. Thus, it becomes readily apparent that following engagement of the clutch members 388 and 390, each machine cycle during the left shift operation, will cause a one-tenth rotation of the shaft 389 (Fig. 14). However, such rotation of the shaft 389 and the gears 72, 73 mounted thereon, is ineffective with respect to the accumulator dial shafts 76 until the carriage reaches its leftmost position, when the notch 509 of the setting arm 504 is engaged with the pin 515 and the power-setting bellcrank 506 is effective to rock lever 516, thereby engaging the gears 72 with the gears 74 of the dial shafts 76 (Fig. 2).

During the left shift and resetting operation it is necessary to retain the value in the left ten register dials, since it subsequently becomes operative as a multiplier to control the ensuing multiplication operation. Means are therefore provided to disable or prevent resetting of the left ten register dials to zero when using the value therein as a multiplier. For this purpose, an arm 706 is mounted for rocking movement on side frame 45 at 707 and has an arcuate surface 708 in the lower edge thereof which is urged by spring 709 into engagement with a pin 710 on arm 699. At its free end the arm 706 is pivotally connected to a link 711 at 712, the other end of link 711 being connected at 713 to a rockable arm 714 (Figs. 14, 22 and 33). Arm 714 (Figs. 22 and 33) is mounted for clockwise movement about its pivot 715 on auxiliary frame plate 520 (Fig. 24) and carries a camming ear 716 formed at right angles thereto as seen in Fig. 14. Ear 716 lies in a position midway of plus-minus gears 72, 73, when such gears are in their centralized or neutral position. Thus, it can be seen, that the clockwise movement of arm 699 (Figs. 13 and 33) is operative through pin 710, arm 706, and link 711 to rock arm 714 upwardly guided by a slot in a bracket 717 secured to the side frame 45.

When the accumulator quotient or any value in the left ten dials is to be used as a multiplier, zero resetting of the twelve inboard order dials is effected without resetting of the outboard order dials, by the independent operation of the resetting rack bars 182 (Figs. 7 and 36) with respect to the rack bars 730. For this purpose, the lower rack bar 730 (Fig. 36), which is integral with the upper bar, carries a latch arm 731 pivotally journalled in a bracket 732 of the bar 730 and has a nose 733 for engagement with a depending tooth 734 of the integral rack bars 182. The nose 733 is normally maintained in engagement with the tooth 734 by a compression spring 735. Normally, therefore, the rack bars 182 and 730 function as a unit, i. e., the leftward movement of the bars 182 (Fig. 36) also moves the bars 730 resetting all dials 17 to zero in a well-known manner. However, with the counter-clockwise rotation of the two-armed lever 695 (Fig. 33) the camming projection 716 of the arm 714 is moved upwardly where it becomes operative, as the carriage is moved into its leftmost position, or rightmost position as viewed in Fig. 36, to engage the rounded end of a pin 736 and cam it upwardly, rocking the latch arm 731 counterclockwise against the urgency of compression spring 735. The nose 733 is thereby released from the tooth 734 immediately prior to the leftward or zero resetting movement of the bars 182. The pin 736 is guided in this cammed movement by a hole in the carriage frame 104 as seen also in Fig. 16. During the independent movement of the bars 182, the bars 730 are held in their normally inactive position by a spring 737, hooked at one end to a pin on the bars 730 and at its other end to a pin on the inner wall of the carriage frame 104. The bars 182 are restored to their initial or inactive position following the resetting operation by a spring (not shown) and in a conventional manner. With the subsequent shifting of the carriage from its leftmost or first ordinal position, the spring 735 is effective immediately to engage the nose 733 with the tooth 734.

Figure 23:
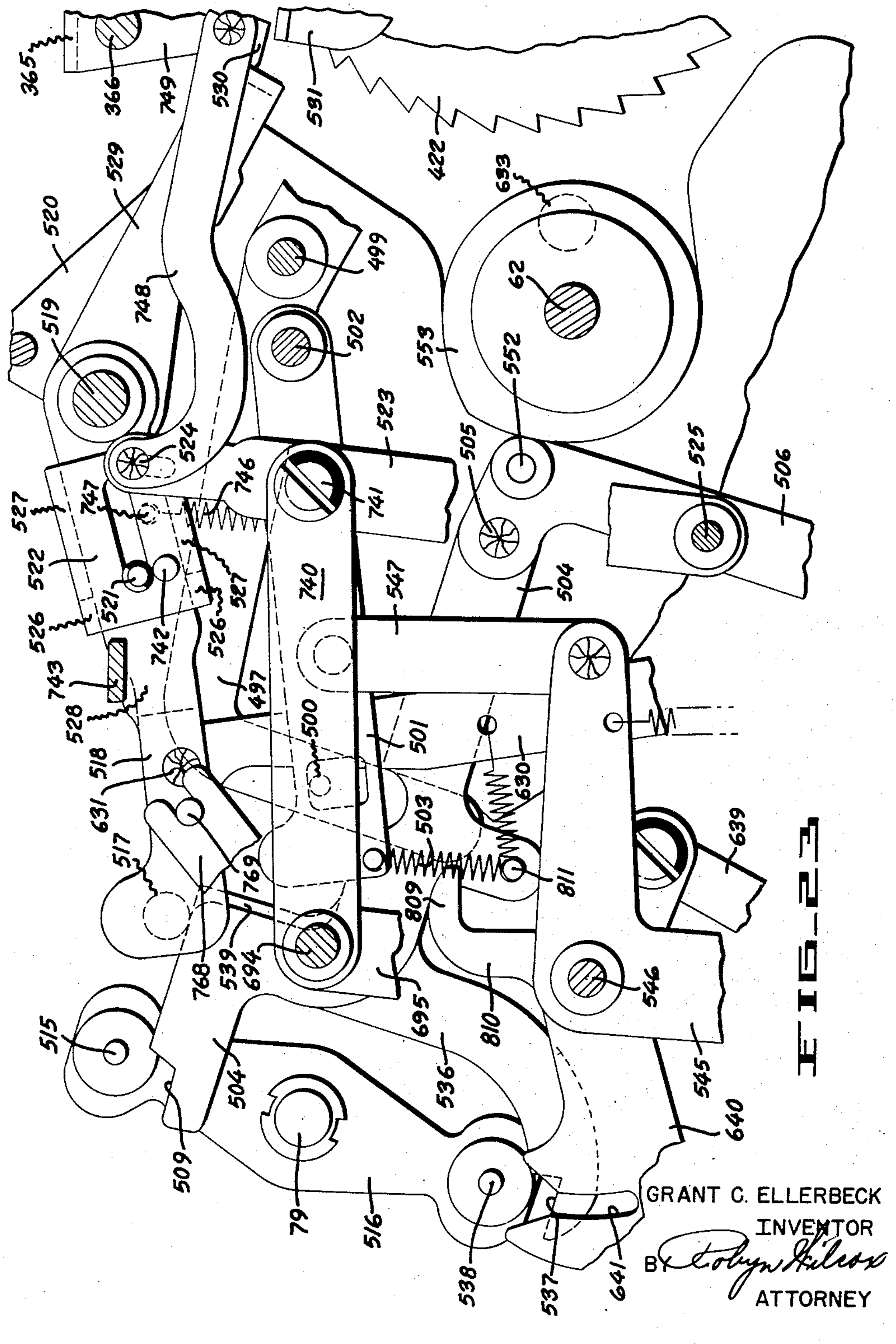
Fig. 23 is a fragmentary elevational view taken from the left side of the machine with the positive and negative multiplication control mechanism illustrated.

As described hereinbefore, with the channeled member 522 in its rightmost position, as seen in Fig. 23, and with a multiplier value in the pin carriage 441, the restoration of each active segment 442 to its zero position rocks the arm 529 and its associated arm 518 counter-clockwise about the shaft 519. Thereupon, the pin 517 effects a disengagement of the notch 509 or 537 from the respective pins 515 or 538 of the lever 516, and simultaneously engages the notch 641 in the lever 640 with the pin 538 to centralize the plus-minus gate 77 and therefore the gears 72, 73. Such rocking movement of the arm 518 also serves to initiate a right carriage shift. However, in using a value in the last, or highest, ten dials of the product register as a multiplier, another means must be employed to rock the arm 518.

For this purpose, a link 740 (Fig. 23) is connected at 694 to the two-armed lever 695, and at 741 with the arm 523 rockably mounted at 525 on the frame 493, which arm has a slot at its upper extremity engaging a pin 524 on the channelled member 522. The leftward movement of the multiplication conditioning lever 674 (Fig. 33) and the counter-clockwise rocking of the lever 695, therefore, slides the channelled member 522 to the left (Fig. 23), whereby a pin 742 thereon is moved to a position beneath the lateral extension 743 of an arm 744 pivoted on shaft 745 (Figs. 23, 24, 33 and 37). In this position of the member 522, the pin 742 is engaged by the extension 743, in the downward movement thereof, to rock the arm 518 and the pin 517 downwardly to disengage the notch 509 from the pin 515 and initiate a right carriage shift in the well-known manner. The arm 518 will rock independently of arm 529, since the ears 526 of member 522 (Figs. 23 and 24) have been moved to a position where the upper ear is no longer contiguous with the rearward extension 528 of the arm 529. When the arm 518 is free to rock independently of the arm 529, that is, when the channelled or coupling member 522 is moved to the left (Fig. 23), as just described, the arm 529 is maintained in its inoperative position by a spring 746, one end of which is connected to an ear (not shown) on the lever 497, and the other end of which is hooked to a pin 747 on the rearward extension 528 of the arm 529.

If, during a previous operation, the counter block out or nonentry key 350 (Fig. 11) and the rearward extension 351 thereof, is moved forwardly, the actuating member 354 (Fig. 10), the depending finger 362 thereof, and the pin 363 are urged forwardly by the upward movement of the slide 257 under the urgency of the spring 259. The laterally extending finger 371 is thereby rocked into blocking relation with the ear 372 on the depending arm 373 of the counter actuator 140. During a multiplication operation in which the automatic multiplying mechanism is controlled by the highest ten dials in the accumulator, it is desirable that this value or multiplier standing therein be transferred to the revolutions counter where it may be accumulated. It is necessary, therefore, that the revolutions counter block-out or nonentry mechanism be disabled during such a multiplication operation. For this purpose, a link 748 is pivotally connected at its one end to a pin 524 on the coupling member 522, and at its other end to a depending arm 749 of the bail 365 (Figs. 10, 12, 23 and 24). When arm 523 is rocked by the lever 695, arm 364, integral with arm 749 and rockable about shaft 366, engages the pin 363 on the finger 362 to move the actuating member 354 rearwardly as seen in Fig. 10. The arm 359 is therefore rocked clockwise to move the slidable member 257 downwardly against the urgency of spring 259, thereby moving the extended finger 371 from its blocking engagement with the depending arm 373 of the counter actuator 140.

Means are provided for control by the rearward movement of the conditioning lever 674 (Figs. 33 and 35) to disable the functioning of the feed pawl 475 (Fig. 18) with respect to the multiplier segments 442, to disable the operation of the ordinal restoring mechanism for the multiplier pin carriage 441, to operatively position the stud 652 (Figs. 27 and 29) and enable the control thereof to initiate a right shift of the accumulator carriage determinable by each multiplier dial 17, and to enable the mechanism for terminating a multiplication operation.

Figure 35:
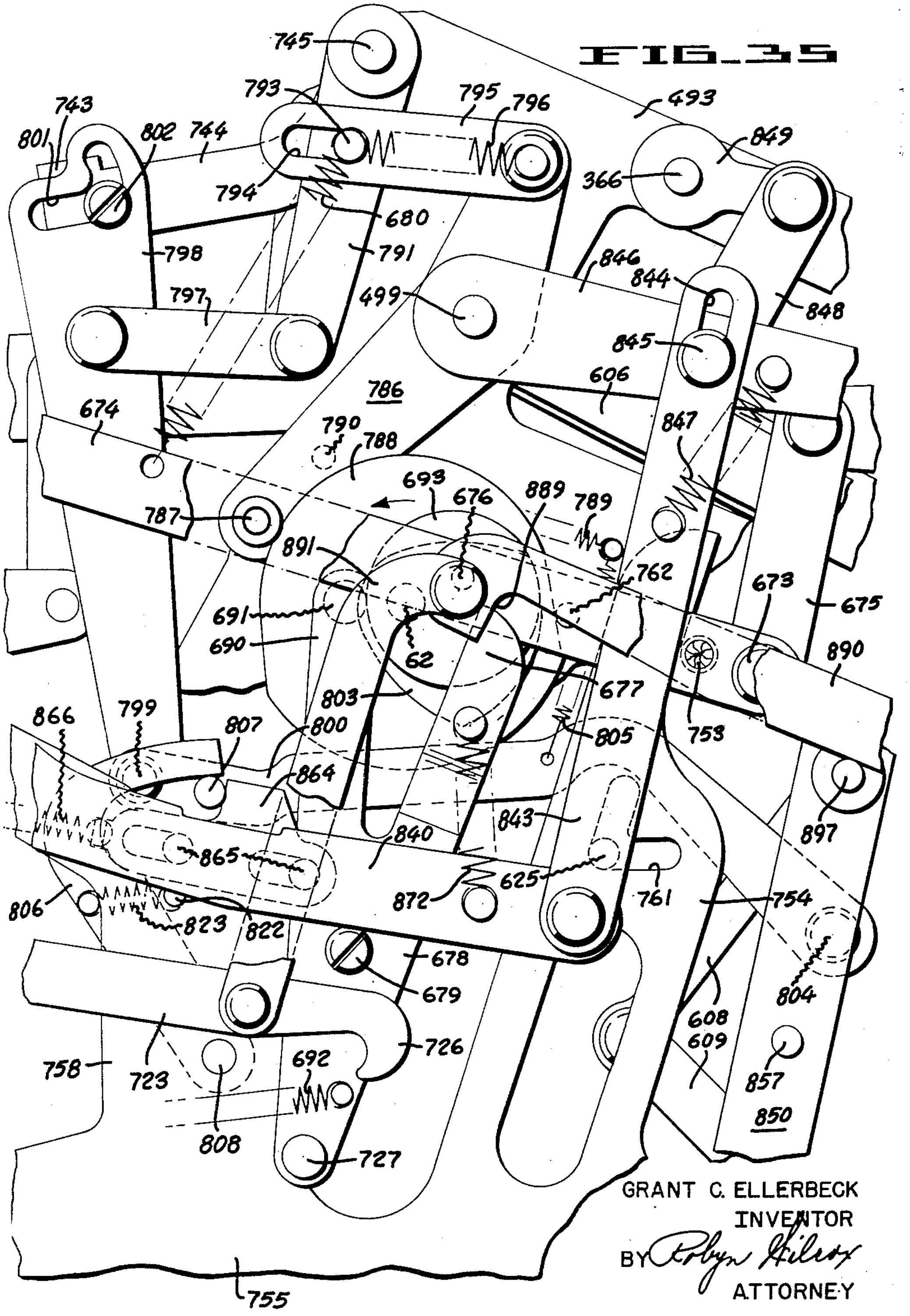
Fig. 35 is an enlarged view of a portion of the multiplication mechanism controlled from the main drive shaft, the view being taken from the left side of the machine.
Figure 37:
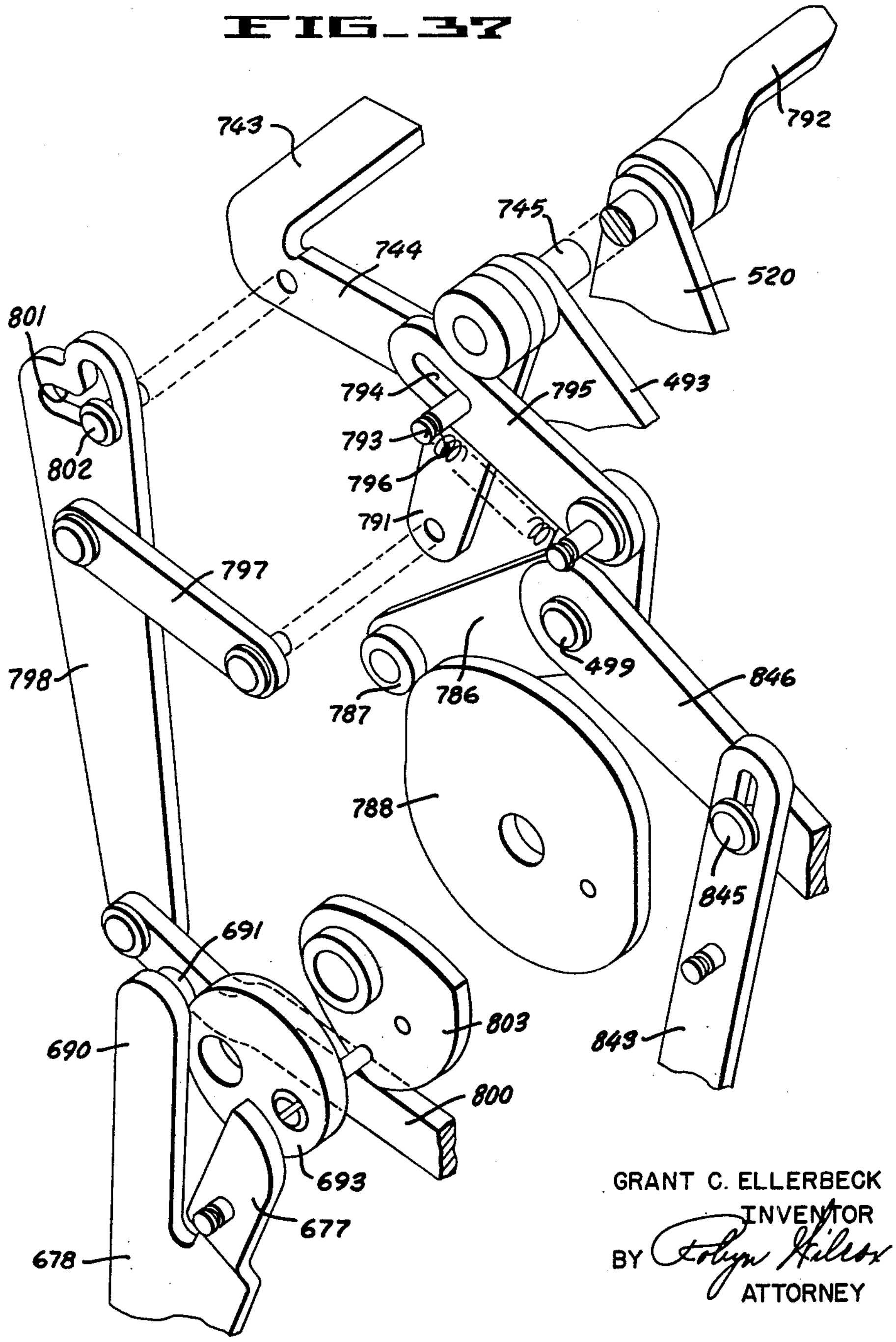
Fig. 37 is an enlarged perspective of the control cams shown in Fig. 35.

As the lever 674 is driven rearwardly, a roller 753 thereon engages an upwardly extending arm 754 (Figs. 33 and 35) of a plate 755, mounted for sliding movement by screw and slot connections 756 on the machine base 13. Plate 755 is normally urged to the right, as seen in Figs. 33 and 35, by a spring 757 which is hooked at its one end to a stud on the base 13, and at its other end to a pin on the plate 755. A second arm 758 of the plate 755 carries a lateral extension 759, the top edge portion 760 of which is parallel to the base and engages a groove in the boss of the shaft 546 (Fig. 13), thereby guiding the plate 755 in its leftward movement.

As the plate 755 is translated to the left (Figs. 18, 22 and 35), a horizontal opening 761 of a V-slot in the arm 754 embraces the pin 625 on the arm 624, thereby preventing clockwise rocking movement of the arm 624 and the shaft 482 under the urgency of the spring 627. As previously disclosed, the plate 755 (Figs. 33 and 35) and the mechanisms controlled by the lever 695 are held in their actuated positions by the latch 718, for the duration of the multiplication operation. However, following the first 180° rotation of the cam 693 and near the end of the first machine cycle, the rounded tip of the finger 677 engages a pin 762 on the control lever 674 to cam the lever counter-clockwise about its pivot 694, where the pin 676 is held out of the path of the finger 677 by the friction of the pin 753 with the arm 754. Any reciprocatory movement whatever of the lever 674 by the subsequent rocking of member 678 is thereby prevented.

It will be recalled that the conventional override pawl 107 (Fig. 7) similar to 107 (Fig. 5) becomes effective to initiate a multiplication operation with the carriage in its leftmost position and immediately following the zero resetting of the product register and the revolutions counter. To this end, the slide 191 is moved downwardly (Fig. 4) rocking the arms 192, 194, and 196 clockwise to thereby raise pusher arm 154 and cause disengagement of the left shift and zero resetting mechanisms. The rocking of arm 196 also imparts counter-clockwise rotation to bellcrank 597 (Fig. 8) which, through link 599 rocks the arm 600 and shaft 572 clockwise to release the latch lever 570 (Figs. 22, 33 and 34) from beneath the pin 571 on the multiplication setting lever 557. The relatively strong spring 562 then becomes effective to rock the bellcrank 560 counter-clockwise (Fig. 22) and the setting lever 557 clockwise through the pin 559, when the roller 556 and its camming action with lever 554 moves the setting cam 553 along shaft 62 for operative alignment with the roller 552 of the bellcrank 506. Counter-clockwise movement of the bellcrank 560 also rocks the lever 765 clockwise about its pivot 766 on the side frame 493 to move the yieldable link 767 upwardly. Yieldable link 767 is bifurcated at its one end to embrace a pin 768 on the arm 518 (Figs. 22 and 33) and has a slot intermediate its ends engaging a pin 769 on the lever 765. The lower end of the slot is yieldably held against the pin 769 by a spring 770, hooked at one end to a stud on the lever 765 and at the other end to a stud at one extremity of link 767. The spring 770 is therefore effective, upon clockwise movement of the lever 765, to raise the arm 518 and the pin 517 thereby permitting engagement of the notch 509 with the pin 515 under the urgency of the light spring 503, which has been tensioned by the clockwise rocking of the arm 501 upon depression of multiply key 38. The high point of the setting cam 553 then serves, through the roller 552 (Fig. 23) and the positive setting arm 504, to rock the lever 516 and shaft 79 counter-clockwise to engage the gears 72 with the register gears 74, thereby effecting a positive registration in the inboard order dials 17. However, each active multiplier dial in the outboard orders of the accumulator is successively reduced to zero under the control of the shaft 389 and the engaged clutch 388, 390 (Fig. 14) since, it will be recalled, the shaft 389 is rotated in a direction opposite to the actuator controlled shafts 57.

As previously described, each cycle of the machine reduces by decrements of "1" the active multiplier figure in each dial 17 associated with the square shaft 389. Each such subtraction is positively registered in the revolutions counter, while the product appears in the register dials to the right of or apposed to the multiplier factor. Upon its cyclic reduction to "0," the active multiplier dial serves to cause centralization of the gears 72, 73 with the dial shaft gears 74 and to initiate a right carriage shift, as viewed in Fig. 1, when the next higher multiplier dial is moved into position for cyclic actuation by the square shaft 389.

Figure 38:
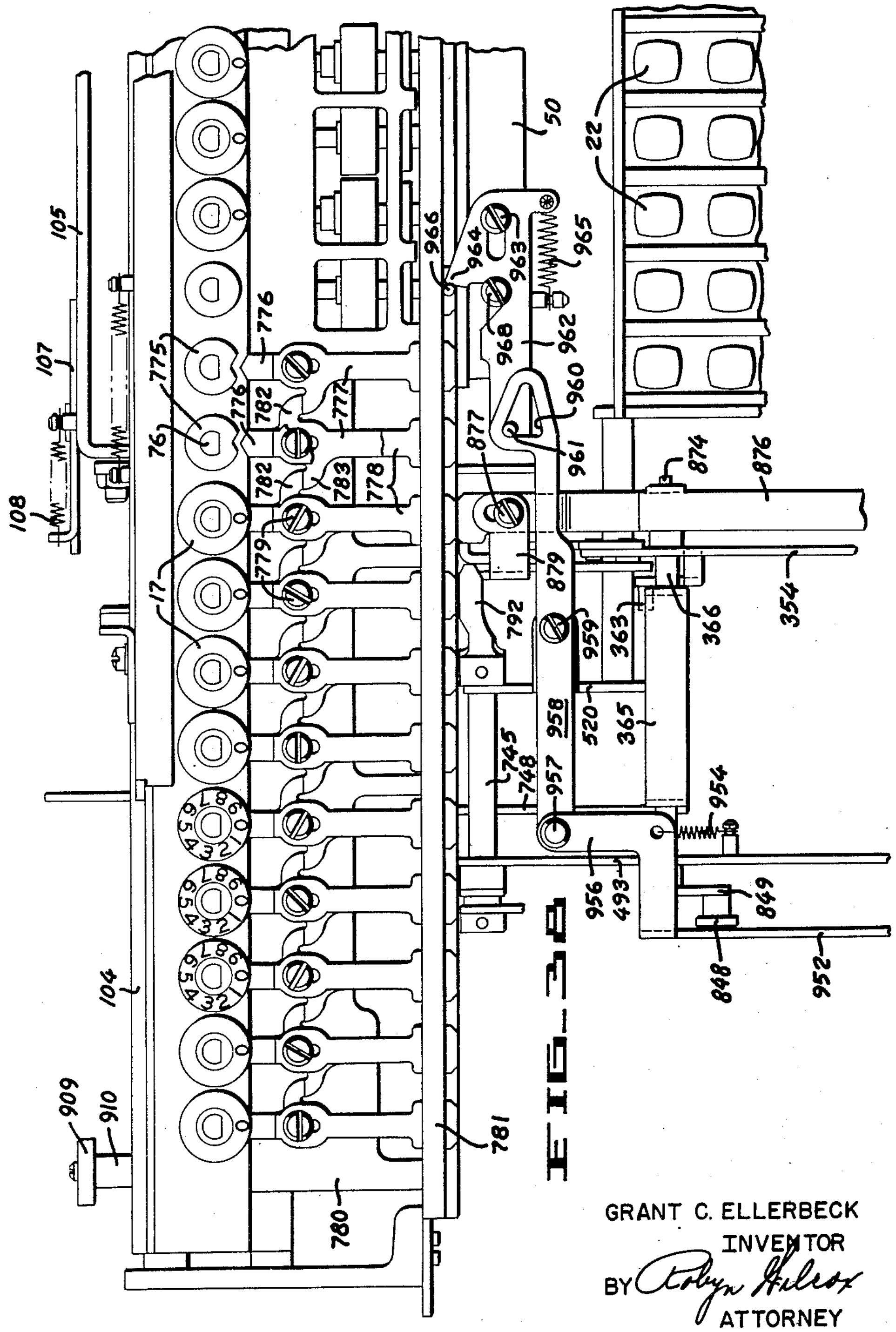
Fig. 38 is a plan view of the left portion of the register carriage showing the right shift control sensing means, the latch releasing control for the multiplier pin carriage escapement enabling means, and the operational terminating sensing means.

Each of the eleven highest order dial shafts 76 of the accumulator carries a disk 775 (Fig. 38) having a V-notch therein corresponding to the "0" position of the dials 17, and operative to receive the pointed nose 776 of an associated sensing slide 777. Likewise, a second series of slides 778 are superimposed on the slides 777 associated with the ten highest order dial shafts 76, and have similar pointed noses 776 for cooperation with the V-notches in the disks 775 on these dial shafts. Although each series of slides 777 and 778 serve independently to perform two entirely separate functions, they operate in a somewhat similar manner. The construction of the slides 777 will now be described, followed by a description of the slides 778 which operate to effect a movement of the plus-minus gears 72, 73 to their centralized position and render the right carriage shift mechanism operative.

The slides 777 are slidably mounted intermediate their ends by slots embracing shoulder screws 779 on a plate 780 secured to the carriage frame 104, and are guided at their forward ends by slots in the front carriage rail 781. Each of the slides 777 has opposed laterally extending ears 782, 783 arranged in overlapping relationship with the ear of adjacent slides, that is, the ear 782 of one slide 777 overlies the ear 783 of the adjacent slide to the right thereof. Therefore, whenever a dial 17 is rotated out of its "0" position, the associated slide 777 and all of the slides to the right thereof will be held inactive against sliding movement. However, as the highest significant figure standing in the left ten dials (Fig. 38) reaches its "0" position, the nose 776 of the associated slide 777 and of those slides to the left thereof, are moved into engagement with the V-notches of the disks 775 to terminate the operation as will be described hereinafter.

Similarly associated with the left ten dials (Fig. 38), is the series of sensing slides 778 overlying slides 777 and having similar pointed noses 776 for engaging the V-notches in the disks 775 on the dial shafts 76. However, each such slide 778 is independently slidable on the plate 780, guided near its rearward end by a slot engaging the shoulder screw 779 and at its forward end by a horizontal slot in the front carriage rail 781.

As each active multiplier dial is reuced to "0," means are provided to sense such zero position of the dial by moving the associated slide 778 rearwardly where its nose 776 engages the notch in the disk 775. Such a rearward movement of slide 778 effects a centralization of the plus-minus gears 72, 73 with the dial shaft gear 74, and also operates to cause an engagement of the right carriage shift mechanism.

For this purpose, a lever 786 is rockably mounted on an extension of shaft 499 (Figs. 33, 35 and 37) and carries a roller 787, which is urged into engagement with a cam 788 by a spring 789. One end of the spring 789 is hooked to a pin 790 on the lever 786 and the other end is secured on a stud on the side frame 493. The shaft 745 journalled in side frames 493 and 520 carries a depending arm 791 at its one end and has a sensing cam arm 792 secured thereto at its other end. Arm 791 has a pin 793 engaging a slot 794 in one end of a link 795 which yieldably connects the arm 791 with the lever 786. Therefore, immediately following the first 180° counter-clockwise rotation of the drive shaft 62 and the cam 788 secured thereto, the lever 786 is rocked clockwise (Fig. 35) about its pivot 499 and through spring 796 urges the arm 791 and shaft 745 counter-clockwise whenever the active multiplier dial is standing at zero. When rocked counter-clockwise, the arm 791 serves through link 797 to rock an arm 798 clockwise about its pivotal connection 799 with a cam follower arm 800. The arm 798 has an inverted L-shaped slot at its upper extremity, the horizontal portion 801 of which, when arm 798 is rocked clockwise, engages a pin 802 on the arm 744.

Immediately following the clockwise movement of the arm 798 by the rocking of arm 786, a cam 803 secured to drive shaft 62 becomes effective to rock the arm 800 counter-clockwise about its pivot 804 on the side frame 493. Normally, arms 798 and 800 are latched in their rocked positions against the urgency of a spring 805 by the engagement of a latch arm 806 with a pin 807 on the arm 800. Latch arm 806 is pivoted at 808 on plate 755 and is urged into abutting relation with a stud 822, also on plate 755, by a spring 823. Upon depression of the key 38 when the plate 755 is moved to the left (Fig. 35), the stud 822 serves to move the nose of the latch arm 806 from its overlying position with respect to the pin 807, and the spring 805 is effective to urge the arm 800 into engagement with its cam 803. As the cam follower arm 800 is moved downwardly, the arm 798 becomes effective to rock arm 744 and its laterally extended ear 743 counter-clockwise to engage the pin 742 on the channel member 522 (Fig. 23) which, it will be remembered, has been moved to the left by the rocking of lever 695. The engagement of the ear 743 with the pin 742 thereby rocks arm 518 and its pin 517 to disengage the notch 509 from the pin 515.

Referring now to Fig. 25 it will be recalled, as the arm 518 is rocked counter-clockwise to disengage the notch 509 from the pin 515, the link 630 serves to move the hook member 632 downwardly where it will engage the square stud 635 of the latch pawl 636, when the pin 633 on the cam member 553 engages the upright arm 634 to effectively release the latch pawl 636. Thus, the arm 589 is rocked counter-clockwise under the urgency of the spring 664 and through link 639 rocks the centralizing lever 640 clockwise about the shaft 546, thereby engaging the notch 641 therein with the pin 538 on the lever 516. As the notch 641 engages pin 538, a nose 809 of arm 810 integral with lever 640 is moved over the pin 811 on the setting arm 504, better seen in Fig. 23. Engagement of the nose 809 with the stud 811 serves to maintain the notch 509 of the setting arm 504 from engagement with the pin 515 during the right shift cycle.

With the release of the arm 589, the counter-clockwise rocking of the shaft 638 (Figs. 25, 30, and 32) serves to rock arm 658 and thereby move the grooved collar 660 upwardly to align the actuator pawl 661 with the pin carriage rack 651. Thus, with the multiplier pin carriage 441 displaced from its normally inactive position, pawl 661 would now be effective to ordinally restore it to the right as viewed in Fig. 1. However, the actuator pawl 661 is rendered ineffective to cause a right shift of the pin carriage 441, since there is no value entered in the pin carriage, its control of the multiplying operation has, therefore, been superseded by the left ten dials of the accumulator.

To disable the actuating pawl 661 with respect to the pin carriage rack 651, a shaft 812, journalled in the flanges of a channel 813 secured to the horizontal frame member 814, carries an upright pin 663. A second pin 815 is also secured to the shaft 812 diametrically opposite the pin 663, and serves to rock the shaft 812 counter-clockwise (Figs. 30 and 32) to remove the pin 663 from its normal engagement with a slot in the tail of the actuator 661 (Fig. 31). With the removal of the pin 663 from its slot, there is no means of guiding the pawl 661, and it therefore yields with each rotation of the eccentric portion of the collar 660. The actuator pawl 661 is resiliently urged against a pin 816 on the bracket 817 (Figs. 30, 31 and 32) of the frame member 814 by a spring 818, hooked at its one end to pawl 661 and at its other end to a stud 819 on the frame member 814. Immediately prior to the termination of the multiplying operation, the slot in the pawl 661 is therefore aligned by pin 816 to receive the pin 663 under the urgency of a spring 820 secured to a stud on an arm 821, which is pinned at one end of shaft 812, and to a stud on the frame member 814.

Figure 29:
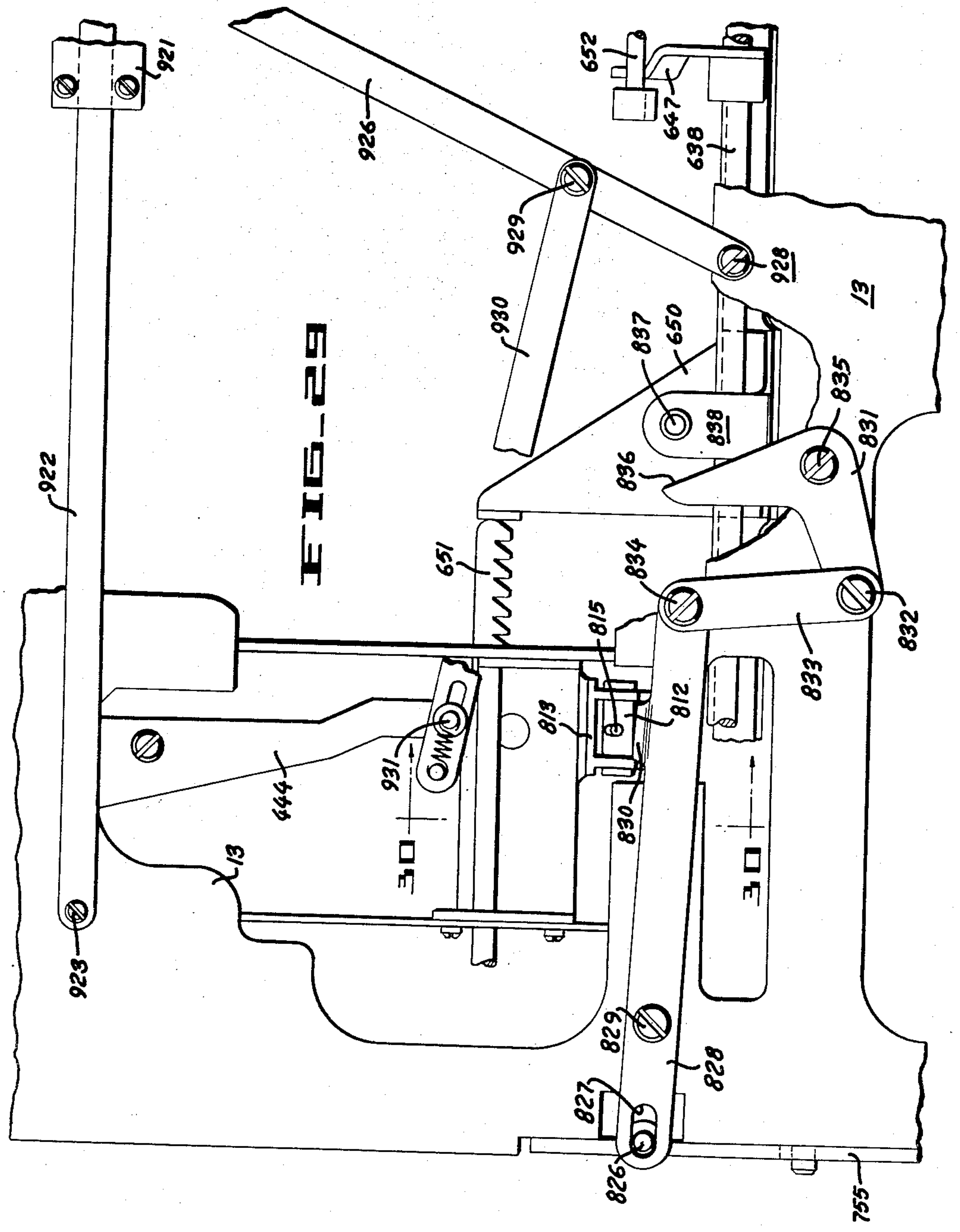
Fig. 29 is a fragmentary view taken from the underside of the machine to illustrate the mechanism operable in a multiplication operation to enable the right shift control.

Referring now to Figs. 29, 33 and 35, upon depression of key 38, it will be recalled that the plate 755 is moved to the left by the pin 753 in the first 180° of the first machine cycle. As it is moved, the plate 755 and an ear 825, formed at right angles thereto, carries a pin 826 engaged in a slot 827 of a lever 828 which serves to rock the lever 828 counter-clockwise (Fig. 29) about its pivot 829 on base 13. Lever 828 has a projection 830 on its front edge for engagement with the pin 815 (Figs. 29, 30 and 32) which, upon counter-clockwise movement of the lever 828, engages the pin to rock the shaft 812 counter-clockwise to disengage the pin 663 from the actuator 661 as seen in Fig. 32.

The rearward movement of the plate 755 also serves through lever 828 to condition the machine for a right carriage shift simultaneously with the disabling of the shift mechanism for the multiplier pin carriage. For this purpose, one arm of a bellcrank 831 (Fig. 29) is pivotally connected at 832 to one end of a link 833, the other end of which is connected at 834 to lever 828. The counter-clockwise movement, therefore, of the lever 828 rocks the bellcrank 831 clockwise about its pivot 835 on the base 13 when, during the first part of the rocking movement thereof, the leading edge 836 of the other arm of the bellcrank 831 abuts a roller 837 on an integral arm 838 of the slide 650. Further clockwise rocking of the bellcrank 831 translates the slide 650, the arm 645, and the stud 652 to the right (Figs. 27 and 29) compressing the spring 649 and moving the cylindrical head of the stud 652 into operative relation with the arm 647. It is therefore readily apparent that counter-clockwise rocking of the shaft 638 (Figs. 25, 28 and 30) with the release of the arm 589 slides the collar 660 and the actuator pawl 661 upwardly to its normally operative position. However, since the pin 663 has been rocked out of engagement with the slot in pawl 661, the pawl is ineffective to shift the pin carriage 441. Similarly, the shaft 638 rocks the arm 645 which, through arm 647, and pin 648 of the arm 134 associated with pusher rod 126, moves the pusher rod 126 rearwardly to engage the right carriage shift mechanism.

When a quotient has been registered in one or more of the highest ten dials of the accumulator (Fig. 1), as a result of a previous automatic division operation, and it is desired that such quotient become a multiplier, the units value standing in the lowest of these ten dials or the 13th dial, becomes the first to effect control of the subsequent multiplying operation. For an exemplary multiplying operation, a multiplier value "4321" and a multiplicand of "12" will be used. A selected multiplication control key such as key 38, will now be depressed and latched in depressed position by the latch tooth 490 (Fig. 17).

Depression of key 38 operates through the arm 541 and therefore arm 543 (Fig. 8) to move the link 544 (Fig. 25) forwardly, thereby rocking the arm 501 clockwise about its pivot 502 to tension the spring 503, which will urge the setting arm 504 and its notch 509 into engagement with the pin 515 at the termination of the left shift and zero resetting operation. At the same time key 38 operates through arm 574, shaft 542, and pin 567 on U-shaped lever 566 (Fig. 22) to move the latching bellcrank 563 from beneath the end of the lever 557 which is then free to rock clockwise, upon release of latch lever 570 at the termination of the left shift and zero resetting operation.

Depression of key 38 also operates through lever 591 to rock arm 153, thereby moving pusher link 154 and push rod 158 rearwardly to engage the zero resetting mechanism. Likewise, pin 159 on link 154 rocks the arm 160 and shaft 132 counter-clockwise to engage the left shift mechanism through the arm 134 and push rod 127 (Fig. 6). Lever 591 also operates through arm 595 and shaft 151 to rock the arm 617 (Figs. 22 and 34), and the yieldable pawl 670 thereon, counter-clockwise to move the pin 676 (Fig. 35) on control lever 674 downwardly for engagement by the arm 677 of the forked power lever 678. Simultaneously, the clockwise rotation of the shaft 151 (Fig. 4) serves through arm 618 to engage the clutch and close the motor circuit.

In the first machine cycle, the initial 180° counter-clockwise rotation of the cam 693 (Figs. 33 and 35) serves through the forked lever 678 and multiplication conditioning lever 674 to rock the lever 695 counter-clockwise, where it is latched by the engagement of the notch 722 in the latch arm 718 with the roller 720. The lever 695 thereby operates through link 696 and arm 699 to engage the clutch members 388 and 390, and to move the camming ear 716 of the arm 714 upwardly for engagement with the pin 736 (Figs. 16 and 36) as the carriage is shifted into its left end position. As the pin 736 is cammed upwardly, the latch 733 is disengaged from the tooth 734 of the clear racks 182, thereby enabling independent operation of the clear racks 182 with respect to the racks 730. In this carriage return operation, therefore, only the lower twelve dials of the accumulator, the revolutions counter, or either of them, are reset to zero as determined by the setting of the control knobs 29 and 30.

Counter-clockwise rocking of the lever 695 (Figs. 23 and 33) also operates through link 740 and the arm 523 to move the channelled member 522 to the left, so that the arm 518 may be rocked counter-clockwise independently of arm 529. The link 748 serves with the leftward movement of the member 522 to rock the bail 365 clockwise as viewed in Fig. 23, or counter-clockwise (Figs. 10 and 12), to move the actuating link 354 to the right when displaced therefrom by the nonentry key 350. The extended finger 371 is therefore moved out of blocking engagement with the arm 373 of the counter actuator 140 when the counter actuator has been selectively disabled by the manipulatable control key 350.

The leftward movement of the conditioning lever 674 (Figs. 33 and 35) also operates through pin 753 to move the plate 755 to the left, when the horizontal opening 761 in the V-notch engages the pin 625 to prevent operation of the feed pawl 475 (see Fig. 18). As plate 755 is moved rearwardly (Fig. 33), the pin 826 and lever 828 (Fig. 29) serves to rock the shaft 812 and the pin 663 counter-clockwise, as seen in Fig. 32, to disable the eccentrically controlled actuator 661 with respect to the pin carriage rack 651. Simultaneously, the lever 828 through the bellcrank 831 translates slide 650 to the right (Figs. 27 and 29) to align the cylindrical head of the stud 652 with the arm 647 pivoted on the shaft 638.

The latch arm 806 (Fig. 35) is also effectively released from its engagement with the pin 807 on cam follower arm 800 by the leftward movement of the plate 755 and the stud 822 thereon. Arm 800 is then free to rise to its operative position with respect to cam 803, when the cam is effective with arms 798 and 744 to rock arm 518 (Fig. 23) counter-clockwise as each active multiplier dial reaches its "0" position.

After the initial operations described above with respect to key 38, the remaining operations are dependent upon the oscillation of the carriage override pawl during the cycle following the last shift cycle, i. e., the resetting cycle, which operates through slide 191, bellcrank 192, link 193 and arm 194 to rock shaft 195 (Figs. 4 and 8). Shaft 195 carries arm 196 which serves to lift pusher link 154 disabling the resetting drive connection after the resetting operation. At the same time the pin 159 on pusher link 154 is moved out of engagement with the arm 160 to enable restoration of the left shift push rod 127 to its normally inactive position under the urgency of its spring 128 (Fig. 6). Arm 196 also operates through bellcrank 597, link 599 and arm 600 to rock shaft 572 and latch pawl 570 (Fig. 22) thereby releasing the setting control lever 557.

When control lever 557 (Fig. 22) is rocked under the influence of spring 562, it operates through roller 556 and lever 554 to move the power-setting cam 553 into alignment with roller 552 of power-setting bellcrank 506. At the beginning of the first registering cycle, cam 553 becomes active to rock the power-setting bellcrank 506 and through positive setting lever 504 engages the gears 72 with the gears 74 (Figs. 2, 14 and 15) as selected for the multiplying operation.

Using the factors heretofore given, the multiplicand of "12" is placed in the tens and units order of the keyboard, and the multiplier of "4321" is standing in the 13th, 14th, 15th, and 16th register dials 17 from the right end of the carriage (see Fig. 1). This multiplier factor may be the resulting quotient of a previous division operation or may be entered in the accumulator by the twirlers *17a*.

It will be recalled that the rotation of each square shaft 57 (Fig. 14 and its associated gear 72 will cause a positive registration in those register dials 17 which are aligned with the units and tens orders of the keyboard, while the oppositely rotated shaft 389 and its associated gear 72 will cause a negative rotation of each multiplier dial as it is moved into active engagement therewith.

Following the left shift and resetting operation, the first 180° of the registering cycle restores the "1" in the 13th dial, i. e., the units value of the multiplier to "0." In the second 180° of each cycle, the cam 788 (Fig. 35) serves to rock arm 786 and thereby tension spring 796 to urge a sensing finger 778 (Fig. 38) rearwardly into a corresponding notch of the disk 775 associated with each active multiplier dial. In the "0" position of the active multiplier dial, the spring 796 is effective to rock arm 791 which, through link 797, moves the horizontal portion 801 of the L-slot in the arm 798 into operative engagement with the pin 802 on the arm 744. The cam 803 then becomes immediately effective to rock the arm 800, arm 798, and arm 744 downwardly when the laterally extending ear 743 (Figs. 23, 24 and 37) engages the pin 742 to rock the arm 518 and thereby disengage notch 509 from the pin 515. Thus, lever 516 and shaft 79 are free to be centralized by conventional centralizer means. The downward movement of the arm 518 also operates through link 630 to lower pitman 632 (Fig. 25) to engage and delatch the latch pawl 636 for arm 589, which in turn disables the latch arm 585 for power-setting bellcrank 506. Arm 589 connected by link 639 to centralizer lever 640, rocks this lever into engagement with the pin 538. If pin 538 is not in its central neutral position when the plus-minus gears are disengaged, pin 538 blocks movement of arm 640 and hence prevents engagement of the shift mechanism. Arm 810 integral with centralizer lever 640 is rocked therewith to move the nose 809 over the pin 811, thereby preventing reengagement of the notch 509 with the pin 515 until the end of the shift cycle. The release of arm 589 also operates to rock shaft 638 counter-clockwise, when the arm 645 (Fig. 28) and the head of the stud 652 thereon is effective to rock arm 647, thereby engaging the right shift mechanism for the accumulator carriage.

Rocking of shaft 638 carries the upper end of arm 642 into the path of pin 633, so that arm 642, shaft 638, and arm 589 are restored at the end of the shift cycle to the condition shown in Fig. 25, when latch pawl 636 again becomes effective.

With the right shift of the carriage, the tens value "2" is moved into cooperative relation with the square shaft 389 (Fig. 14) for negative rotation thereby, upon reengagement of the gears 72 with the gears 74.

Relatching of the arm 589 at the conclusion of the right shift cycle (Fig. 25) serves to rock the centralizer arm 640 and the nose 809 out of engagement with the respective pins 538 and 811, thereby enabling reengagement of the notch 509 with the pin 515 (Figs. 25 and 33) under the urgency of spring 503, and the restoration of the arm 518 to its operative position by the spring 770. The lever 516 and pin 515 is again reset by the power-setting cam 553 and bellcrank 506 at the beginning of the ensuing cycle.

Since the notch in the disk 775 of the now active multiplier dial is displaced from "0," the sensing finger 778 associated therewith is blocked against movement by the cyclic rocking of the lever 786 and the spring 796 is caused to yield. As the arm 798 is therefore maintained in its inoperative position with respect to the pin 802 (Fig. 35), the cam 803 is ineffective in the two succeeding registering cycles to rock the arm 744 downwardly to centralize the gears 72, 73 and to initiate a right carriage shift operation.

The above-described sequence of operations is repeated until each of the multiplier dials are reduced to "0" when the operation is terminated, as will now be described. Means are provided for sensing the "0" position of each multiplier dial when shifted on ordinal step to the right from its active position. Immediately following the reduction of the thousandths multiplier value from "4" to "0," the sensing means becomes effective to condition mechanism for release of the latch 718 (Fig. 33) and the control key latch 510 (Fig. 17).

For this purpose, the rearward extension 759 of the plate 755 carries an arm 840, pivoted thereto at 841 with a pivotal connection at 842 (Figs. 33 and 35) with one end of a link 843. At its other end, the link 843 has a slot 844 engaging a pin 845 intermediate the ends of an arm 846 rotatably mounted on one end of the shaft 499, the bottom of the slot 844 being yieldably urged into engagement with the pin 845 by a spring 847. A link 848 also pivoted on an extended portion of pin 845 connects an arm 849, secured to the shaft 366, with the arm 846 for rocking movement therewith. At its free end the arm 846 has a link 850 pivotally connected thereto at 851 and mounted for reciprocating movement by the engagement of a slot 852 with a pin 853 on the plate 755. The pin 853 on the plate 755 also serves as a mounting for latch pawl 854, which is urged in a counter-clockwise direction by a spring 855 to engage a tooth 856 thereof with a pin 857 on the link 850. However, latch 856 is normally held out of engagement with the pin 857 by the spring-urged abutment of a depending arm 858 of the latch pawl 854 with a pin 859 on the base 13.

The arm 840 carries a yieldable actuating slide 864 resiliently mounted for sliding movement thereon by slots engaging on studs 865 and normally urged to the left as seen in Fig. 35 by a spring 866. At the termination of each automatic multiplication operation of the type described supra, the nose of the latch arm 806 pivotally mounted at 808 on the plate 755 abuts the pin 807 on the arm 800 (Fig. 35) under the urgency of a spring 823. In all subsequent operations except a multiplication operation, the first 260° rotation of the cam 803 serves to rock the arm 800 and pin 807 downwardly, when the nose of the latch arm 806 moves over the pin 807 under the urgency of the spring 823 and the leading edge thereof abuts the spring stud 822 on the plate 755. With the arm 800 latched in this downwardly rocked position any reciprocating movement of the arm 798 is precluded.

It will be recalled that in a multiplying operation where a value in the left ten dials of the accumulator becomes a multiplier, the first 180° rotation in the first machine cycle serves to translate the plate 755 to the left (Figs. 33 and 35) and therefore moves the arm 840 and the actuating slide 864 leftward. If the arm 800 has been previously latched in its downward position, as seen in Figs. 33 and 35, the slide 864 yields against the urgency of its spring 866 until the stop pin 822 on the plate 755 is effective to release the latch arm 806 from engagement with the pin 807. The arm 800 is then urged into a following engagement with the cam 803 by the spring 805. The tension spring 866 then moves the slide 864 to its normal position with respect to the arm 840 where it underlies the pin 807.

Figure 12:
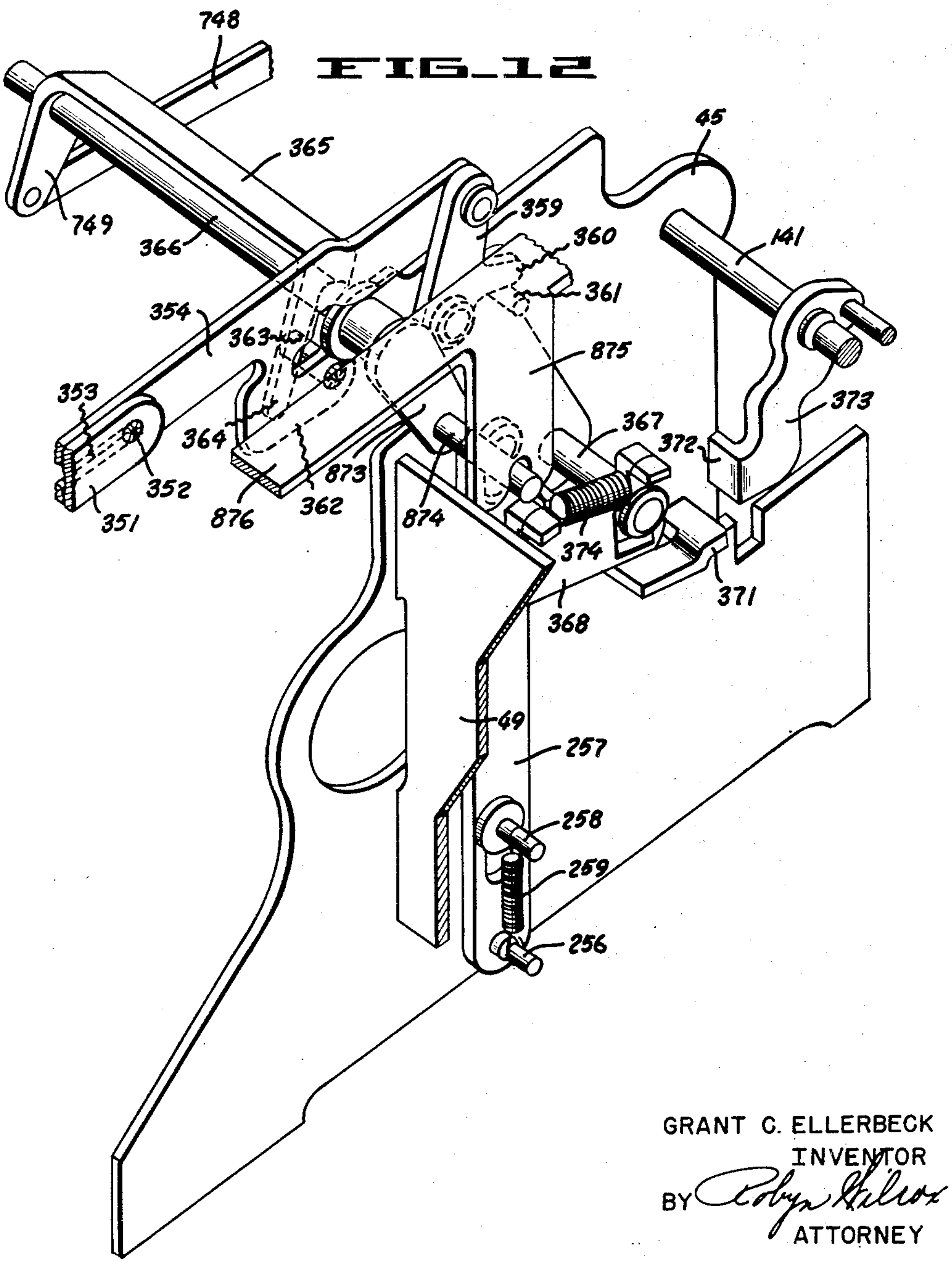
Fig. 12 is an exploded perspective of certain parts illustrated in Fig. 10.

The first 260° rotation of the cam 803 in each succeeding machine cycle thereafter serves to rock the arm 800 and therefore arm 840 downwardly against the urgency of a relatively strong spring 872. Spring 872 is hooked at its one end to a stud on the arm 840 and at its other end to a stud on the finger 677 of the forked lever 678. Normally, the spring 872 serves through arm 840, link 843, arm 846, link 848, and arm 849 to urge the shaft 366 counter-clockwise (Figs. 33 and 35) or clockwise (Fig. 12). A crank arm 873 pinned to shaft 366 is thereby effective, with the engagement of its pin 874 in a notch of a depending arm 875 of a multi-zero sensing slide 876, to retain the slide in the inoperative position shown in Figs. 24 and 38. Slide 876 is slidably mounted at its forward end (Fig. 11) in a slot in a bracket 356 of the machine frame, and at its rearward end by a shoulder screw 877 (Figs. 24 and 38) engaging in a slot 878 of a bracket 879 secured to the left side frame 45.

At 260° of each machine cycle with the slide 864 (Fig. 35) moved to its underlying position with respect to pin 807, the arm 800 and therefore arm 840 are rocked downwardly by cam 803. The link 843 and the relatively strong spring 847 are thereby effective to urge the sensing slide 876 rearwardly (Fig. 38) into contact with the forward end of the aligned sensing slide 777. If a value is standing in any one of the dials 17 to the left of the sensed dial, i. e., the dial associated with the aligned sensing slide 777, further movement of the slide 876 is prevented and the spring 847 (Fig. 35) is caused to yield. It will be recalled that a value standing in any one of the left ten dials will position the notch in the associated disk 775 (Fig. 38) out of cooperative relation with the nose 776 of the associated sensing slide 777. Therefore, rearward movement of this associated slide 777 and those slides 777 to the right thereof, will be blocked by the abutment of the nose 776 with the peripheral surface of the significant disk 775. However, when the highest significant figure or multiplier dial is reduced from "1" to "0" in the first 160° of the last registering cycle, the next 100° of this cycle conditions the machine for a right carriage shift as previously described, and also conditions mechanism for terminating the multiplying operation. Substantially simultaneously the aligned slide 777 and, therefore, those slides 777 to the left thereof are moved rearwardly by the sensing slide 876 as the noses 776 of the slides 777 enter the notches of their corresponding disks 775.

Referring now to Fig. 33, the rearward or leftward movement of the plate 755 and the latch pawl 854 pivoted thereon, would normally cause the pawl 854 to be rocked counter-clockwise under the urgency of the spring 855 as the depending arm 858 thereof is moved away from the stationary pin 859. However, means are provided to delay the rocking movement of the pawl until the left carriage shift and zero resetting operation has concluded and the multiplication operation is begun with the release of latch lever 570. For this purpose the pawl 854 carries a restraint arm 880 pivoted thereon at 881 and having a shoulder intermediate its ends for engagement with an extension of the shaft 151, the arm 880 being urged against the extended portion of the shaft 151 by a spring 882. The spring 855 is therefore inoperative to rock the pawl 854 counter-clockwise until the shaft 572, latch lever 570 and a pin 883 thereon, are rocked counter-clockwise following the left shift and resetting operation. When rocked, the pin 883 on latch lever 570 serves to move the shoulder of the arm 880 from its engagement with the shaft 151, when the pawl 854 is urged by spring 855 to a position where the depending arm 858 again abuts the pin 859. The tooth 856 of the latch pawl 854 then becomes effective to engage the pin 857 on the link 850, when the arm 846 is rocked clockwise the full extent of its movement as the highest significant dial of the multiplier reaches its "0" position. When a value is standing in any one of the left ten dials, the link is idly reciprocated but is not moved downwardly sufficient for the pin 857 to be engaged by the tooth 856.

Figures 16, 36:
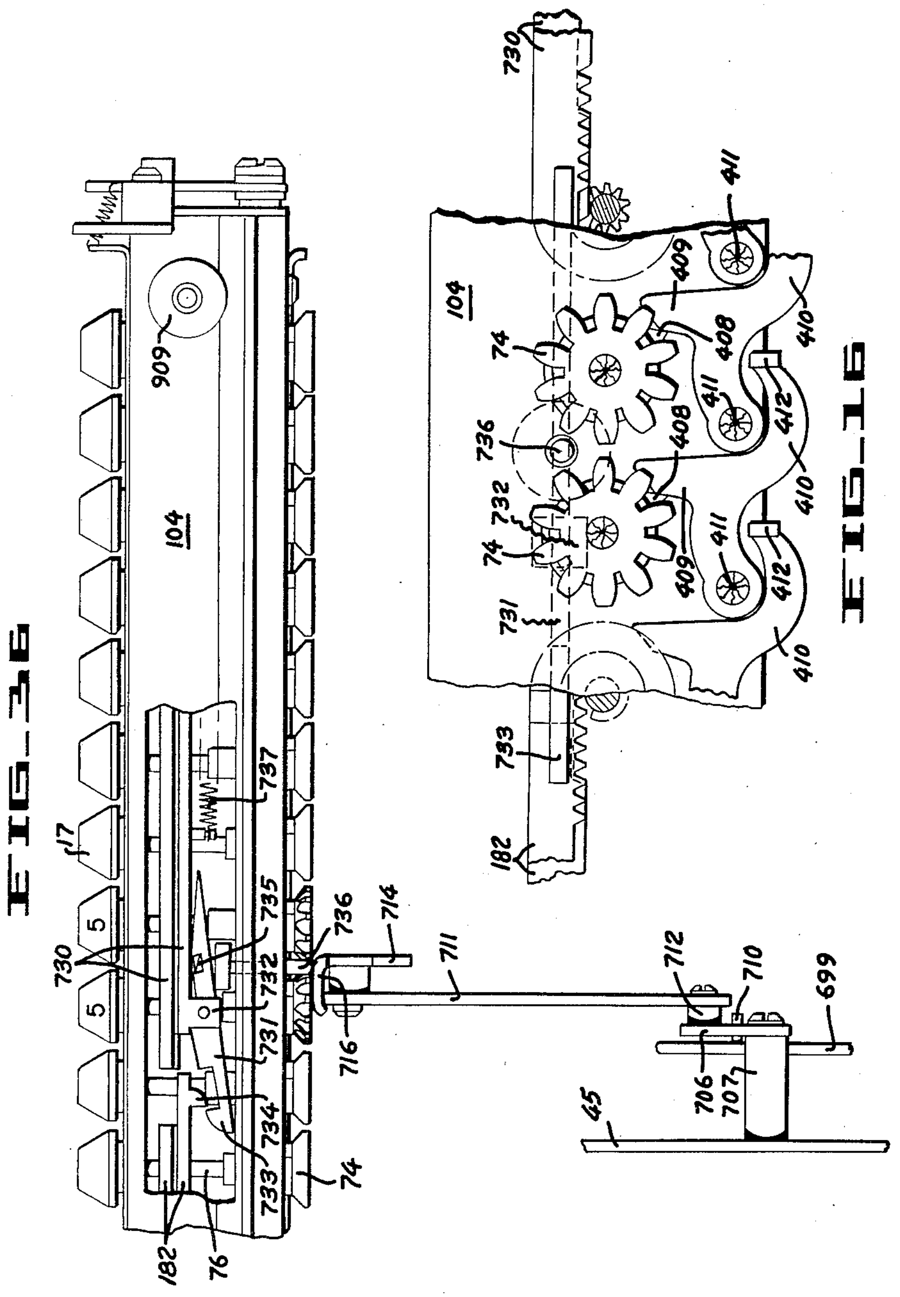
Fig. 16 is a fragmentary view of the underside of the carriage showing the tens-transfer pawls and the means for disconnecting the zero resetting racks to selectively prevent the operation of a section thereof.
Fig. 36 is a view of a rear portion of the register carriage with a section thereof broken away to better illustrate the zero resetting racks and the disconnect mechanism therefor.

Upon release of the latch arm 718 (Fig. 33) with the roller 720, the spring 757 serves with plate 755 to restore the lever 695 and its associated mechanism to its initial position, and the relatively strong spring 384, in cooperation therewith, operates to disengage the driven clutch jaw 388 from the driving clutch jaw 390. As the arm 699 is rocked counter-clockwise with the restoration of lever 695, the spring 709 urges the cam ear 716 to its inoperative position with respect to the pin 736 (Fig. 36). Restoration of the lever 695 to its initial position serves also to restore the coupling 522 (Fig. 23) to its rightmost position and to rock the bail 365 clockwise (Fig. 12), when the spring 259 urges the sliding member 257 upwardly to move the finger 371 into blocking relationship with the counter actuator arm 373. This movement of the slide 257 is effected only if the control key 350 (Fig. 11) has been moved forwardly to its counter disabling position previous to the multiplying operation.

Figure 34:
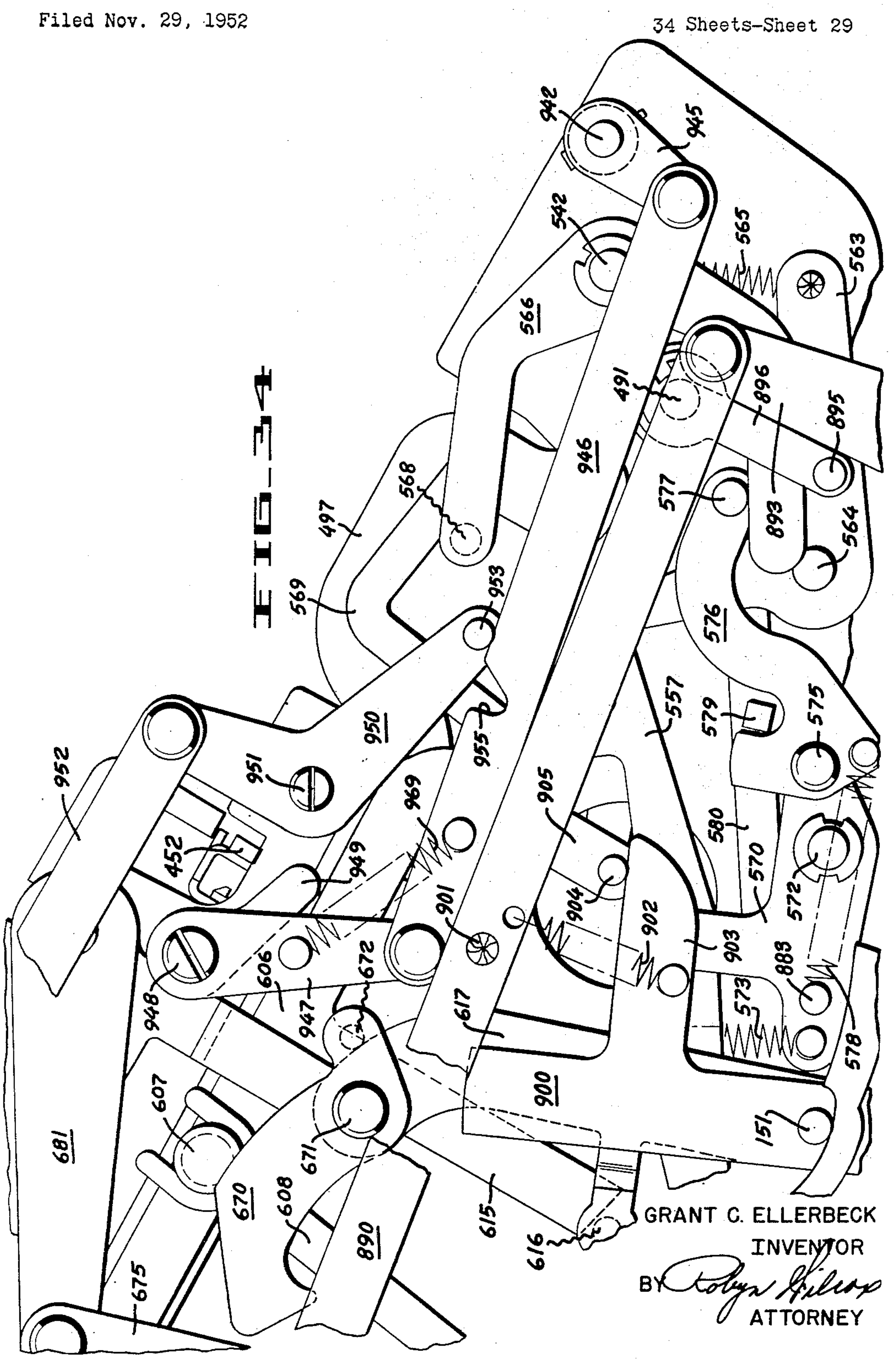
Fig. 34 is an enlarged view of the frontal portion of the left side of the machine with certain multiplication control keys omitted.

To release the latch 718 and the control key 38 (Figs. 17 and 33) at the conclusion of a multiplication operation, the hook nose 726 of the link 723 and a hook 889 of a link 890 are lowered simultaneously through a connecting link 891 into the arcuate path of the respective oscillating pins 727 and 892 of the forked lever 678. The link 723 is connected at its rearward end to the integral arm 725 of the latch 718, and link 890 is connected at its forward end to an arm 893 pivoted on the base 13 at 894 (Figs. 22 and 34). The arm 893 when rocked counter-clockwise engages a pin 895 on the free end of an arm 896 secured to the shaft 491, to rock the shaft 491 and therefore latch lever 510 in a clockwise direction (Fig. 22), or counter-clockwise (Fig. 17), to release the depressed key 38.

The release of the key 38 terminates the multiplication operation in a conventional manner as hereinbefore described, and more fully disclosed in the Patent No. 2,399,917.

It will be recalled that a value standing in any one of dials 17 to the left of the sensing slide 876 (Fig. 38) will prevent the rearward movement of the slide. However, in the last registering cycle, when the highest significant figure of the multiplier value is reduced from "1" to "0," the machine is conditioned for a right carriage shift and the sensing slide 876 is moved rearwardly with the rocking of arm 840 by cam 803 to rock the shaft 366 counter-clockwise (Fig. 12) or clockwise (Figs. 33 and 35). As this movement of the slide 876 is effected, the arm 846 then serves to slide the link 850 downwardly to the full extent of its movement when the pin 857 is engaged by the tooth 856 of the latch pawl 854. A pin 897 on the link 850 normally prevents the engagement of the hook 889 and the hook 726 with the respective pins 892 and 727, as the links 890 and 723 are maintained in engagement with the pin 897 by spring 882 for movement therewith.

With the link 850 in its latched-down position, the spring 882 in cooperation with pin 897 moves the hook 889 and hook 726 into engagement with the pins 892 and 727, respectively. The ensuing right shift cycle for which the machine has been conditioned then serves to shift the carriage, and through cam 693 (Fig. 35) to rock the forked lever 678 counter-clockwise, thereby releasing the latch 718 for lever 695 and the key latch 510 (Figs. 17 and 33). Lever 695 will then return to its normally inactive position as the plate 755 is restored to the right by the spring 757. When restored, the plate 755 and the pin 853 thereon rocks the link 850 about its pivotal connection 851, and the stationary pin 859 on the base 13 serves to rock the latch pawl 854 clockwise to release the latch 856 from the pin 857. The links 890 and 723 are therefore raised to their normally inoperative position with the link 850 and the pin 897 under the urgency of the spring 872.

Simultaneously with the restoration of the plate 755 to its rightmost position (Fig. 33), the pin 826 rocks the lever 828 clockwise to the position shown in Fig. 29, thereby releasing the pin 815 for clockwise rotation under the urgency of the spring 820 (Fig. 32) to move the guide pin 663 into the slot of the actuator 661 for normal cooperation therewith. The rocking movement of the lever 828 concurrently rocks the bellcrank 831 counter-clockwise when the spring 649 (Fig. 27) is effective to translate the slide 650 and the cylindrical head of the stud 652 out of operative alignment with the right shift engaging arm 647.

The above-described operation may be illustrated as follows using, as an example, a multiplier of "4321" and a multiplicand of "6102."

| | |
|---:|---|
| 4321000000000000 | Accumulator dials |
| 00000000000 | Counter dials |
| 6102 | Keyboard |
| 4320000000006102 | Accumulator dials |
| 00000000001 | Counter dials |
| 6102 | Keyboard |
| 4300000000128142 | Accumulator dials |
| 00000000021 | Counter dials |
| 6102 | Keyboard |
| 4000000001958742 | Accumulator dials |
| 00000000321 | Counter dials |
| 6102 | Keyboard |
| 0000000026366742 | Accumulator dials |
| 00000004321 | Counter dials |
| 6102 | Keyboard |

It will be noted that by this method of multiplication, as the unit digit of the multiplier is reduced to "0," the multiplicand is added in the right-hand four dials of the accumulator while the "1" is registered in the revolutions counter. The accumulator carriage is then shifted one step to the right and the tens digit of the multiplier is reduced to "0" while the multiplicand is twice added to the "610" already in the right-hand accumulator dials and the "2" is registered in the tens-order of the revolutions counter. This sequence of operations continues until the thousandths digit of the multiplier, that is, the "4" is reduced to "0" when the operation is then terminated. The resulting product appears in the right-hand accumulator dials and the multiplier value is transferred to the revolutions counter.

The operation of the mechanism described above in connection with the key 38, operates in a similar manner with the depression of the keys 36 or 37 to initiate the multiplying operation with a return of the carriage to its left end position. As disclosed in the aforementioned Patent No. 2,399,917, upon depression of either of keys 36 or 37, the operation begins with carriage shifting, but the resetting mechanism is inactive so that the products entered are cumulative to the products in the accumulator and the multipliers are cumulative in the counter.

The depression of key 36 operates through the lever 497 (Fig. 22) and arm 501 to tension the spring 503 which is effective, with the carriage in its left end position, to engage the notched end 509 of the setting arm 504 with the pin 515 to condition the setting of the plus-minus gears to their plus registering position. As previously disclosed, with the engagement of the plus gears 72 with the gears 74, those gears 72 on the square shafts 57 cause a positive registration in the numeral wheels associated therewith, while the numeral wheels associated with the gears 72 on the square shaft 389 (Fig. 14) receive a negative registration. At the same time, lever 497 operates through roller 568 to rock U-shaped lever 566 to move the latching bellcrank 563 out from beneath the end of lever 557, which is therefore operative with the release of latch pawl 570 to condition the power setting means.

Depression of the key 36 also operates through lever 497, pin 605, lever 606, link 608, arm 609, and shaft 610 to operate pusher link 612 (Figs. 6 and 26), arm 614, and shaft 132 to move the left shift push rod 127 rearward to engage the left shift mechanism. The lever 606 also operates through arm 615 to rock the arm 617 and the pawl 670 thereon counter-clockwise (Figs. 22, 33 and 34), thereby moving the conditioning lever 674 downwardly to operatively position the pin 676 (Fig. 35) for engagement by the finger 677 of the forked lever 678. Rocking of the arm 617 and shaft 151 serves through arm 618 (Fig. 4) and the slide 81 to engage the clutch and close the motor circuit.

In 180° of the first machine cycle the forked lever 678 translates the conditioning lever 674 rearwardly, rocking the lever 695 and the arm 699 (Fig. 33) to engage the clutch members 388, 390 and to move the arm 714 upwardly where the cam ear 716 is engaged by the pin 736 (Fig. 36). However, the release of the latch 731 from the tooth 734 is not purposive, since it will be recalled that the depression of the key 36 effects only a left carriage shift without a zero resetting operation. Rocking of lever 695 also serves through link 740 and arm 523 to position member 522 (Fig. 23) for control of the arm 518 by the "0" sensing mechanism to initiate a right carriage shift, and through link 748, bail 365, and member 354 to enable the counter actuator 140 (Fig. 10) when selectively disabled previously by the key 350.

Therefore, the product of each successive multiplication operation is accumulated in the right-hand product registers, while each multiplier in the left-hand accumulator dials is transferred to the revolutions counter for totalization therein. The elimination of the zero resetting operation in connection with the key 36, also becomes very useful when it is desirable to accumulate quotients in the revolutions counter resulting from a previous automatic division operation. When such an accumulation of quotients is desired, it will be remembered that the counter may be selectively disabled upon initiation of the division operation to prevent the quotient entry into the counter.

With key 36, the first operation therefor, is the return of the carriage to its left end position after which the multiplying operation proper is started in the conventional manner described above.

The depression of the key 36 disables the plural zero sensing means for terminating the operation until after the carriage has been shifted to its rightmost position where the left ten dials of the accumulator are aligned with the ordinal rows of keys 22 of the keyboard. With the carriage in its rightmost position following the termination of each such multiplying operation, and when it is desirable to accumulate products, e. g., the squares of two numbers, the value to be squared is placed in the keyboard and thence entered into selected ones of the left ten dials of the accumulator by the use of the plus key 25 or twirlers 17*a*, followed by the depression of the key 36.

The termination of an accumulative multiplication operation initiated by the key 36, occurs after the carriage has been shifted to its rightmost position where the 22nd dial of the accumulator is aligned with the left-hand row of keys of the keyboard. To prevent the operation termination when the highest significant figure of the multiplier has been reduced to "0," the effectiveness of the zero sensing slide 876 (Fig. 38) is disabled until the last right shift cycle, when it is again enabled and the ensuing cycle is effective to release the latch 718 and the key latch 489, 490 (Figs. 17 and 33).

For this purpose, a lever 900 (Figs. 33 and 34) is rotatably mounted on the end of shaft 151, and is normally urged to its inactive position with respect to a pin 901 on the link 890 by a spring 902. In this position, a lateral arm 903 of the lever 900 abuts a pin 904 on a right angle extension 905 of the lever 606, see also Fig. 22. Therefore, upon depression of key 36, the lever 606 and pin 904 operate to rock the lever 900 clockwise when the arcuate extremity of the lever 900 is moved beneath the pin 901. With the lever 900 underlying the pin 901, engagement of the hook 889 of the link 890 and the hook 726 of the link 723 with the respective pins 892 and 727 is precluded.

As the carriage is moved into its rightmost position, means are rendered effective to rock the lever 900 still further clockwise from its blocking relation with the pin 901. For this purpose, the lever 906 (Fig. 5) is pivotally mounted intermediate its ends at 907 to the transverse bracket 47. One arm of the lever 906 forms an inverted V-cam 908 and lies in a plane parallel to the rear of the carriage frame 104 for engagement by a rotatable disk 909 mounted on the carriage 104 at 910. The other arm of the lever 906 is pivotally connected to one end of a link 911, the other end of which is connected to an arm 912 of a bail 913 (Fig. 33) rockable on shaft 700. A second arm 914 of the bail is connected to a slide 915 guided for rearward movement by a slot engaging the pin 859 on the base 13. At its forward end the slide 915 carries a pin 916 engaging a depending arm 917 of the lever 900, so that a leftward or rearward movement of the slide 915 triggers the lever 900 and thereby releases the link 890 for immediate downward movement under the urgency of spring 882.

It will be recalled that as each multiplier dial is rotated to its "0" position, the cam 803 (Fig. 35) serves through the arm 800, pin 807, slide 864, and arm 840 to move the link 843 downwardly, when the spring 847 is effective to urge the sensing slide 876 rearwardly (Fig. 38) through the clockwise rotation of the arms 846 and 849. However, if there is a value standing in any dial to the left of the dial or order in which the sensing slide 876 is active, the spring 847 yields. In the second 180° of the last registering cycle, when the highest significant multiplier figure has been reduced to "0" and immediately following the conditioning of the machine for a right shift, the spring 847 urges the slide 876 rearward the full extent of its movement, and the pin 857 (Fig. 33) on the link 850 is engaged by the tooth 856. If the key 38 was depressed, the spring 882 then becomes effective to move the hooks 889 and 726 into the arcuate path of the respective pins 892 and 727. In the following right shift cycle for which the machine has been conditioned, the oscillation of lever 678 then serves to release the latch 718 and to rock the shaft 491 (Figs. 17 and 34) to release the key latch 510, thereby terminating the operation.

With the depression of the key 36, the zero sensing mechanisms for determining a right carriage shift and for terminating an operation, function in the same manner as with the depression of key 38. However, since it is desirable with the use of the key 36 to shift the carriage to its extreme right-hand position before terminating the operation, the upper end of the lever 900 is rocked beneath the pin 901 (Fig. 34) so that the urgency of the spring 882 (Fig. 33) is ineffective to move the link 890 downwardly during the reciprocating movement of the link 850.

When the dial representing the highest significant figure of the multiplier reaches its "0" position in the first 180° of the last registering cycle, the second 180° of the cycle becomes effective to condition the machine for a right shift cycle and the sensing slide 876 is moved rearwardly and latched by the engagement of the tooth 856 with the pin 857. Therefore, with all of the left ten dials of the accumulator in their "0" positions, the sensing cam 792 (Fig. 24) and the arm 791 (Fig. 35) are free to be rocked counter-clockwise with the cyclic rotation of the cam 788. Thus, the cam 803 is effective in each such cycle to rock the arms 798, 744 and 518 downwardly to condition the machine for a subsequent right shift cycle. This cyclic control of the cams 788 and 803 continues to effect an ordinal right shift of the carriage until the lever 900 (Fig. 34) is rocked from its blocking engagement with the pin 901, when the links 890 and 723 are urged downwardly by spring 882 for actuation by the forked member 678.

As the carriage is shifted into its rightmost position, the disk 909 (Fig. 5) moves over the cam nose 908 to rock the lever 906 counter-clockwise, and through link 911 and bail 913 moves the slide 915 rearwardly (Fig. 33) to rock the lever 900 clockwise from beneath the pin 901. Since the link 850 and the pin 897 thereon have been latched in their downward position, the spring 882 then becomes immediately effective to urge the link 890, connecting link 891, and link 723 downwardly to operatively position the hooks 889, 726 in the path of the pins 892, 727 on the member 678. The ensuing right shift cycle, which becomes an idle cycle, operates to rock the forked lever 678 counter-clockwise, releasing the latch 718 when the lever 695 and its associated mechanism return to their inactive positions, and the link 890 rocks arm 893 counter-clockwise and arm 896 clockwise (Fig. 34) to release the key latch 489 (Fig. 17) thereby terminating the operation.

*Multiple zero multiplier entry*

Referring now to the aforementioned Patent No. 2,399,917 and the disclosure herein in connection with the conventional multiplication mechanism, it will be recalled, that the depression of each multiplier key 34 sets a value into an adjustable element 442 and escapes the pin carriage 441 one ordinal step to the left. The depression of control keys 36, 37 or 38 then operates to cause the accumulator carriage to be shifted to its leftmost position, and with the depression of the control key 38 the accumulator registers and revolutions counter are reset to zero. With the carriage in its leftmost position the latch lever 570 (Fig. 22) is rocked to release the lever 557 and thereby cause the plus-minus gate to be set for plus registration in connection with keys 36 and 38 and for minus registration in connection with key 37. Each element 442 is then restored, step-by-step, to "0" when it operates to cause the plus-minus gate to be centralized and effects an ordinal right shift of the accumulator carriage. The pin carriage 441 is likewise shifted one step to the right when the next higher multiplier element 442 becomes active to control the multiplying operation. If a "0" is standing in this next active element 442 of the pin carriage, the plus-minus gate is maintained centralized and another ordinal right shift of the accumulator carriage is effected, while the pin carriage is also again shifted one step to the right to position the next higher element 442 for active control of the operation.

In a conventional multiplication operation supra, the element 442 registering the units value of the multiplier is the first to be immediately operative upon rocking of the latch pawl 570 to control the multiplying operation. The position of the multiplicand in the keyboard then determines the ordinal registration of the product in the product register 17, i. e., with the units value of the multiplicand in the right-hand keyboard order the units value of the product will be registered in the lowest or right-hand dial 17 of the accumulator.

It may be desirable to accumulate products in the counter and for this operation the product must first be registered in the left ten dials of the accumulator and then transferred to the revolutions counter for totalization therein. Therefore, it is necessary that the products to be accumulated be limited to ten digits, with the units digit being registered in the 13th order dial 17 or the 3rd order dial to the left of the keyboard with the carriage in its leftmost position. It will be noted here again, that this is the position of the carriage when the actual multiplying operation begins.

Since the number of digits in the multiplier and multiplicand determine the number of digits in the product, each of the two factors must be a complement of ten, e. g., if one factor is made up of three digits, the other must have no more than seven. Means are provided therefore, to automatically determine the tens-complement of the smaller factor which is set in the keys 34 of the multiplier keyboard.

Figure 24:
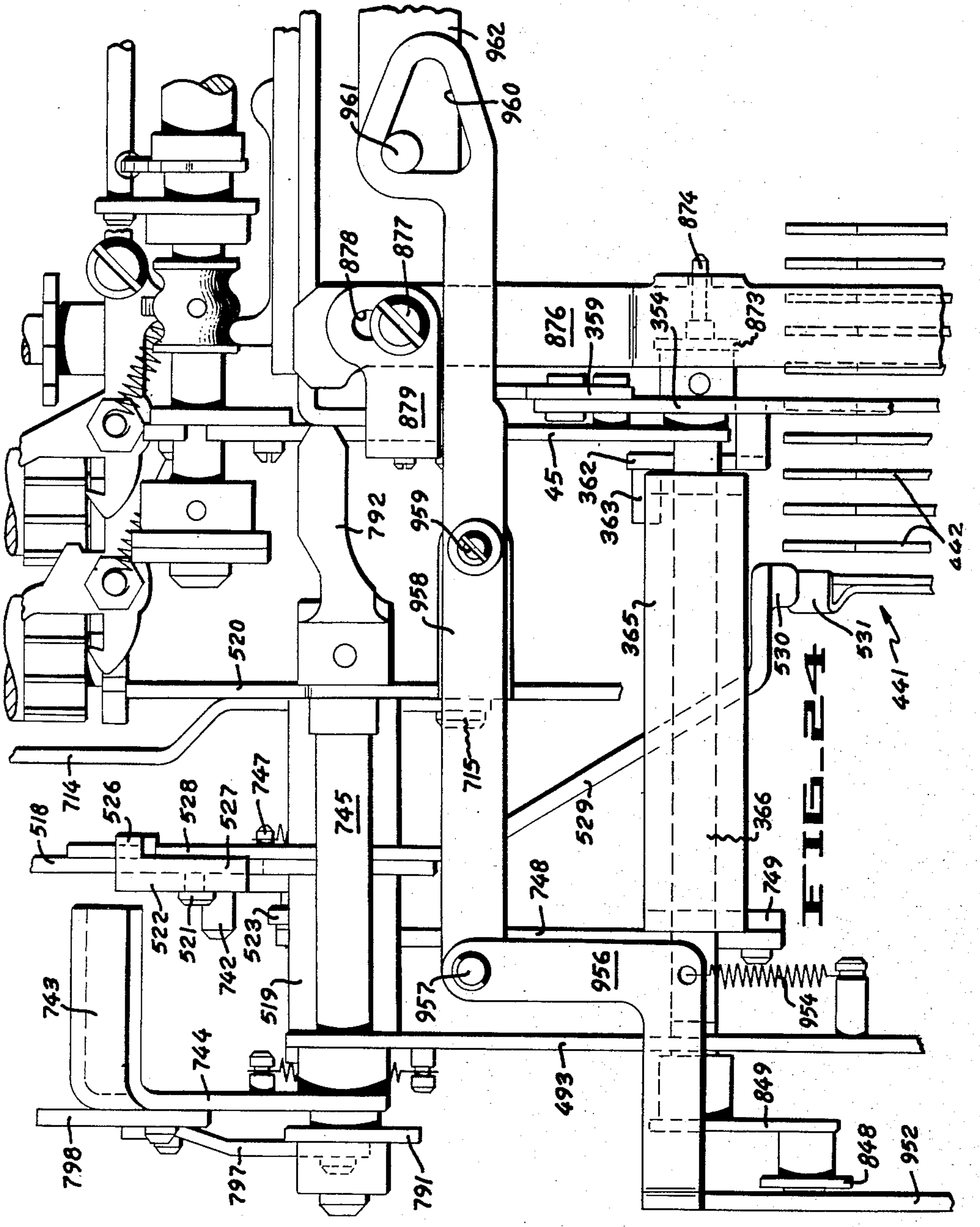
Fig. 24 is a plan view of the left rear portion of the machine showing the automatic right shift sensing control and the operation terminating sensing control.

For this purpose an indicator 920 (Figs. 21, 27, 28 and 29) is mounted on a crosshead 921 for transverse sliding movement on a bar 922 disposed beneath the front of the machine and extending transversely thereof, secured at its ends to the base 13 by screws 923. The indicator 920 is formed to the frontal contour of the cover or body 15, and is disposed therebeneath with the top surface 924 of its free end having a coating in contrast to the color of the cover 15 for ease of discernment through the sight openings 925 as seen in Figs. 1 and 39. An arm 926 has an elongated slot 927 (Figs. 21 and 27) in one end thereof for engaging a pin 932 on the crosshead 921 to control the step-by-step ordinal movement of the indicator 920. At its other end the arm 926 is pivotally mounted at 928 to the base 13, and is connected intermediate its ends at 929 with a link 930 which in turn is yieldably connected by a pin and slot 931 to the bellcrank 444. Therefore, as each digit of a factor is entered into the ten key keyboard by the keys 34, the spring 448 (Fig. 21) operates in a conventional manner to escape the pin carriage 441 ordinally to the left as seen in Figs. 1 and 24.

Thus, it becomes readily apparent that with each stepped movement of the pin carriage 441 by the spring 448, the bellcrank 444 operates through link 930 and arm 926 to slide the indicator 920 ordinally from its indicating position in the right-hand sight opening 925 (Fig. 1) to its indicating position in the left-hand sight opening. As an example, the entry of a three digit factor into the pin carriage 441 automatically moves the indicator 920 to the fourth sight opening 925 from the right as seen in Fig. 1. To register the product in the left ten dials 17 of the accumulator, the second factor must be set in those ordinal rows of keys 22 to the immediate left of the indicated opening 925.

As previously disclosed, the depression of the keys 36 or 38 operates to first cause a shift of the accumulator carriage to its leftmost position, and with the depression of the key 38 to also effect a zero resetting of the accumulator and revolutions counter. Since the multiplying operation is then initiated with the carriage in its left end position and it is desirable to register the product in the left ten dials 17, the carriage is shifted three ordinal positions to the right to align the 13th dial 17 with the left bank of keys in the keyboard. It will be remembered that in the left end position of the carriage, the 13th dial, which becomes the units order dial of the product, is disposed three orders to the left of the keyboard.

Referring to Patent No. 2,371,752, it will be noted that if an adjustable element or multiplier rack segment 442 is in its "0" position when it moves into active control position, a right shift cycle is immediately determined for the accumulator carriage and the multiplier pin carriage. Therefore, to use the example given heretofore, the three digit factor or multiplier is entered into the pin carriage 441 and the pin carriage escapes three steps to the left (Fig. 24). The seven digit multiplicand is placed in the keyboard immediately to the left of the indicated sight opening 925 in Fig. 1. To predetermine the registration of the product in the left ten register dials 17, the carriage must be shifted to the right until the 13th dial is aligned with the units order of the multiplicand in the keyboard. With the example given, such an alignment requires that the carriage be shifted nine places to the right when, on the next succeeding cycle, the registration of the product is begun.

For this purpose, each of the control keys 36 and 38 (Figs. 11, 17 and 40) have similar auxiliary keys 935 and 936 associated therewith in a manner such, that a depression of a key 935 or 936 simultaneously depresses a respective key 36 or 38. The keys 935, 936 are similarly mounted for downward sliding movement by the engagement of slots 937, 938 on studs 939 which are secured to a bracket 940 extending laterally from the left frame plate 493. Each stud 939 carries a sleeve 941 maintaining the keys in spaced-apart relation for independent sliding movement thereon. The upper stud 939 has a counterbore in the secured end thereof for journalling one end of a shaft 942, diametrically smaller than the extended shaft, which has its other end journalled in the frame plate 493.

Figure 20:
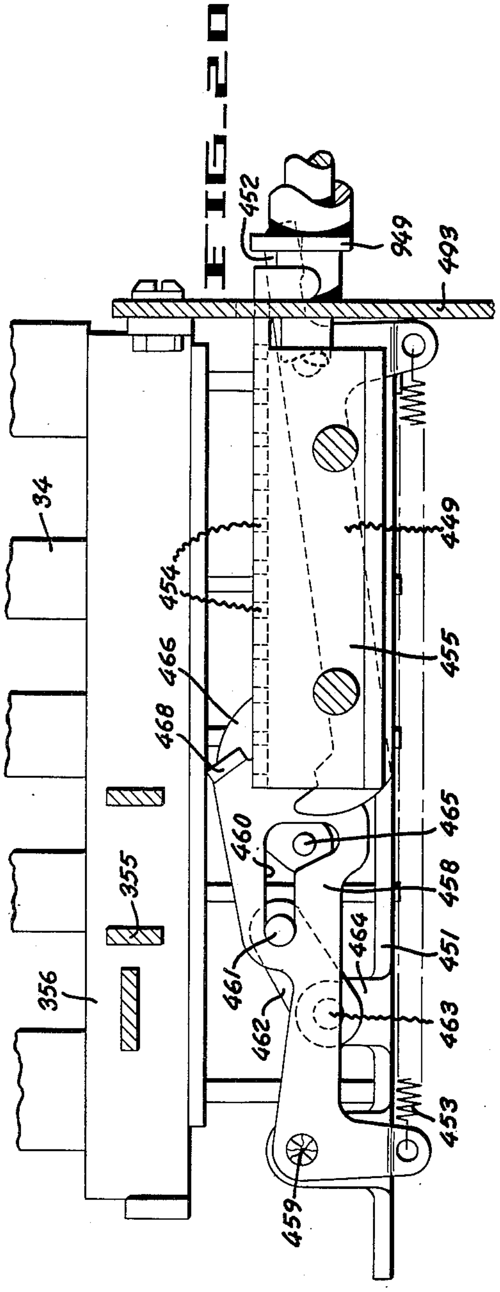
Fig. 20 is a view similar to Fig. 19 with the escapement mechanism disabled and with the pin carriage in its fully released position as indicated by the pin carriage rack 455.
Figure 40:
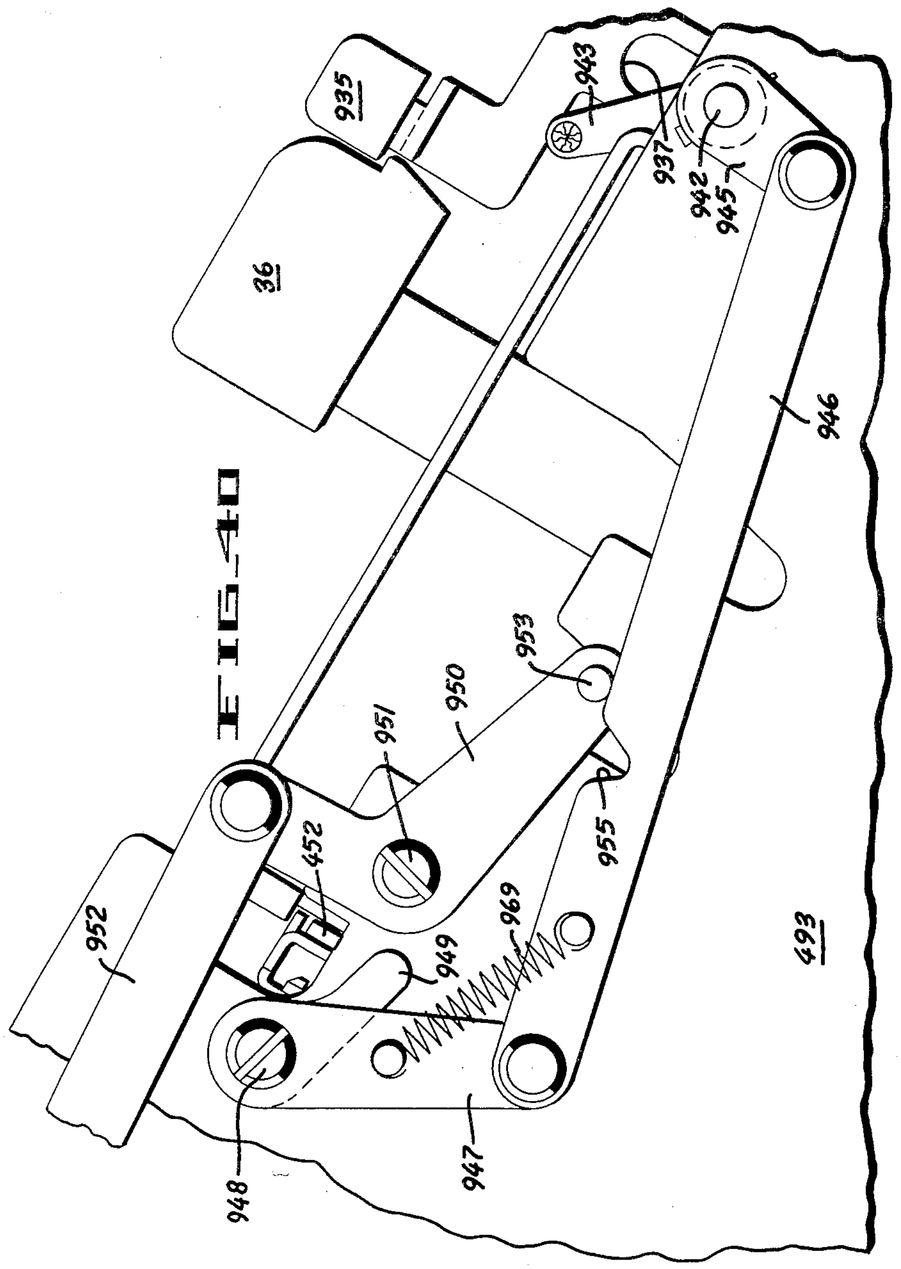
Fig. 40 is an enlarged fragmentary view from the left side of the machine with certain parts omitted to more clearly illustrate the multiplier pin carriage escapement release mechanism and the latch therefor.

The shaft 942 carries an arm 943 having an elongated pin 944 underlying a shoulder on each key 935, 936 which, upon depression of either key, rocks the shaft 942 and an arm 945 pinned to the outer end thereof counter-clockwise (Fig. 40). A link 946 is pivotally connected at either end to arm 945 and an arm 947 rockable about a stud 948 on the frame plate 493. An arm 949 integral with the arm 947 is rocked counter-clockwise with the rocking of shaft 942 and arm 945 to engage the lateral extension 452 of the stop pawl 449 (Figs. 19 and 20). With the rocking of the arm 949 the nose of the stop pawl 449 is moved from engagement with an active tooth 454 of the pin carriage rack 455. The pin carriage is then free to escape, under the urgency of the spring 448, to its leftmost position, as viewed in Figs. 1 and 11 or rightmost position as seen in Fig. 20.

It will be recalled that three multiplier values have been entered into the rack segments 442 prior to the depression of either key 935 or 936 when, upon the depression thereof, the pin carriage moves to its extreme position. In this position, therefore, seven of the ten segments or adjustable elements 442 in the pin carriage 441 register "0" which, when each is moved into active control position, determines a right shift of the accumulator carriage. Since there are nine such right carriage shifts required to align the 13th accumulator dial 17 with the units value of the multiplicand in the keyboard as determined by the indicator 920, two additional right shift cycles must be effected.

Figure 41:
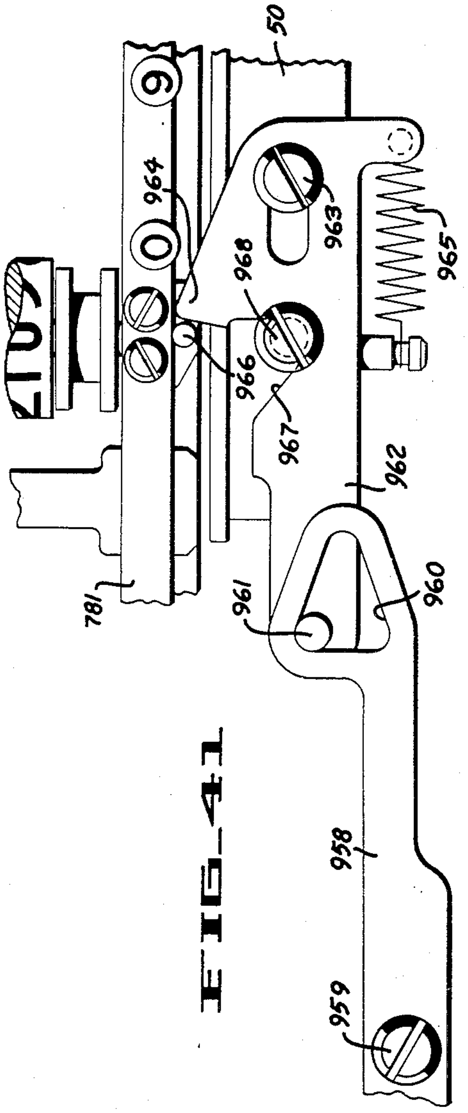
Fig. 41 is an enlarged detail of the pin carriage escapement latch releasing means immediately prior to actuation by the register carriage.

For this purpose, a latching bellcrank 950 (Fig. 40) is pivoted on the frame plate 493 at 951 and has one arm which is pivotally connected to a link 952, and a second arm which carries a pin 953. With the forward movement of the link 946 upon depression of key 935 or 936, a spring 954 (Figs. 24 and 38) urges the pin 953 into a notch 955 of the link 946. At its rearward end, the link 952 forms a laterally disposed right angle extension 956 which lies in a plane parallel to the face of the machine, and is connected at 957 to a lever 958 fulcrumed at 959 on a bracket of the machine frame. The free end of the lever 958 has a triangular aperture 960 therein encompassing a pin 961 (Figs. 41 and 42) on a pass-by pawl 962, which is resiliently mounted for rocking and sliding movement on the transverse bracket 50 by a pin and slot connection 963. A nose 964 of the pawl 962 is urged upwardly by a spring 965 into the path of travel of a pin 966 on the front carriage rail 781 as seen in Fig. 41.

Figure 42:
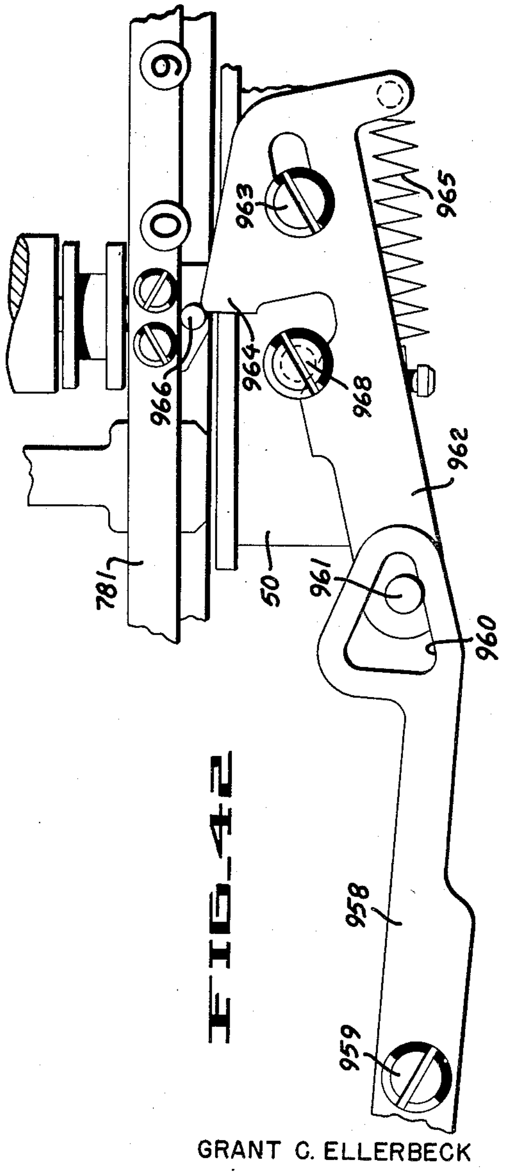
Fig. 42 is a view similar to Fig. 41 showing the actuation of the latch releasing means by the register carriage.

The depression of the key 935 or 936 (Fig. 40) rocks the shaft 942 to move the link 946 forwardly, when the spring 954 urges the pin 953 into the notch 955 and therefore rocks the lever 958 (Figs. 38 and 41) counter-clockwise. Rocking of the lever 958 serves to operatively position the lower surface of the aperture 960 relative to the pin 961, when the subsequent rocking of the pawl 962 operates to release the latching bellcrank 950. Pin 966 secured to the carriage rail 781 is in axial alignment with the 11th order dial 17 of the accumulator, so that two right shifts of the carriage from its leftmost position abuts the pin 966 with the nose 964 of the pawl 962. The ensuing or third right shift cycle operates immediately to cause the pin 966 to slide the pawl 962 to the right, guided in its sliding movement by the pin and slot 963. In this movement of the pawl 962 and during the first 140° of the third right shift cycle, an inclined surface 967 serves by its spring-urged engagement with a pin 968 on the bracket 50 to cam the pawl 962 counter-clockwise as seen in Fig. 42. In the next 20° of the shift cycle as the pin 966 passes over the tip of the nose 964, the pin 961 engages the lower side of the aperture 960 to rock the lever 958 clockwise, which through link 952 (Figs. 38 and 40) rocks the bellcrank 950 to release the latch pin 953 from its engagement with the notch 955. A spring 969 then becomes effective to restore the link 946 to its inoperative position, when the arm 949 is rocked out of engagement with the extension 452 of the stop pawl 449. Thus, the nose of the pawl 449 becomes effective to engage the teeth 454 of the pin carriage rack 455 to thereby check the step-by-step return of the pin carriage 441 to its normally inoperative position. During the initial phase of a multiplying operation when the accumulator carriage is shifted to its left end position, the pin 966, when engaging the pass-by pawl 962, merely rocks the pawl about its pivot 963 thereby moving the pin 961 in an arcual path within the wide portion of the aperture 960. Such movement of the pawl 962 is therefore ineffective to rock the lever 958.

Referring now to Figs. 11, 17 and 33, it will be recalled that in a conventional multiplying operation, as described in Patent No. 2,399,917 and briefly disclosed herein, the entry of each digit of the multiplier into the dials 35 escapes the pin carriage 441 step-by-step to the left. The first such stepped escapement moves the cylinder 684 to the left when the spring 680 (Fig. 33) becomes effective through the conditioning lever 674, link 675, and arm 681 to rock the shaft 682 and pin 683 counterclockwise (Fig. 17). This enabled clockwise rocking of the shaft 682 (Fig. 33) causes the pin 673 to be moved upwardly out of the arcuate path of travel of pawl 670. Therefore, the depression of the key 36 or 38 rocks the shaft 151 and arm 617 counter-clockwise to move the pawl 670 to a position beneath the pin 673, thereby preventing the rocking of the lever 674 to its operative position with respect to the arm 677 of the forked lever 678.

To register a product in the left ten dials 17 of the accumulator the multiplier or smaller factor is entered into the segments 442, and with the first stepped escapement of the pin carriage 441 the spring 680 moves the pin 673 out of the path of the pawl 670. With each escapement of the pin carriage the indicator 920 is moved ordinarily to the left, as viewed in Fig. 1, to predetermine the ordinal row of keys 22 in which the units digit of the multiplicand is to be set. To use, for example, a multiplier "123" and a multiplicand "4567," the "7" will be set in the fourth row of keys 22 from the right (Fig. 1), the "6" will be set in the fifth row of keys, the "5" in the sixth row of keys, and the "4" in the seventh row of keys.

The depression and latching of the keys 36 and 38 initiates an operation by a return of the carriage to its left end position, and in the use of the key 38 initiates the additional operation of resetting the registers to "0." After this initial operation, the remaining operations are similar and are dependent upon the oscillation of override pawl 107 (Fig. 7) during the cycle following the last shift cycle, i. e., the resetting cycle if a resetting operation is determined.

Figure 21:
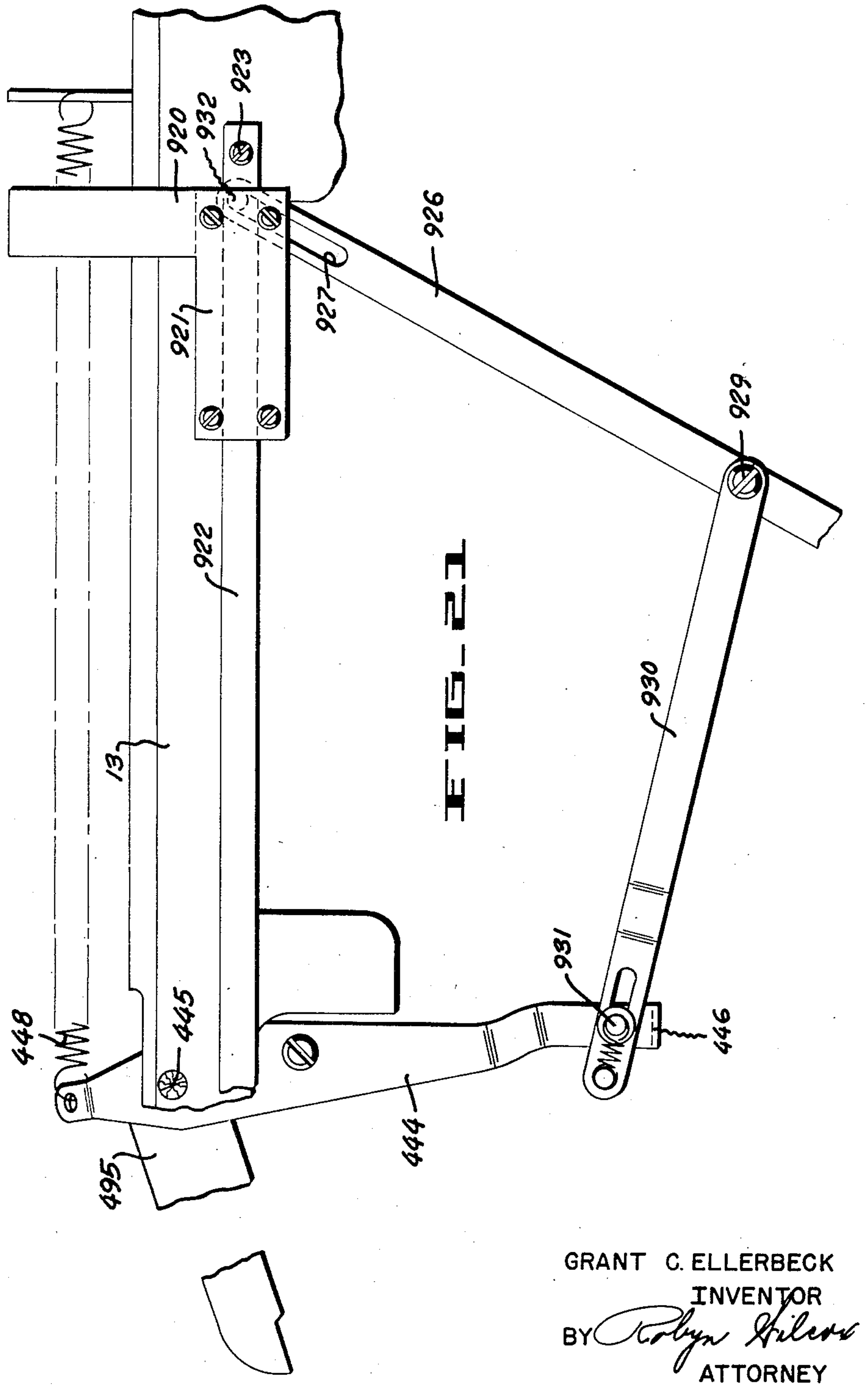
Fig. 21 is a view of the ordinal keyboard indicator as seen from the underside of the machine.

With the above in mind the remaining operations of the machine will be summarized briefly with respect to the multiplication key 36 and the auxiliary key 935. As the auxiliary key 935 is depressed, it engages an underlying shoulder of the key 36 which is also simultaneously depressed. While the key 36 is latched depressed in a conventional manner, the key 935 is immediately restored to its initial position by a spring 970. Since the value "123" has been previously set in the pin carriage 441, the depression of the key 935 (Fig. 40) immediately rocks the arms 945, 947 and 949 counter-clockwise. The arm 949 then operates with the extension 452 to rock the nose of the stop pawl 449 (Fig. 20) out of engagement with the pin carriage rack 455 and the pin carriage then moves to its rightmost position, or leftmost position as viewed in Fig. 1, under the urgency of spring 448 (Fig. 21). Stop pawl 449 is latched in its disengaged position by the rocking of the pin 953 into the notch 955 of the link 946 under the urgency of spring 954 (Fig. 24). Each of the seven lowest order rack segments 442 of the pin carriage are therefore in their "0" position with the lowest order segment in position for active control by the feed pawl 475 (Fig. 18).

It will be readily apparent that the arm 945 may be extended upwardly to form a manipulable lever by which the shaft 942 could be rocked independently of key 36 to cause disengagement of the stop pawl 449 from the rack 455, and the multiplying operation may then be initiated by the depression of the selected key 36 or 38.

Immediately following the shift of the carriage to the left, several functions are set into operation. These functions are fully described in the afore-mentioned Patent No. 2,371,752, and include enabling of the control which determines the sign character of the registration of the product, enabling of the power set means for operating the sign character control, and setting the control for enabling the feed pawl 475 for the multiplier racks. As each of the seven lowest rack segments 442 which are in their "0" position, are moved into active control position, a right shift cycle is determined for the accumulator carriage and the pin carriage on the overstroke advance thereof by pawl 475. However, while both the accumulator carriage and pin carriage are shifted one ordinal position to the right, the pin carriage immediately returns to its released position under the urgency of spring 448, since the stop pawl 449 has been disabled. The pawl 475 again operates to cause a second right shift of both carriages, moving the pin 966 to the position shown in Fig. 41, while the pin carriage again returns to its released position. As the third right shift of the accumulator carriage is initiated by the pawl 475, the pin 966 operates immediately to effect a leftward sliding and counter-clockwise rocking movement of the pawl 962 against the urgency of the spring 965 as seen in Fig. 42. Such movement of the pawl 962 rocks the lever 958 clockwise (Figs. 24 and 40) and through link 952 rocks the bellcrank 950 counter-clockwise to remove the latch pin 953 from the notch 955. The spring 969 then urges the link 946 rearwardly to release the arm 949 from its engagement with the lateral extension 452 of the stop pawl 449 (Figs. 19 and 20). Spring 453 then becomes effective to rock the pawl 449 clockwise from the position shown in Fig. 20, so that the nose thereof again cooperates with the teeth 454 of the pin carriage rack to check the pin carriage in the third right shift cycle and in each right shift of the pin carriage thereafter.

Since seven of the adjustable elements or rack segments 442 were in their "0" position, six of these segments now remain to determine six additional right shifts of the accumulator carriage and the pin carriage. The first two cycles, following the shift of the accumulator carriage to its left end position, operate to shift the carriage two ordinal positions to the right, but are ineffective to shift the pin carriage two steps since the stop pawl 449 has been disabled. However, the third right shift cycle again shifts the accumulator carriage which enables the stop pawl 449 to check the pin carriage after having been effectively shifted one position or step to the right. The six succeeding right shift cycles move the 13th dial 17 into ordinal alignment with the "7" or units value of the multiplicand in the keyboard and moves the "3" or units value in the multiplier segment 442 to the right into active control position with respect to the feed pawl 475.

It will now be recalled that in a conventional multiplying operation the multiplicand "4567" will be added three times and the resulting product product "13701" is registered in the product register dials 17 with the units value "1" being registered in the 13th dial. The product register is then shifted ordinally to the right and the "2" of the multiplier is moved to the right into active control position with respect to feed pawl 475, when the multiplicand is added twice to the "1370" and the resulting "105041" is registered in the product dials. Another right shift cycle is initiated and the "1" of the multiplier is moved into active control position and the multiplicand is added to "1050" of the previous product, thereby effecting registration of the final product "561741" in six of the left ten dials 17.

Each registration cycle in each ordinal position of the accumulator carriage is registered in the revolutions counter so that at the conclusion of the multiplying operation the multiplier "123" appears therein.

When it is desirable to accumulate products in the revolutions counter the operator moves the nonentry control key 350 and extension 351 (Fig. 11) forwardly when the spring 259 (Fig. 10) urges the slide 257 upwardly to move the finger into blocking relation with the arm 372 of the counter actuator 140 preventing rocking movement thereof. Depression of the key 935 or 936 then operates as described above to register the product in the left ten dials of the accumulator. However, since the counter actuator has been disabled no entry will be registered in the counter dials.

The depression of the key 36 alone (Fig. 11) will then serve to engage the clutch jaws 388, 390, and through the bail 365 (Fig. 12), arm 363, link 354, and arm 359 move the slide 259 downwardly to enable the counter actuator. As previously disclosed the carriage or product register is shifted to its left end position and the product of the first multiplication operation becomes a multiplier. Each value of such multiplier is ordinally reduced to "0" from the lowest to the highest order and each of these cycles is registered ordinally in the revolutions counter.

*Multiplier correction*

If an erroneous multiplier is set in the multiplier racks 442 and it is desired to remove the multiplier setting without changing the registration in the accumulator or revolutions counter, means are provided for restoring the rack segments of the multiplier unit to zero under control of correction key 39 (Figs. 1, 8, 11 and 17). Upon depression, the key 39 enables the drive mechanism, and the actuating and shifting mechanism for the multiplier, or pin carriage, in a similar manner to that shown in said Patent No. 2,371,752. Means are provided, however, whereby the depression of the key 39 is only possible when the pin carriage 441 is displaced from its right-hand position.

As the pin carriage 441 is moved to the left (Fig. 11)

with the entry therein of the first multiplier value, the cylinder 684 is likewise moved to the left, enabling the pin 683 and shaft 682 to be rocked counter-clockwise (Fig. 17) under the urgency of the spring 680 (Fig. 33).

Referring to Figs. 11 and 17, the rocking of the shaft 682 rocks an arm 975 secured thereto to move a link 976 rearwardly. The link 976 has a slot 977 in the free end thereof, embracing a pin 978 on a right angle slide 979 mounted for sliding movement by the engagement of pins 980 in a slot of a bracket 981 secured to the transverse bracket 356. With the pin carriage moved out of its right-hand or home position, the rocking of the shaft 682 and arm 975 serve through link 976 to move an ear 982 of the slide 979 rearwardly from its blocking relation with the key 39. The ear 982 of the slide 979 is normally urged by a light spring 983 to a position beneath the key 39 preventing the depression thereof with the pin carriage 441 in its normally inoperative position.

I claim:

1. In a calculating machine having a selection mechanism, an ordinal register with certain orders lying inboard and others lying outboard of said selection mechanism, a unicyclic actuating means, settable means for cooperation with the inboard orders of said register operable by said actuating means to selectively transmit a value positively or negatively from said selection mechanism into said register, a sign character determining means operable to adjust said settable means, and an automatic division mechanism, the combination comprising, cyclically operable means for sequentially operating predetermined outboard orders of said register and adjustable by said sign character determining means to control a registration in said outboard orders conversely to the registration in said inboard orders, a division conditioning means for controlling said sign character determining means, a power means for said cyclically operable means, a normally disengaged clutch associated with said cyclically operable means and engageable with said power means for driving said cyclically operable means in an opposite direction relative to said settable means, and means controlled by said division conditioning means to engage said clutch.

2. In a calculating machine, the combination of a selection mechanism, an ordinal register with certain orders lying inboard and others lying outboard of said selection mechanism, actuating means for transmitting a value from said selection mechanism to the inboard orders of said register, a plural order multiplication control mechanism, a plural order division control mechanism, a control key for each of said mechanisms manipulable to initiate operation of said actuating means, a normally disabled cyclic power means for the substantially simultaneous registration of a value in a predetermined outboard order of said register, and means controlled by either of said control mechanisms upon manipulation of a respective one of said keys to enable operation of said cyclic power means.

3. In a calculating machine, the combination of a selection mechanism, an ordinally shiftable register with certain orders lying inboard and other orders lying outboard of said selection mechanism, actuating means for transmitting a divisor from said selection mechanism to the inboard orders of said register, a cyclic power means for the substantially simultaneous registration of a quotient in a predetermined outboard order of said register, an automatic division mechanism adapted to render said actuating means and said cyclic power means operable to enter such values of dissimilar sign character respectively in the inboard orders and the outboard orders of said register, and a manually operable key for initiating operation of said automatic division mechanism.

4. In a machine of the character described in claim 3 having a revolutions counter, adjustable means normally operative to control a like sign character registration in said revolutions counter with respect to the sign character registration in the inboard orders of said register, a control key, a normally ineffective disabling means for said revolutions counter, and means selectively operable by said control key to adjust said adjustable means for an unlike sign character registration and to enable said disabling means.

5. In a machine of the character described in claim 4 having a latching means for said disabling means, control means for said latching means operable by said division mechanism to maintain said disabling means effective during a division operation when said manually operable key is cooperatively operated with said control key, and means operable to restore said disabling means to its normal condition at the conclusion of a division operation when the automatic division mechanism is effective to release said latching means.

6. In a calculating machine having a selection mechanism, an ordinally shiftable register with certain orders lying inboard and other orders lying outboard of said selection mechanism, means for shifting said register relative to said selection mechanism, means settable from a central neutral position for selectively determining a negative or positive transmission of a value from said selection mechanism to the inboard orders of said register, a unidirectional actuating means for said settable means, adjusting means for setting said settable means, a revolutions counter, an actuator for said revolutions counter, controlling means positionable to determine the movement of said actuator for a like or unlike sign character registration in said counter with respect to said register, a manually operable key for positioning said controlling means, and an automatic division mechanism comprising, a control key, a division conditioning means operable by said key to adjust said adjusting means for a subtractive registration in the inboard orders of said register and with the simultaneous operation of said manually operable key to adjust said controlling means for an unlike registration in said revolutions counter, an overdraft responsive means, a division programming mechanism rendered operative by said overdraft responsive means to control said shifting means and said division conditioning means for a predetermined sequence of operations, a driving means positionable by said adjusting means to determine a positive or negative registration in a successive outboard order in each ordinally shifted position of said register, a normally ineffective power means for actuating said driving means in a direction opposite to that of said settable means, a clutch means for connecting said driving means to said power means, and means controlled by said division conditioning means upon the depression of said control key for engaging said clutch means.

7. In a calculating machine having a selection mechanism, an ordinally shiftable register with certain orders lying inboard and others lying outboard of said selection mechanism, an actuating means for the inboard orders of said register, an automatic division mechanism including means for effecting operation of said actuating means, a key for initiating operation of said division mechanism, a revolutions counter for the registration of a quotient, a revolutions counter registration mechanism, a sign character control key operative with the simultaneous depression of said initiating key to condition the said revolutions counter registration mechanism for a registration opposite in sign character to that of the inboard orders of said register, and the combination of means for registering a quotient in the outboard orders of said register to the exclusion of said revolutions counter including a normally disabled means cyclically operable by said actuating means to register a value in predetermined successive outboard orders of said register, movable means rendered operative by said initiating key to enable said cyclically operable means, a disabling means normally ineffective to disable said revolutions counter mechanism, a latching means for said disabling means, means operative by said sign character control key to selectively enable said disabling means, and means operable by said movable means upon the depression of said division initiating key in cooperation with the depression of said sign character control key to control said latching means, thereby restraining operation of said revolutions counter mechanism for the duration of a division operation.

8. In a calculating machine, a selection mechanism, an ordinally shiftable carriage, a register in said carriage having certain orders lying inboard of said selection mechanism and other orders lying outboard thereof, unidirectional actuating means for said inboard orders, means including a clutch for driving said actuating means, means for shifting said register carriage relative to said actuating means, a series of reversing gears interposed between said register and said actuating means, a slide for moving said gears in either direction from a central neutral position thereof to determine additive and subtractive registration in the inboard orders of said register, a lever for connection with said slide to control the movement thereof, a control key for initiating a division operation, means operable by said division control key to connect said lever with said slide and to engage said clutch, a cam associated with said lever and periodically effective to move said slide backward and forward during a division operation, said cam effecting movement of said slide to its central position intermediate the backward and forward movement thereof, means associated with said cam operable to enable said shifting means with said slide in its central position, and a settable gear means movable by said slide and operable by said actuating means to effect an unlike sign character registration in predetermined outboard orders of said register with respect to the inboard orders thereof, the combination comprising a power means for said settable gear means including a normally disengaged clutch element, a cyclically actuated cam means driven by said actuating means, a cam follower associated with said cam means effective to cyclically operate said settable gear means when said clutch element is engaged, means for engaging said clutch element, and means operable by said lever to control said clutch engaging means upon depression of said division initiating key.

9. In a calculating machine having a register, and an automatic division mechanism including means for controlling the registration of a divisor in certain lower orders of said register, a control key for initiating operation of said division mechanism, and means rendered operable by said controlling means upon manipulation of said control key to simultaneously register the quotient in predetermined higher orders of the same said register.

10. In a machine of the character described having an actuating mechanism, a shiftable carriage, an ordinal register in said carriage with certain orders lying inboard of said actuating mechanism and others lying outboard thereof, a revolutions counter mechanism, adjustable means for conditioning said revolutions counter mechanism to selectively register each machine cycle in a like or an unlike sign character with respect to said inboard orders of said register, a disabling means for said counter mechanism, and an automatic division mechanism comprising, a cyclic driven means normally disengaged from said actuating mechanism and operable upon engagement therewith to control registrations in successive predetermined ones of said outboard orders of said register, means for engaging said cyclic driven means with said actuating mechanism, a manually operable key, means controlled by said manually operable key to initiate operation of said division mechanism and to operate said engaging means, a dual purpose key juxtaposed with said manually operable key for cooperative operation therewith to adjust said adjustable means for an unlike sign character registration by said revolutions counter mechanism, a normally ineffective member positionable to effect operation of said disabling means, a latching means rendered operative by said controlled means to engage and latch said positionable member in its ineffective position upon the simultaneous depression of said manually operable key and said dual purpose key, and means operative by the depression of said dual purpose key precedent to the depression of said manually operable key to move said positionable member to its effective position wherein the immediate depression of said manually operable key enables said latching means and initiates a division operation.

11. In a calculating machine, the combination of a selection mechanism, a shiftable carriage, an ordinal register in said carriage having certain orders lying inboard of said selection mechanism and others lying outboard thereof, actuating means for transmitting a value from said selection mechanism to the inboard orders of said register, a cyclically operable means for controlling a registration in the outboard orders of said register during plural order operations, an automatic division mechanism, means operable by said division mechanism for causing said cyclically operable means to register a value in the outboard orders of said register, a first control key for initiating operation of said division mechanism, an automatic multiplication mechanism, a second control key for initiating a multiplication operation wherein a product is registered in the inboard orders of said register, means rendered effective upon the depression of said second control key to render said cyclically operable means operative to reduce the value in the outboard orders of said register to "0" immediately following an automatic division operation, and means controlled by said outboard orders of said register operable to control said multiplication mechanism.

12. In a calculating machine, the combination of a selection mechanism, an ordinally shiftable register, numeral wheels in said register, actuating means for those of said numeral wheels which are inboard of said selection mechanism, a cyclically controlled means normally ineffective to control a registration in the other of said numeral wheels which are outboard of said selection mechanism, means for ordinally shifting said register relative to said actuating means and said cyclically controlled means, settable means associated with said actuating means and said cyclically controlled means to determine the sign character registration in the inboard and outboard numeral wheels, a cyclic drive means operated by said actuating means and engageable with said cyclically controlled means, means for engaging said cyclically controlled means with said cyclic drive means, and a plural order operation control mechanism including means for setting said settable means, means to operate said engaging means, and means for causing operation of said actuating means.

13. In a calculating machine, the combination of a selection mechanism, a register having numeral wheels lying inboard of said selection mechanism and other wheels lying outboard thereof, a sign character control means for said register positionable to determine a positive or negative registration in the inboard wheels and an unlike sign character registration in the outboard wheels, a plurality of control keys, each of said keys being operable upon manipulation thereof to effect positioning of said sign character control means in accordance with the key manipulated, actuating means for transmitting a value from said selection mechanism into the inboard wheels of said register, a normally disabled means driven cyclically by said actuating means for controlling the registration of a value in the outboard wheels of said register during the transmittance of a value from said selection mechanism into the inboard numeral wheels by said actuating means, and means rendered operable upon manipulation of any one of said keys to enable operation of said cyclically driven means.

14. In a calculating machine, a register, certain dials in said register for receiving a multiplier and dials other than said certain dials for registering a product, a selection mechanism for receiving a multiplicand, differential actuators associated with said selection mechanism operable to effect registrations in said other of said dials, a revolutions counter, an actuating means therefor, manually operable means positionable to disable said revolutions counter actuating means, a multiplying mechanism including a control key, means operable by said control key to condition said multiplying mechanism, a cyclically operable means for actuating said certain dials in said register, settable means for superseding said manually operable means to enable said counter actuating means, means operative upon actuation of said certain dials by said cyclically operable means to control said multiplying mechanism and thereby cause registration of a product in the other of said dials and the registration of the multiplier as represented in said certain dials in said revolutions counter, and power driven means rendered effective by said control key upon operation thereof for enabling said cyclically operable means and setting said settable means.

15. In a calculating machine of the character described having an actuating means, a shiftable register with inboard numeral wheels and outboard numeral wheels, said inboard numeral wheels being operatively related to said actuating means, plus-minus gears movable in either direction from a neutral inactive position for determining the sign character of the registrations in said numeral wheels, means for controlling the position of said plus-minus gears, a revolutions counter, a manually operable member positionable to disable said revolutions counter, drive means for said actuating means and said revolutions counter, register return and resetting means operated by said drive means for effecting shifting of said register to a first ordinal position thereof and for thereafter resetting said numeral wheels to zero, a plural order multiplier selection mechanism including a carriage shiftable from a normally inactive position to an active position for controlling a multiplication operation, a drive mechanism for said selection mechanism, a shifting means for returning said carriage ordinally to its inactive position when moved therefrom, and means controlled by said selection mechanism for effecting shifting of said register and the operation of said shifting means, and an automatic multiplication mechanism comprising, means for entering a multiplier in the outboard numeral wheels of said register, a cyclic clutch engageable with said actuating means to drive a predetermined one of said plus-minus gears for effecting a registration in each ordinally shifted position of the outboard numeral wheels of said register and thereby control a registration of an opposite sign character in the inboard orders of said register, means settable to disable the said resetting means with respect to the outboard numeral wheels of said register, means adjustable to render said controlled means ineffective with respect to said selection mechanism, means associated with said last-named means and adjustable therewith to supersede said manually operable member and enable said revolutions counter, a rockable member for engaging said cyclic clutch, for setting said settable means, and adjusting said adjustable means, an oscillating member actuated by said drive means and normally ineffective to rock said rockable member, normally inactive means for positioning said controlling means, a control key for moving said inactive means into operative position relative to said controlling means and for enabling said register return and resetting means, a movable member for disabling said drive mechanism and said carriage shifting means, a link positionable relative to said oscillating member for rocking said rockable member and sliding said movable member to an active position, means operative by said carriage in its normally inactive position to render said link operable by said key, power means controlled by said drive means for actuating said controlling means, and means operable by the depression of said key to position said link for movement by said oscillating member and to initiate said drive means.

16. In a calculating machine, a selection mechanism in which a multiplicand is entered, actuating means for said selection mechanism, a power means for said actuating means, a product register, means for ordinally shifting said register relative to said selection mechanism, predetermined orders of said register lying outboard of said selection mechanism and operative to receive a multiplier factor, means for entering a multiplier into said predetermined orders, means for clearing said register, a revolutions counter, a normally ineffective disabling means for said revolutions counter, a manually operable means positionable to render said disabling means effective, and an automatic multiplication mechanism including, a control key, a cyclically operable clutch engageable to cause a cyclic reduction to "0" of each of said predetermined orders in each ordinally shifted position of said register, means for disabling said clearing means with respect to said predetermined orders, means for successively sensing the "0" position of each of said predetermined orders, means operable by said power means in cooperation with said sensing means to enable said shifting means, and means operable upon depression of said control key to supersede the control by said manually operable means when said manually operable means is operatively positioned, to engage said cylically operable clutch, to enable said clearing disabling means, and to cause operation of said power means.

17. In a calulating machine having a selection mechanism, an ordinal register with certain orders lying inboard of said selection mechanism and other orders lying outboard thereof, actuating means for the inboard orders of said register, a first control key, a second control key, a sign character control means for said register settable by said first control key for a negative registration therein and by said second control key for a positive registration therein, and a multiplication mechanism comprising, registration control means for the outboard orders of said register including a clutch means engageable with said actuating means to effect a sign character registration in a predetermined outboard order unlike the sign character registration in the inboard orders irrespective of the setting of the sign character control means, and means operative by said first control key and said second control key to cause engagement of said clutch means and initiate operation of said multiplication mechanism.

18. In a calculating machine, the combination of an ordinal register, the higher orders of said register adapted to register values of one sign character, the lower orders of said register adapted to register a value of an unlike sign character with respect to the higher orders, actuating means for said lower orders of said register, a driven means engageable with said actuating means to control registrations in said higher orders of said register, means settable to determine the sign character of the registrations in said register by said actuating means and said driven means, a first control key, a second control key, means responsive to the depression of either of said keys for enabling said actuating means, means also controlled by either of said keys to engage said driven means, and a movable member for selective control by said first key and said second key to set said settable means for a negative or positive registration respectively in said higher orders of said register and for a positive or negative registration respectively in said lower orders of said register.

19. In a calculating machine having an ordinal accumulator and a revolutions counter in an ordinally shiftable carriage, means for shifting said carriage, certain orders of said accumulator adapted to receive a plural digit multiplier factor, means for entering a multiplier into said certain orders of said accumulator, means for zeroizing said accumulator and said revolutions counter in the first ordinal position of said carriage, and a multiplying mechanism including means positionable to disable said zeroizing means with respect to said certain orders of said accumulator, actuating means operatively related to said certain orders to control successive operation thereof in accordance with the successive digits of the multiplier and effect registration of a product in other than said certain orders of said accumulator, a power means for said actuating means, power-driven means for enabling said actuating means and positioning said disabling means, a sensing means associated with each successive digit of the multiplier for control of said multiplying mechanism, a control key, means operative with the depression of said control key to condition said power-driven means, to effect operation of said shifting means to position said carriage in the first ordinal position thereof, and to enable said power means, and means controlled by said carriage in the first ordinal position thereof to initiate operation of said multiplying mechanism.

20. In a calculating machine having an actuating means, a shiftable accumulator operatively related to said actuating means for registering a product, means for effecting an ordinal shifting movement of said accumulator relative to said actuating means, and an automatic multiplication mechanism, the combination comprising, a multiplier mechanism for receiving a plural digit multiplier factor including a shiftable carriage and means for shifting said carriage, said multiplier mechanism being operatively related to said actuating means and said ordinal shifting means to control successive operation thereof in accordance with the successive digits of the multiplier, a control key, means positionable upon depression of said key to render said carriage shifting means ineffective to position said multiplier mechanism for the successive control of said actuating means, a latch means for latching said last-named means in its operative position, and means controlled by the ordinally shifted position of said accumulator to release said latch means and thereby enable the successive control positioning of said multiplier mechanism relative to said actuating means.

21. In a calculating machine having a selection mechanism, a register with certain numeral wheels lying outboard of said selection mechanism for the registration of a multiplier and other wheels lying inboard thereof for registering a product, means for entering a multiplier in the outboard wheels, actuating means for the inboard wheels of said register, a cyclic drive means for said actuating means, means for shifting said register to a first ordinal position and means for resetting said wheels to zero in the first ordinal position of said register, and a plural order multiplication control mechanism including a cyclic clutch operated means for restoring each successive multiplier numeral wheel to zero, means for ordinally positioning said register relative to said actuating means and said cyclic clutch operated means, means settable to prevent resetting of the outboard wheels by said resetting means, means for sensing the zero position of each outboard numeral wheel in each ordinal position of said register, a positionable means for effecting operation of said clutch operated means, setting said settable means, and for conditioning said sensing means, a power-operated means for positioning said positionable means, a power-driven means associated with said drive means for effecting operation of said power-operated means, a control key and latching means therefor, means operative by said control key upon depression and latching thereof to effect operation of said power-operated means by said power-driven means, to cause actuation of said shifting means and said resetting means, and to initiate operation of said drive means, and cam means operable by said drive means to effect operation of said ordinal positioning means under the control of said sensing means.

22. A calculating machine of the character described in claim 21 having a latch means for latching said positionable means in its effective operational position, and means operable by said power-driven means to release said latch means with the termination of an automatic multiplication operation.

23. A calculating machine of the character described in claim 21 having a plural zero sensing means for the outboard numeral wheels of said register, yieldable means operable by said cam means for the cyclic control of said plural zero sensing means, means cooperatively related to said plural zero sensing means for engagement with said power-driven means to release said control key, and means operable with the actuation of said yieldable means to engage said related means and said latch releasing means with said power-driven means to release said latch means and said control key thereby terminating a multiplication operation when all outboard numeral wheels are in their zero positions.

24. In a calculating machine having a selection mechanism, a register with certain numeral wheels lying outboard of said selection mechanism for the registration of a multiplier and other wheels lying inboard thereof for registering a product, means for entering a multiplier factor in the outboard wheels, actuating means for the inboard wheels of said register, a cyclic drive means for said actuating means, means for shifting said register to a first ordinal position thereof, and a plural order multiplication mechanism for controlling the registration of a product in the inboard wheels of said register determinable by the factor in the outboard wheels of said register, said mechanism including a cyclic clutch operated means for restoring each successive multiplier numeral wheel to zero, means for enabling ordinal positioning of said register from the first ordinal position thereof relative to said actuating means and said cyclic clutch operated means, means for sensing the zero position of each outboard numeral wheel in each ordinal position of said register to thereby render said enabling means effective, means positionable to effect operation of said clutch operated means and to condition said enabling means for control by said sensing means, a power-operated means for positioning said positionable means, a power-driven means selectively operable to control said power-operated means, a manually operable key, means controlled by said manually operable key upon depression thereof to condition the said power-operated means for control by said power-driven means, to effect operation of said shifting means, and to enable said drive means, a cam means operable by said drive means to actuate said enabling means under the control of said sensing means, a latch means for latching said positionable means in its effective operational position, means engageable with said power-driven means to release said latch means following the restoration of all multiplier digits to zero, and means operable to restore said positionable means to its inactive position with the release of said latch.

25. A calculating machine of the character described in claim 24 having a plural zero sensing means for the outboard numeral wheels of said register, yieldable means operable by said cam means for the cyclic control of said plural zero sensing means, means associated with said plural zero sensing means and normally operable therewith to engage said power-driven means when all outboard numeral wheels stand at zero, means rendered effective by said controlled means upon depression of said key for disabling said associated means, operation terminating means actuated by said register in the last ordinal position thereof to release said disabling means, and means effective immediately upon release of said disabling means to cause engagement of said associated means and said latch releasing means with said power-driven means to terminate an automatic multiplication operation.

26. In a calculating machine, the combination of a register, selectively operable numeral wheels therein for registering a product, a multiplier mechanism in which one factor is entered, an ordinal keyboard for the entry of a second factor, an indicating means associated with said keyboard and positionable by said multiplier mechanism for determining the ordinal entry of the second factor, means for ordinally shifting said register relative to said keyboard, means controlled by said multiplier mechanism for enabling said shifting means, means operable by said multiplier mechanism for controlling a cyclic registration of the second factor into said register, manually settable means for delaying the cyclic operation of said operable means to effect a registration in said register, means for latching said manually settable means in its operative position, and means controlled by said register during the ordinal shifting thereof to release said latching means and thereby enable the effective operation of said controlling means to register a value in said selectively operable numeral wheels predetermined by said indicating means.

27. In a calculating machine having an accumulator in an ordinally shiftable carriage, numeral wheels in said accumulator for registering a value, means for ordinally shifting said carriage, an adjustable value selection mechanism for controlling a plural order operation, cyclic drive means for adjusting said value selection mechanism upon the registration of a zero therein, means for retaining said selection mechanism in each adjusted position thereof, means effective by said selection mechanism to enable said shifting means with each operation of said cyclic drive means, a control key for initiating a plural order operation, and a value entering mechanism for said selection mechanism including depressible numeral keys, a manually operable key cooperatively related to said control key, means positionable by said manually operable key to effect a plural zero entry into said selection mechanism and to disable said retaining means thereby rendering said cyclic drive means ineffective to adjust said selection mechanism, means for latching said positionable means in its effective position, and means controlled by said carriage in a predetermined ordinally shifted position thereof to release said latching means thereby enabling said retaining means and rendering said selection mechanism operative to control a registration in certain of said numeral wheels determined by the plural zero entry in the selection mechanism.

28. In a calculating machine having an ordinal keyboard for receiving a multiplicand, actuating means for cooperation with said keyboard, a drive means for cyclic control of said actuating means, a shiftable register operatively related to said actuating means, numeral wheels therein selectively operable to register a product, means for ordinally shifting said register relative to said actuating means, a multiplier mechanism for receiving a plural digit multiplier factor including a shiftable carriage and an escapement mechanism for effecting a step-by-step movement of said carriage from a normally inoperative position with the entry of each multiplier digit including a zero, said multiplier mechanism being driven by said drive means and operatively related to said actuating means and said ordinal shifting means to control successive operation thereof in accordance with the values of the successive multiplier digits, drive mechanism normally effective by said drive means to ordinally restore said carriage to its normally inoperative position in cooperation with said escapement mechanism and relative to the ordinally shifted position of said register, and mechanism for determining certain of said numeral wheels for a product registration including an indicating means associated with said keyboard and ordinally positionable with the step-by-step escapement of said carriage for determining the ordinal entry of a multiplicand, means manually settable to disable said escapement mechanism and thereby effect a movement of said carriage to an end position, latch means for said settable means operative to maintain said escapement mechanism disabled for predetermined cycles of said drive means thereby rendering said drive mechanism ineffective to restore said carriage, and a pass-by pawl operable by said register in a predetermined ordinally shifted position therof to unlatch said latch means thereby releasing the said settable means to its inoperative position when the escapement mechanism becomes effective to check the carriage in each ordinally restored position thereof by said drive mechanism and the multiplier mechanism becomes effective to control the multiplication operation.

29. In a calculating machine having a keyboard in which a first value is entered, a register, a single series of ordinally arranged dials in said register with certain of said dials positioned relative to said keyboard for receiving said first value and the other of said dials operable to register a second value, ordinal drive transmitting means for controlling the sign character registration of the first and second values into said series of dials, actuating means for a plurality of said ordinal drive transmitting means operable to effect registration of said first value into said certain of said dials, and an automatic division mechanism comprising, a control key, a division setting member operable by said control key to initiate operation of said automatic division mechanism, a normally inoperative means rendered operable by said setting member to control the operation of said ordinal drive transmitting means, a cyclic power means associated with a predetermined one of said ordinal drive transmitting means to control the registration of the second value in said other of said register dials, said second value being of opposite sign character to that of the registration of the first value in said certain of said register dials, a normally disengaged clutch for connecting said power means with said one of said drive transmitting means, and a rockable member operable by said normally inoperative means to engage said clutch upon operation of said setting member.

30. In a calculating machine, the combination of a selection mechanism, an ordinal register with certain orders lying inboard of said selection mechanism and other orders lying outboard thereof, a first control key, a second control key, actuating means operable upon operation of said first control key or said second control key to transmit a value from said selection mechanism to the inboard orders of said register, a cyclically controlled means operated by said actuating means to simultaneously register a value in a predetermined outboard order of said register upon operation of said first control key, means rendered operable upon operation of said second control key to sense the registration in the outboard order of said register, and means operative by said sensing means and said cyclically controlled means to control a plural order machine operation and thereby determine the registration in the inboard orders effected by said actuating means upon operation of said second control key.

31. In a calculating machine having a shiftable accumulator, numeral wheels in said accumulator, certain of said numeral wheels operable to receive a first value and the other of said numeral wheels operable to receive a second value, actuating means operable to register the first value of one sign character into said certain of said wheels, a normally disengaged means operable upon engagement with said actuating means to effect a registration of the opposite sign character in said other of said wheels, means for controlling the sign character of registrations in said wheels, normally inactive means to control the operation of said sign character controlling means, a control key, means operable to move said inactive means to active position relative to said sign character control means, and a power means rendered effective by said key upon operation thereof to initiate operation of said actuating means, to operate said moving means, and to effect engagement of said normally disengaged means with said actuating means to determine the registration of said second value into said other of said numeral wheels.

32. In a calculating machine, an ordinally shiftable register, means for entering a value in one part of said register, a selection mechanism for receiving a second value, actuating means adapted to cause a registration of said second value in another part of said register, means driven by said actuating means operable upon engagement with said value entering means to cause the entry of a value in said one part of said register, means for controlling the sign character registration of each of said values in said register, means for setting said sign character controlling means, a power means, means driven by said power means for actuating said setting means, a normally inactive means positionable to effect engagement of said value entering means with said driven means, means controlled by said power means for actively positioning said inactive means, a control key for conditioning said normally inactive means for operation by said power controlled means, means rendered operable by said power means to control the registration of said second value in the other part of said register upon entry of a value in said one part of said register, and means rendered effective by said key upon operation thereof to initiate operation of said power means.

33. In a calculating machine capable of performing plural order operations, the combination of a selection mechanism, an ordinally shiftable register with certain orders lying inboard and others lying outboard of said selection mechanism, actuating means for transmitting a value from said selection mechanism to the inboard orders of said register, a cyclic power means operated by said actuating means for the simultaneous control of registrations in said outboard orders of said register, means controlled by said actuating means in one type of machine operation for determining a registration by said cyclic power means in said outboard orders of said register, and means operable by said cyclic power means in another type of machine operation to determine the registration of a value by said actuating means in said inboard orders of said register.

34. In a calculating machine, the combination of an ordinally shiftable register, numeral wheels in said register with certain predetermined ones of said wheels adapted to receive a first value of one sign character and the other of said wheels adapted to receive a second value of an opposite sign character, actuating means operable to control registration of said second value in the other of said wheels, a first control key, a second control key, each of said keys being operable to initiate operation of said actuating means, means operated by said actuating means and operable upon operation of said first control key to effect a simultaneous registration of said first value in said predetermined ones of said wheels, and means rendered effective by said predetermined ones of said wheels to control the operation of said actuating means upon operation of said second control key.

35. In a calculating machine having a keyboard in which a divisor is entered, ordinal register dials with certain of said dials operative to receive a dividend and with the other of said dials operative to register a quotient, revolutions counter wheels for registering a quotient of like or unlike sign character with respect to the dividend in said register dials, means for selectively determining the sign character of the registration in said counter wheels, an automatic division mechanism including a manually operable key, a division setting member operable by said key to initiate operation of said division mechanism, a registration controlling means settable by said setting member and operative to control said determining means, ordinal drive transmitting means adjustable by said registration controlling means to effect a positive or negative registration in said register dials, differential means cyclically operable to control actuation of said drive transmitting means to effect the registration of a divisor in said dividend register dials, a cyclic power means for controlling the actuation of a predetermined one of said ordinal drive transmitting means to control the registration of a quotient in said other of said register dials, a normally disengaged clutch for connecting said power means with said one of said drive transmitting means, and means operable by said registration controlling means to engage said clutch upon operation of said manually operable key.

36. In a calculating machine, an ordinal register having inboard orders and outboard orders, cyclically operable actuating means for the inboard orders thereof, means for controlling a plural order division operation including a means for control by said cyclically operable actuating means to register a quotient in predetermined outboard orders of said register, means for enabling the control of said registering means by said actuating means, a setting means operable in a division operation to render said controlling means active, to effect operation of said enabling means, and to cause cyclic operation of said actuating means, a manually operable key for initiating operation of said setting means, a revolutions counter mechanism, a control key, a disabling means for said revolutions counter mechanism rendered operative by said control key, a latching means for said disabling means, and means operable by said manually operable key to enable said latching means.

37. In a calculating machine, a selection mechanism for receiving a multiplicand, a register, a single series of numeral wheels in said register, a first group of said series of wheels for registering a multiplier and a second group of said series of wheels for the registration of a product, actuating means for driving the said second group of wheels in either direction, means settable to determine the direction of rotation of said wheels in said register by said actuating means, a cyclic clutch operated by said actuating means to cause actuation of said first group of numeral wheels in a direction opposite to that of said second group of wheels irrespective of the setting of said settable means, a control key for determining the setting of said settable means and initiating a multiplication operation, means rendered operable upon the engagement of said clutch to control the registration of a product in said second group of wheels determined by the actuation of said first group of wheels, and power means rendered effective by the operation of said key to engage said clutch and set said settable means as determined by said key.

38. In a calculating machine, a carriage shiftable in either direction, said carriage having a register and a revolutions counter therein, a series of wheels in said register, a group of wheels of said series of wheels adaptable to receive a value, means for entering a value in said group of wheels, means for ordinally shifting said carriage in either direction to a predetermined ordinal position, a zero resetting means for said register and said revolutions counter operable in the predetermined ordinal position of said carriage upon operation of said shifting means to shift said carriage in one direction, means positionable to disable said resetting means with respect to said group of wheels, a cyclically operable power means, means engageable with said power means for restoring each of said group of wheels successively to a zero position, means for enabling operation of said restoring means subsequent to the operation of said resetting means, a control key operable upon the depression thereof to enable the operation of said shifting means to shift said carriage in said one direction, to position said disabling means, to enable said zero resetting means, and to effect engagement of said restoring means, means operable to terminate the operation of said shifting means and said resetting means upon movement of said carriage into the predetermined ordinal position thereof and to effect operation of said enabling means, and means rendered operable by each of said group of wheels upon restoration to zero to effect ordinal operation of said shifting means to shift said carriage in the other direction, whereby the value in said group of wheels is registered in said revolutions counter.

39. In a calculating machine, the combination of a selection mechanism, an ordinal register with certain orders lying inboard and others lying outboard of said selection mechanism, actuating means for transmitting a value from said selection mechanism to the inboard orders of said register, means for ordinally shifting said register in either direction relative to said selection mechanism, a plural order division control mechanism, a plural order multiplication control mechanism, means controlled by said division control mechanism to effect operation of said shifting means to shift said register in one direction during a division operation, means controlled by said multiplication control mechanism to effect operation of said shifting means to shift said register in the opposite direction during a multiplying operation, a normally disabled cyclic power means for controlling the registration of a value in successive orders of said outboard orders of said register, and means adjustable by either of said control mechanisms upon initiation of a respective plural order operation to enable operation of said cyclic power means.

40. In a calculating machine of the character described in claim 39 having means operated from said inboard orders to control operation of said division controlled means, and means rendered operable by successive orders of said outboard orders to control operation of said multiplication controlled means.

References Cited in the file of this patent

UNITED STATES PATENTS

| | | |
|---|---|---|
| 1,827,837 | Chase | Oct. 20, 1931 |
| 1,900,042 | Brown | Mar. 7, 1933 |
| 1,964,211 | Overbury | June 26, 1934 |
| 2,160,361 | Hilder | May 30, 1939 |
| 2,371,752 | Friden | Mar. 20, 1945 |
| 2,382,661 | Pott | Aug. 14, 1945 |
| 2,430,575 | Laiho | Nov. 11, 1947 |